(12) United States Patent
Brambilla

(10) Patent No.: US 11,488,787 B2
(45) Date of Patent: *Nov. 1, 2022

(54) ADVANCED ELECTROLYTES FOR HIGH TEMPERATURE ENERGY STORAGE DEVICE

(71) Applicant: FastCAP Systems Corporation, Boston, MA (US)

(72) Inventor: Nicolo Brambilla, Brookline, MA (US)

(73) Assignee: FASTCAP SYSTEMS CORPORATION, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/129,976

(22) Filed: Dec. 22, 2020

(65) Prior Publication Data
US 2021/0327655 A1    Oct. 21, 2021

Related U.S. Application Data

(63) Continuation of application No. 15/362,810, filed on Nov. 28, 2016, now Pat. No. 10,872,737, which is a
(Continued)

(51) Int. Cl.
*H01G 11/56* (2013.01)
*H01G 11/36* (2013.01)
*H01G 11/24* (2013.01)
*B82Y 30/00* (2011.01)
*H01G 11/68* (2013.01)
(Continued)

(52) U.S. Cl.
CPC .............. *H01G 11/56* (2013.01); *B82Y 30/00* (2013.01); *H01G 11/24* (2013.01); *H01G 11/36* (2013.01);
(Continued)

(58) Field of Classification Search
CPC ........ H01G 11/64; H01G 11/62; H01G 11/60; H01G 11/78; H01G 11/80; H01G 11/56; Y02E 60/13
See application file for complete search history.

(56) References Cited

U.S. PATENT DOCUMENTS 3,185,903 A    5/1965    Genovese
3,982,182 A    9/1976    Hogg
(Continued)

FOREIGN PATENT DOCUMENTS

CN    1096611 A    12/1994
CN    1317809 A    10/2001
(Continued)

OTHER PUBLICATIONS

[No Author Listed], Oscilla Power, Homepage. Web Printout. Last accessed Feb. 29, 2012 from <http://oscillapower.com/>. 2 pages.
(Continued)

*Primary Examiner* — C Melissa Koslow

(57) ABSTRACT

An ultracapacitor that includes an energy storage cell immersed in an electrolyte and disposed within an hermetically sealed housing, the cell electrically coupled to a positive contact and a negative contact, wherein the ultracapacitor has a gel or polymer based electrolyte and is configured to output electrical energy at temperatures between about −40° C. and about 250° C. Methods of fabrication and use are provided.

19 Claims, 44 Drawing Sheets

Related U.S. Application Data continuation of application No. 15/096,244, filed on Apr. 11, 2016, now abandoned, which is a continuation-in-part of application No. PCT/US2014/059971, filed on Oct. 9, 2014.

(60) Provisional application No. 62/269,077, filed on Dec. 17, 2015, provisional application No. 62/269,063, filed on Dec. 17, 2015, provisional application No. 62/057,739, filed on Sep. 30, 2014, provisional application No. 62/019,952, filed on Jul. 2, 2014, provisional application No. 61/925,740, filed on Jan. 10, 2014, provisional application No. 61/889,018, filed on Oct. 9, 2013.

(51) Int. Cl.
| | |
|---|---|
| *H01G 11/70* | (2013.01) |
| *H01G 11/80* | (2013.01) |
| *H01G 11/52* | (2013.01) |
| *H01G 11/64* | (2013.01) |
| *H01G 11/62* | (2013.01) |
| *H01G 11/60* | (2013.01) |
| *H01G 11/78* | (2013.01) |

(52) U.S. Cl.
CPC ............ *H01G 11/52* (2013.01); *H01G 11/60* (2013.01); *H01G 11/62* (2013.01); *H01G 11/64* (2013.01); *H01G 11/68* (2013.01); *H01G 11/70* (2013.01); *H01G 11/78* (2013.01); *H01G 11/80* (2013.01); *Y02E 60/13* (2013.01)

(56) References Cited

U.S. PATENT DOCUMENTS

| | | | |
|---|---|---|---|
| 4,252,873 A | 2/1981 | Epstein et al. | |
| 4,349,910 A | 9/1982 | Belz | |
| 4,408,259 A | 10/1983 | Muranaka et al. | |
| 4,604,676 A | 8/1986 | Senda et al. | |
| 4,934,366 A | 6/1990 | Truex et al. | |
| 4,982,485 A | 1/1991 | Nakaya et al. | |
| 5,440,447 A | 8/1995 | Shipman et al. | |
| 5,441,827 A | 8/1995 | Gratzel et al. | |
| 5,476,709 A | 12/1995 | Inoue et al. | |
| 5,710,699 A | 1/1998 | King et al. | |
| 5,711,988 A | 1/1998 | Tsai et al. | |
| 5,885,650 A | 3/1999 | Melody et al. | |
| 5,923,619 A | 7/1999 | Knapen et al. | |
| 5,945,749 A | 8/1999 | Li | |
| 5,982,156 A | 11/1999 | Weimer et al. | |
| 6,059,847 A | 5/2000 | Farahmandi et al. | |
| 6,118,251 A | 9/2000 | Atwater | |
| 6,193,032 B1 | 2/2001 | Lesieutre et al. | |
| 6,193,779 B1 | 2/2001 | Reichert et al. | |
| 6,194,815 B1 | 2/2001 | Carroll | |
| 6,201,685 B1 | 3/2001 | Jerabek et al. | |
| 6,205,016 B1 | 3/2001 | Niu | |
| 6,232,706 B1 | 5/2001 | Dai et al. | |
| 6,257,332 B1 | 7/2001 | Vidrine et al. | |
| 6,304,427 B1 | 10/2001 | Reed et al. | |
| 6,318,457 B1 | 11/2001 | Den Boer et al. | |
| 6,350,488 B1 | 2/2002 | Lee et al. | |
| 6,388,423 B1 | 5/2002 | Schilleci, Jr. | |
| 6,413,285 B1 | 7/2002 | Chu et al. | |
| 6,444,326 B1 | 9/2002 | Smith | |
| 6,454,816 B1 | 9/2002 | Lee et al. | |
| 6,491,848 B1 | 12/2002 | Sato et al. | |
| 6,498,712 B1 | 12/2002 | Ditlya | |
| 6,511,760 B1 | 1/2003 | Barone et al. | |
| 6,514,113 B1 | 2/2003 | Lee et al. | |
| 6,565,701 B1 | 5/2003 | Jerabek et al. | |
| 6,665,169 B2 | 12/2003 | Tennent et al. | |
| 6,764,874 B1 | 7/2004 | Zhang et al. | |
| 6,872,681 B2 | 3/2005 | Niu et al. | |
| 6,906,911 B2 | 6/2005 | Ikeda et al. | |
| 6,914,341 B1 | 7/2005 | Mcintyre | |
| 6,924,059 B1 | 8/2005 | Kawakami et al. | |
| 6,927,475 B2 | 8/2005 | Lu | |
| 6,952,060 B2 | 10/2005 | Goldner et al. | |
| 6,962,823 B2 | 11/2005 | Empedocles et al. | |
| 7,070,833 B2 | 7/2006 | Smith et al. | |
| 7,126,207 B2 | 10/2006 | Mosley et al. | |
| 7,168,487 B2 | 1/2007 | Salamitou et al. | |
| 7,201,627 B2 | 4/2007 | Ohnuma | |
| 7,327,556 B2 | 2/2008 | Ro et al. | |
| 7,335,395 B2 | 2/2008 | Ward et al. | |
| 7,381,367 B1 | 6/2008 | Baker et al. | |
| 7,468,679 B2 | 12/2008 | Feluch | |
| 7,493,962 B2 | 2/2009 | Sheffield | |
| 7,511,941 B1 | 3/2009 | Gallay et al. | |
| 7,567,013 B2 | 7/2009 | Lu et al. | |
| 7,645,434 B2 | 1/2010 | Welz-Biermann et al. | |
| 7,699,102 B2 | 4/2010 | Storm et al. | |
| 7,713,658 B2 | 5/2010 | Mizuta et al. | |
| 7,785,558 B2 | 8/2010 | Hikata | |
| 7,834,197 B2 | 11/2010 | Nishida et al. | |
| 7,897,209 B2 | 3/2011 | Shibuya et al. | |
| 7,914,927 B2 | 3/2011 | Mizuta et al. | |
| 7,982,345 B2 | 7/2011 | Tung et al. | |
| 7,982,439 B2 | 7/2011 | Trainor et al. | |
| 7,999,695 B2 | 8/2011 | Rodney et al. | |
| 8,025,971 B2 | 9/2011 | Maeno et al. | |
| 8,168,331 B2 | 5/2012 | Best et al. | |
| 8,531,818 B2 | 9/2013 | Hashimoto et al. | |
| 8,760,851 B2 | 6/2014 | Signorelli et al. | |
| 8,932,750 B2 | 1/2015 | Cooley et al. | |
| 9,001,495 B2 | 4/2015 | Martini et al. | |
| 9,013,144 B2 | 4/2015 | Cooley et al. | |
| 9,017,634 B2 | 4/2015 | Brambilla et al. | |
| 9,206,672 B2 * | 12/2015 | Cooley | F03G 7/08 |
| 9,209,434 B2 | 12/2015 | Epstein | |
| 9,214,709 B2 | 12/2015 | Cooley et al. | |
| 9,218,917 B2 * | 12/2015 | Brambilla | H01G 11/68 |
| 9,318,271 B2 | 4/2016 | Fletcher et al. | |
| 9,515,499 B2 | 12/2016 | Signorelli et al. | |
| 9,558,894 B2 * | 1/2017 | Signorelli | H01G 11/30 |
| 9,679,703 B2 * | 6/2017 | Bendale | H01G 11/84 |
| 9,683,441 B2 | 6/2017 | Signorelli et al. | |
| 9,954,382 B2 | 4/2018 | Cooley et al. | |
| 10,714,271 B2 * | 7/2020 | Signorelli | H01G 11/78 |
| 10,872,737 B2 * | 12/2020 | Brambilla | H01G 11/52 |
| 2001/0006108 A1 | 7/2001 | Brett | |
| 2001/0040379 A1 | 11/2001 | Schultz et al. | |
| 2002/0043369 A1 | 4/2002 | Vinegar et al. | |
| 2002/0159943 A1 | 10/2002 | Smalley et al. | |
| 2002/0177018 A1 | 11/2002 | Fuglevand | |
| 2003/0003359 A1 | 1/2003 | Banno et al. | |
| 2003/0027038 A1 | 2/2003 | Tsukamoto et al. | |
| 2003/0030969 A1 | 2/2003 | Farahmandi et al. | |
| 2003/0081372 A1 | 5/2003 | Nakazawa et al. | |
| 2004/0084219 A1 | 5/2004 | Moore et al. | |
| 2004/0131937 A1 | 7/2004 | Chen et al. | |
| 2004/0188350 A1 | 9/2004 | Beste et al. | |
| 2004/0229117 A1 | 11/2004 | Mitani et al. | |
| 2004/0265682 A1 | 12/2004 | Hudson et al. | |
| 2005/0152096 A1 | 7/2005 | Farahmandi et al. | |
| 2005/0172721 A1 | 8/2005 | Daigle | |
| 2005/0182744 A1 | 8/2005 | Kawabata et al. | |
| 2005/0208207 A1 | 9/2005 | Hinoki et al. | |
| 2005/0230270 A1 | 10/2005 | Ren et al. | |
| 2005/0231893 A1 | 10/2005 | Harvey | |
| 2005/0234177 A1 | 10/2005 | Zaghib et al. | |
| 2005/0238810 A1 | 10/2005 | Scaringe et al. | |
| 2006/0019168 A1 | 1/2006 | Li et al. | |
| 2006/0191681 A1 | 8/2006 | Storm et al. | |
| 2006/0194102 A1 | 8/2006 | Keshishian et al. | |
| 2006/0256506 A1 | 11/2006 | Konuma et al. | |
| 2006/0279906 A1 | 12/2006 | Stemen et al. | |
| 2007/0015336 A1 | 1/2007 | Farahmandi et al. | |
| 2007/0024266 A1 | 2/2007 | Yurgil | |
| 2007/0026295 A1 | 2/2007 | Angell et al. | |

(56) References Cited

U.S. PATENT DOCUMENTS

| | | |
|---|---|---|
| 2007/0076349 A1 | 4/2007 | Dementiev et al. |
| 2007/0097598 A1 | 5/2007 | Siggel et al. |
| 2007/0146965 A1 | 6/2007 | Mitchell et al. |
| 2007/0175663 A1 | 8/2007 | Rotthaeuser |
| 2007/0188977 A1 | 8/2007 | Takeda et al. |
| 2007/0254213 A1 | 11/2007 | Best et al. |
| 2007/0258192 A1 | 11/2007 | Schindall et al. |
| 2007/0258193 A1 | 11/2007 | Zhong et al. |
| 2007/0259216 A1 | 11/2007 | Logan |
| 2007/0287062 A1 | 12/2007 | Tsukuda et al. |
| 2007/0287072 A1 | 12/2007 | Liegl |
| 2007/0292746 A1 | 12/2007 | Sloop |
| 2007/0296606 A1 | 12/2007 | Godager |
| 2008/0013224 A1 | 1/2008 | Kim et al. |
| 2008/0068801 A1 | 3/2008 | Wilk |
| 2008/0083626 A1 | 4/2008 | Kubo et al. |
| 2008/0090183 A1 | 4/2008 | Zhu et al. |
| 2008/0094777 A1 | 4/2008 | Itahashi et al. |
| 2008/0123330 A1 | 5/2008 | Sullivan |
| 2008/0128123 A1 | 6/2008 | Gold |
| 2008/0150524 A1 | 6/2008 | Song et al. |
| 2008/0192407 A1 | 8/2008 | Lu et al. |
| 2008/0212261 A1 | 9/2008 | Ajayan et al. |
| 2008/0316678 A1 | 12/2008 | Ehrenberg et al. |
| 2009/0011330 A1 | 1/2009 | Onodera et al. |
| 2009/0021890 A1 | 1/2009 | Bourcier et al. |
| 2009/0102478 A1 | 4/2009 | Reiderman et al. |
| 2009/0194314 A1 | 8/2009 | Varkey et al. |
| 2009/0250409 A1 | 10/2009 | Fiene et al. |
| 2009/0272935 A1 | 11/2009 | Hata et al. |
| 2009/0272946 A1 | 11/2009 | Lu |
| 2009/0286163 A1 | 11/2009 | Shin et al. |
| 2009/0294753 A1 | 12/2009 | Hauge et al. |
| 2009/0302153 A1 | 12/2009 | Matasso et al. |
| 2009/0303658 A1 | 12/2009 | Hiroyuki et al. |
| 2010/0016287 A1 | 1/2010 | Bonanomi et al. |
| 2010/0046142 A1 | 2/2010 | Aitchison et al. |
| 2010/0119934 A1 | 5/2010 | Ushio et al. |
| 2010/0134955 A1 | 6/2010 | O'Connor et al. |
| 2010/0178564 A1 | 7/2010 | Asari et al. |
| 2010/0194117 A1 | 8/2010 | Pabon et al. |
| 2010/0196600 A1 | 8/2010 | Shibuya et al. |
| 2010/0196758 A1 | 8/2010 | Hojo et al. |
| 2010/0236777 A1 | 9/2010 | Partouche et al. |
| 2010/0259866 A1 | 10/2010 | Shaffer et al. |
| 2011/0049901 A1 | 3/2011 | Tinnen et al. |
| 2011/0057151 A1 | 3/2011 | Chen et al. |
| 2011/0080689 A1* | 4/2011 | Bielawski ............... H01G 11/24 361/502 |
| 2011/0085285 A1 | 4/2011 | Zednicek et al. |
| 2011/0122662 A1 | 5/2011 | Li et al. |
| 2011/0141661 A1 | 6/2011 | Muthu et al. |
| 2011/0150736 A1 | 6/2011 | Hagiwara et al. |
| 2011/0151317 A1 | 6/2011 | Giroud et al. |
| 2011/0170236 A1 | 7/2011 | Young |
| 2012/0154979 A1 | 6/2012 | Signorelli et al. |
| 2012/0156528 A1 | 6/2012 | Cooley |
| 2012/0169298 A1 | 7/2012 | Martin |
| 2012/0268074 A1 | 10/2012 | Cooley et al. |
| 2012/0313586 A1 | 12/2012 | Signorelli et al. |
| 2013/0026978 A1 | 1/2013 | Cooley et al. |
| 2013/0029215 A1 | 1/2013 | Signorelli et al. |
| 2013/0033130 A1 | 2/2013 | Nair et al. |
| 2013/0044130 A1 | 2/2013 | Geisner et al. |
| 2013/0044405 A1 | 2/2013 | Brambilla et al. |
| 2013/0045157 A1 | 2/2013 | Brambilla et al. |
| 2013/0141840 A1 | 6/2013 | Cooley et al. |
| 2013/0235509 A1 | 9/2013 | Ruoff et al. |
| 2013/0342962 A1 | 12/2013 | Fletcher et al. |
| 2014/0042988 A1 | 2/2014 | Kuttipillai |
| 2014/0057164 A1 | 2/2014 | Brambilla et al. |
| 2014/0265565 A1 | 9/2014 | Cooley et al. |
| 2014/0265580 A1 | 9/2014 | Cooley et al. |
| 2015/0000118 A1 | 1/2015 | Zhao et al. |
| 2015/0002987 A1 | 1/2015 | Signorelli et al. |
| 2015/0107824 A1 | 4/2015 | Signorelli et al. |
| 2015/0210548 A1 | 7/2015 | Brambilla et al. |
| 2015/0218913 A1 | 8/2015 | Cooley et al. |
| 2015/0279578 A1 | 10/2015 | Martini et al. |
| 2015/0287961 A1 | 10/2015 | Signorelli et al. |
| 2017/0316889 A1 | 11/2017 | Martini et al. |
| 2018/0068803 A1 | 3/2018 | Brambilla et al. |
| 2018/0068804 A1 | 3/2018 | Brambilla et al. |
| 2018/0135408 A1 | 5/2018 | Cooley et al. |
| 2018/0171777 A1 | 6/2018 | Cooley et al. |
| 2018/0204689 A1 | 7/2018 | Brambilla |

FOREIGN PATENT DOCUMENTS

| | | |
|---|---|---|
| CN | 1538470 A | 10/2004 |
| CN | 1759497 A | 4/2006 |
| CN | 101180691 A | 5/2008 |
| CN | 101221853 A | 7/2008 |
| CN | 101222055 A | 7/2008 |
| CN | 101395748 A | 3/2009 |
| CN | 101600851 A | 12/2009 |
| CN | 103682434 A | 3/2014 |
| EP | 1146527 A2 | 10/2001 |
| EP | 1305502 B1 | 3/2007 |
| JP | S63261811 A | 10/1988 |
| JP | H01220424 A | 9/1989 |
| JP | H05159972 A | 6/1993 |
| JP | 05234814 | 9/1993 |
| JP | H09293490 A | 11/1997 |
| JP | 2003115422 A | 4/2003 |
| JP | 2003133185 A | 5/2003 |
| JP | 2004123653 A | 4/2004 |
| JP | 2004127774 A | 4/2004 |
| JP | 2004153101 A | 5/2004 |
| JP | 2007109609 A | 4/2007 |
| JP | 2007131596 A | 5/2007 |
| JP | 2007518905 A | 7/2007 |
| JP | 2007273149 | 10/2007 |
| JP | 2008088135 A | 4/2008 |
| JP | 2009534828 A | 9/2009 |
| JP | 2010109355 A | 5/2010 |
| JP | 2010220413 A | 9/2010 |
| JP | 2010245070 A | 10/2010 |
| JP | 2012074541 A | 4/2012 |
| KR | 101386903 B1 | 4/2014 |
| RU | 98846 U1 | 10/2010 |
| WO | 9407272 A1 | 3/1994 |
| WO | 9606985 A1 | 3/1996 |
| WO | 9966985 A1 | 12/1999 |
| WO | 0042674 | 7/2000 |
| WO | 2004082059 A1 | 9/2004 |
| WO | 2005101432 A1 | 10/2005 |
| WO | 2007055392 A1 | 5/2007 |
| WO | 2007101303 A1 | 9/2007 |
| WO | 2008016990 A2 | 2/2008 |
| WO | 2008085946 A2 | 7/2008 |
| WO | 2009137508 A1 | 11/2009 |
| WO | 2011029006 A2 | 3/2011 |
| WO | 2012041437 A2 | 4/2012 |
| WO | 2014088712 A1 | 6/2012 |
| WO | 2012151618 A1 | 11/2012 |
| WO | 2012162500 A2 | 11/2012 |
| WO | 2013009720 A2 | 1/2013 |
| WO | 2013010641 A1 | 1/2013 |
| WO | 2013016145 A1 | 1/2013 |
| WO | 2013126915 A1 | 8/2013 |
| WO | WO 2013/126915 * | 8/2013 |
| WO | WO 2013/192518 * | 12/2013 |
| WO | 2014145259 A2 | 9/2014 |
| WO | 2015054432 A1 | 4/2015 |
| WO | 2015102716 A2 | 7/2015 |
| WO | 2015171528 A1 | 11/2015 |

OTHER PUBLICATIONS

[No Author Listed], Oscilla Power, iMEC Technology. Web Printout. Last accessed Feb. 29, 2012 from <http://oscillapower.com/imec-technology/>.

(56) References Cited

OTHER PUBLICATIONS

An et al., "Electrochemical Properties of High-Power Supercapacitors Using Single-Walled Carbon Nanotube Electrodes," Adv. Funct. Mater., Oct. 2001, 387-392, vol. 11, No. 5.
An, et al., "Supercapacitors Using Single-Walled Carbon Nanotube Electrodes", Advanced Materials, Apr. 2001, pp. 497-500, vol. 13, No. 7.
Awad, et al., "Thermal degradation studies of alkyl-imidazolium salts and their application in nanocomposites," Thermochimica Acta, pp. 3-11, 2004, vol. 409.
Balducci, et al., "High temperature carbon-carbon supercapacitor using ionic liquid as electrolyte," J. Power Sources, pp. 922-927, Jan. 3, 2007, vol. 165.
Borges et al., Supercapacitor Operating At 200 Degrees Celsius. Scientific Reports. 2013;3:2572. 6 pages.
Borra et al., Deposition of metal films on an ionic liquid as a basis for a lunar telescope. Jun. 2007;447:979-81.
Brandon et al., Low-Temperature Supercapacitors. NASA Tech Briefs. Jul. 2008:11-12.
Courtney et al., Ionic Liquid Ion Source Emitter Arrays Fabricated on Bulk Porous Substrates for Spacecraft Propulsion. MIT Doctoral Thesis. Jun. 2011. 334 pages.
Dahi et al., Polyimide/ionic liquid composite membranes for fuel cells operating at high temperatures. Electrochimica Acta. Jun. 2014;130:830-40.
Dahi et al., Supported ionic liquid membranes for water and volatile organic compounds separation: Sorption and permeation properties. Journal of Membrane Science. 2014;458:164-78. Epub Feb. 10, 2014.
Diaz et al., Progress in the use of ionic liquids as electrolyte membranes in fuel cells. Journal of Membrane Science. Nov. 2014;469:379-96.
Emmenegger, et al., "Investigation of Electrochemical Double-layer (ECDL) Capacitors Electrodes Based on Carbon Nanotubes and Activated Carbon Materials," J. Of Power Sources, 2003,pp. 321-329, vol. 124.
Extended European Search Report for EP App. No. 12817809.2 dated Jul. 14, 2015.
Extended European Search Report for EP App. No. 13751667.0 dated Sep. 21, 2015.
Extended European Search Report for EP dated Feb. 4, 2015 for EP App. No. 12810706.7.
Farmer et al., The oxidation of alcohols in substituted imidazolium ionic liquids using ruthenium catalysts. Green Chemistry. 2002;4:97-102.
Halber, "Researchers Fired Up Over New Battery", The Tech, Feb. 8, 2006, pp. 1, 5, vol. 50, No. 16.
Hensley, et al., "The evolution of oilfield batteries", Oilfield Review, Autumn 1998, pp. 42-57.
International Preliminary Report on Patentability for PCT/US2012/045994 dated Jan. 23, 2014.
International Preliminary Report on Patentability for PCT/US2012/047474 dated Feb. 6, 2014.
International Preliminary Report on Patentability for PCT/US2013/027697 dated Sep. 4, 2014.
International Preliminary Report on Patentability for PCT/US2014/059971 dated Apr. 21, 2016.
International Preliminary Report on Patentability for PCT/US2016/015237 dated Aug. 10, 2017.
International Search Report and Written Opinion for PCT/US2007/068314 dated Feb. 13, 2008.
International Search Report and Written Opinion for PCT/US2012/041438 dated Nov. 19, 2012.
International Search Report and Written Opinion for PCT/US2012/045994 dated Dec. 26, 2012.
International Search Report and Written Opinion for PCT/US2012/047474 dated Oct. 16, 2012.
International Search Report and Written Opinion for PCT/US2014/059971 dated Jul. 28, 2015.
International Search REport and Written Opinion for PCT/US2016/015237 dated Feb. 2, 2017.
International Search REport for PCT/US2014/029992 dated Oct. 7, 2014.
International Search Report for PCT/US2014/030310 dated Oct. 10, 2014.
Izadi-Najafabadi et al., Extracting the full potential of single-walled carbon nanotubes as durable supercapacitor electrodes operable at 4 V with high power and energy density. Adv Mater. Sep. 15, 2010;22(35):E235-41.
Koch, "Electrochemical Double Layer Capacitors for High Temperature Applications," 14th International Seminar on Double Layer Capacitors and Hybrid Energy Storage Devices, Dec. 6-8, 2004, pp. 33-39.
Koch, "Thermally Robust Capacitors for the Drilling Industry," Report for U.S. Dept. of Energy Grant No. DE-FG02-06ER84598 for the period Jun. 28, 2006 to Mar. 27, 2007. 19 pages.
Kuznetsov et al., Kondensatory s dvoinym elektricheskim sloem (ionistory): razrabotka i proizvodstvo. Komponenty I Tekhnologii. 2005;6:12-16.
Liu, et al., "Graphene-Based Supercapacitor with an Ultrahigh Energy Density," Nano Lett., pp. 4863-4868, 2010, vol. 10.
Marincic, "High Temperature Electrochemical Double Layer Capacitors with Reduced Leakage Rate," 14th International Seminar on Double Layer Capacitors and Hybrid Energy Storage Devices, Dec. 6-8, 2004,pp. 310-316.
Maxwell Technologies Application Note, "Maxwell Technologies' Test Procedures for Capacitance, ESR, Leakage Current and Self-Discharge Characterizations of Ultracapacitors," Jul. 2009,pp. 1-10.
Murakami, et al., "Growth Of Vertically Aligned Single-walled Carbon Nanotube Films On Quartz Substrates And Their Optical Anisotropy," Chem. Phys. Lett., 2004, pp. 298-303, vol. 385.
Office Action dated Dec. 11, 2013 for U.S. Appl. No. 12/928,897.
Office Action dated Jun. 18, 2014 for U.S. Appl. No. 13/588,452.
Office Action dated May 29, 2014 for U.S. Appl. No. 13/560,628.
Office Action dated Oct. 15, 2014 for U.S. Appl. No. 13/587,037.
[No Author Listed], New technology for electric vehicle. Japan Electric Society, Electric Vehicle Drive System Survey Special Committee. Machinery Industry Press. Section 5.6. Aug. 2008:134-9.
[No Author Listed], Principles of Automobile Engines. The Peoples Transportation Press. Oct. 2007:260.
Extended European Search Report for EP App. No. 16812065.7 dated Nov. 7, 2018.
Hua, Diesel Engine Failure Analysis. Coal Industry Press. 1987:217-9.
International Search Report and Written Opinion for PCT/US2012/039342 dated Dec. 6, 2012.
International Search Report and Written Opinion for PCT/US2013/027697 dated Jun. 26, 2013.
Ngo et al., "Thermal properties of imidazolium ionic liquids," Thermochimica Acta, pp. 97-102, 2000, vol. 357-58.
Nishida, et al., "Physical and electrochemical properties of 1-alkyl-3-nriethylimidazolium tetrafluoroborate for electrolyte," J. Fluorine Chem., pp. 135-141, 2003, vol. 120.
Niu, et al., "High Power Electrochemical Capacitors Based on Carbon Nanotube Electrodes," Appl. Phys. Lett., Mar. 17, 1997, pp. 1480-1482, vol. 70, No. 11.
Office Action dated Jul. 16, 2014 for U.S. Appl. No. 12/928,897.
Randstrom, "The influence of air and its components on the cathodic stability of N-butyl-N-methylpyrrolidinium bis (trifluoromethanesulfonyl)imide," Electrochimica Acta, pp. 1837-1842, Aug. 19, 2007, vol. 53.
Robertson, "Realistic applications of CNTs," materialstoday, Oct. 2004, pp. 46-52, vol. 7, No. 10.
Sato et al., Electrochemical properties of novel ionic liquids for electric double layer capacitor applications. Electrochimica Acta. 2004;49:3603-11. Epub May 8, 2004.
Signorelli et al., Electrochemical Double-Layer Capacitors Using Carbon Nanotube Electrode Structures. Proceedings of teh IEEE Oct. 2009;97(11):1837-47.

(56) References Cited

OTHER PUBLICATIONS

Signorelli, et al., "Carbon Nanotube Enhanced Ultracapacitor", MIT Lab. for Electromagnetic and Electronic Systems; Sep. 2004, 2 pages.

Signorelli, et al., "Fabrication and Electrochemical Testing of the First Generation Carbon-Nanotube Based Ultracapacitor Cell," 17th International Seminar on Double Layer Capacitors and Hybrid Energy Storage Devices, Dec. 10-12, 2007, pp. 70-78.

Signorelli, et al., "High Density Energy Storage Using a Nanotube-Enhanced Ultracapacitor," 16th International Seminar on Double Layer Capacitors and Hybrid Energy Storage Devices, Dec. 4-6, 2006, pp. 15-21.

Signorelli, et al., "High Potential Vertically Aligned Carbon Nanotubes as EDLC Electrodes," 18th International Seminar on Double Layer Capacitors and Hybrid Energy Storage Devices, Dec. 8-10, 2008, pp. 73-79.

Signorelli, et al., "Nanotube Enhanced Ultracapacitor," 14th International Seminar on Double Layer Capacitors and Hybrid Energy Storage Devices, Dec. 6-8, 2004, pp. 49-61.

Signorelli, et al., "Nanotube Enhanced Ultracapacitor," 15th International Seminar on Double Layer Capacitors and Hybrid Energy Storage Devices, Dec. 5-7, 2005, pp. 158-168.

Ue, et al., "Application of Low-Viscosity Ionic Liquid to the Electrolyte of Double-Layer Capacitors," J. Electrochem. Soc., Feb. 28, 2003,pp. A499-A502, vol. 150, No. 4.

Wongwiriyapan, et al., "Direct Growth of Single-Walled Carbon Nanotube Networks on Alumina Substrate: A novel route to Ultrasensitive Gas Sensor Fabrication", Japanese Journal of Applied Physics, Nov. 9, 2005, pp. 8227-8230, vol. 44, No. 11.

Zhang, Status of patents and Development Trends Report in Various Industries. Intellectual Property Publishing House. Dec. 2009. 117-8.

Zuckerbrod, et al., "How Dry I Am: Optimizing Cell Performance Through Proper Component Drying," 15th International Seminar on Double Layer Capacitors and Hybrid Energy Storage Devices, Dec. 5-7, 2005,pp. 101-110.

\* cited by examiner

Fig. 6
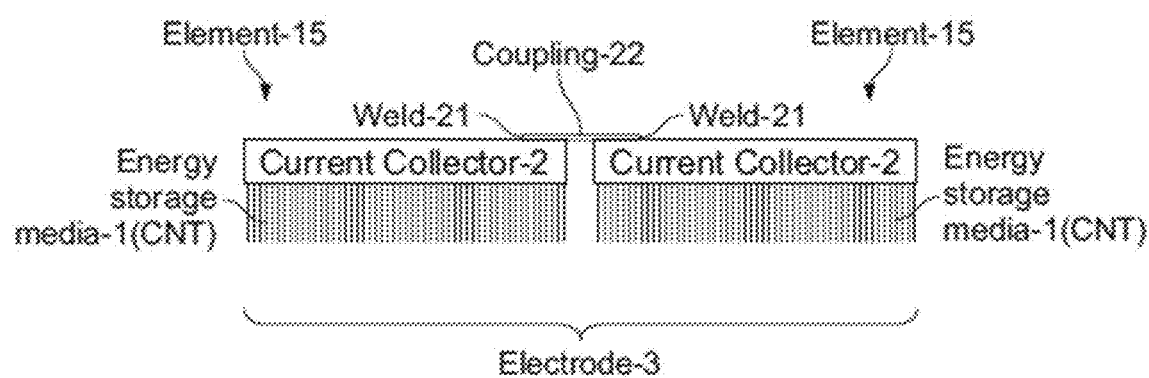
Fig. 7

Primary Structures of Cations

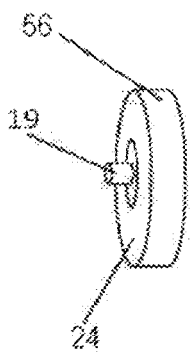
Fig. 14A
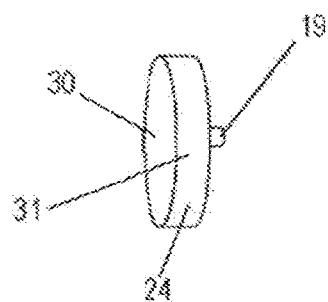
Fig. 14B
Fig. 15
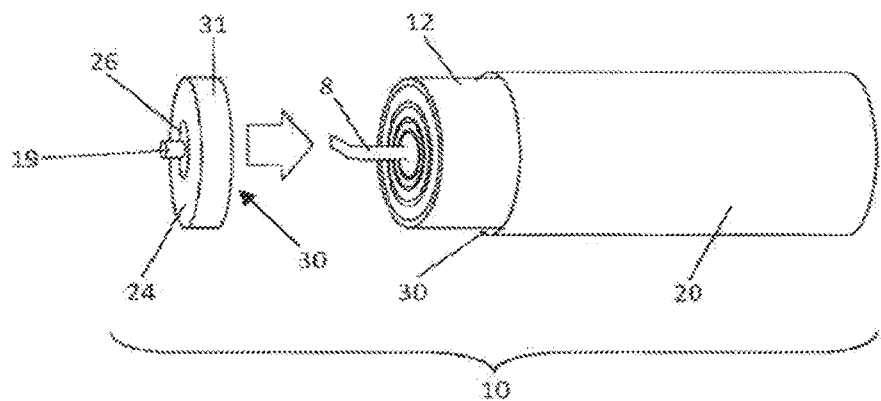

HOUSING WITH EXPOSED INTERNAL SURFACES

HOUSING WITH BARRIER OVER INTERNAL SURFACES

Fig. 29
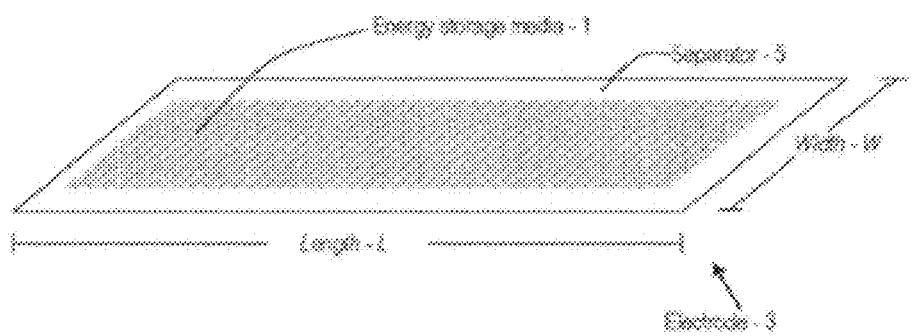
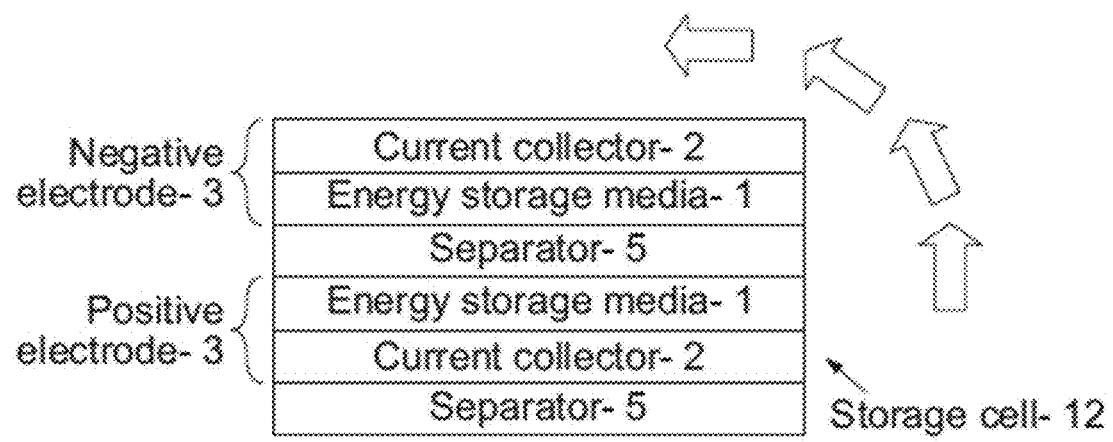
Fig. 30
Fig. 31
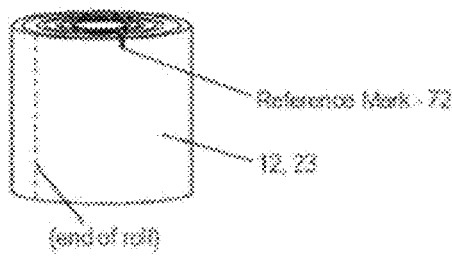

Cyclic Voltammetries at 200°C
Electrode: CNT

ADVANCED ELECTROLYTES FOR HIGH TEMPERATURE ENERGY STORAGE DEVICE

CROSS REFERENCE TO RELATED APPLICATION

The present application is a continuation-in-part of U.S. patent application having Ser. No. 15/362,810, filed Nov. 28, 2016, now U.S. Pat. No. 10,872,737, granted Dec. 22, 2020, which is a continuation of U.S. patent application having Ser. No. 15/096,244 filed on Apr. 11, 2016, abandoned Dec. 2, 2016, which claims priority to U.S. Provisional Patent Application No. 62/269,077 filed on Dec. 17, 2015; to U.S. Provisional Patent Application No. 62/269,063 filed on Dec. 17, 2015, and to PCI Application No. PCT/US2014/059971 filed on Filed on Oct. 9, 2014 which claims priority to U.S. Provisional Patent Application No. 61/889,018 filed Oct. 9, 2013; U.S. Provisional Patent Application No. 62/019,952 filed Jul. 2, 2014; U.S. Provisional Patent Application No. 61/925,740, filed Jan. 10, 2014; and U.S. Provisional Patent Application No. 62/057,739 filed Sep. 30, 2014, the contents of each of which are incorporated herein by reference.

STATEMENT REGARDING FEDERALLY SPONSORED RESEARCH

This invention was made with government support under Grant No. DE-EE000503 awarded by the U.S. Department of Energy (EERE). The U.S. government has certain rights in the invention.

BACKGROUND

1. Field of the Invention

The invention disclosed herein relates to energy storage cells, and in particular to techniques for providing an electric double-layer capacitor that is operable at high temperatures.

2. Description of the Related Art

Energy storage cells are ubiquitous in our society. While most people recognize an energy storage cell simply as a "battery," other types of cells may be included. For example, recently, ultracapacitors have garnered much attention as a result of their favorable characteristics. In short, many types of energy storage cells are known and in use today.

As a general rule, an energy storage cell includes an energy storage media disposed within a housing (such as a canister). While a metallic canister can provide robust physical protection for the cell, such a canister is typically both electrically and thermally conductive and can react with the energy storage cell. Typically, such reactions increase in rate as ambient temperature increases. The electrochemical or other properties of many canisters can cause poor initial performance and lead to premature degradation of the energy storage cell, especially at elevated temperatures.

In fact, a variety of factors work to degrade performance of energy storage systems at elevated temperatures. Thus, what are needed are methods and apparatus for improving performance of an electric double-layer capacitor (EDLC) at elevated temperatures. Preferably, the methods and apparatus result in improved performance at a minimal cost.

One factor that negatively affects EDLC performance at elevated temperatures is the degradation of electrolyte at elevated temperatures. A variety of electrolytes are used in EDLCs, but only a few are stable enough at elevated temperatures to be used in high temperature energy storage cells. Moreover, the available electrolytes typically do not perform adequately at temperatures over about 200° C. Certain applications require energy storage cells that are capable of operating at temperatures in excess of about 200° C., e.g., subsurface drilling, such as petroleum exploration and geothermal wells. Moreover, in certain demanding applications, the available electrolytes do not perform adequately at temperatures over about 150° C. Therefore, electrolytes are needed to extend the operating temperature range of high temperature energy storage cells, particularly EDLCs, to temperatures over about 200° C. Also desirable are electrolytes that are capable of performing over a wide range temperatures, e.g., down to very low temperatures such as −20° C. or even −40° C.

Although typically necessary in any EDLC to prevent contact between the electrodes, the separator frequently introduces undesirable characteristics to EDLCs, e.g., contamination and decomposition. However, available EDLCs cannot work without a separator to prevent contact between the electrodes, i.e., a short circuit. Therefore, a separator-less EDLC would be desirable to improve the properties of the EDLC.

BRIEF SUMMARY OF CERTAIN EMBODIMENTS

In one embodiment, an ultracapacitor is disclosed. The ultracapacitor includes an energy storage cell immersed in an electrolyte and disposed within a housing (e.g., a hermetically sealed housing) and electrically coupled to a positive contact and a negative contact, wherein the ultracapacitor is configured to output electrical energy at temperatures between about −40° C. and about 250° C.

In another embodiment, a method for fabricating an ultracapacitor is provided. The method includes disposing an energy storage cell including energy storage media within a housing (e.g., a hermetically sealed housing) and constructing the ultracapacitor to operate at temperatures between about −40° C. and about 250° C.

In yet another embodiment, a method for fabricating an ultracapacitor is provided. The method includes disposing an energy storage cell including energy storage media and an electrolyte adapted for operation at temperatures between about −40° C. and about 250° C. within a housing (e.g., a hermetically sealed housing).

In a further embodiment, an electrolyte for use in an ultracapacitor is disclosed. The electrolyte includes an ionic liquid and other additives, wherein an ultracapacitor that utilizes the electrolyte is configured to output electrical energy at temperatures between about −40° C. and about 250° C. In certain embodiments the additives include gelling agents (e.g., silica or silicates), other inorganic or ceramic powders (e.g., alumina, titania, magnesia, aluminosilicates, or titanates such as BaTiOs), clays (e.g., bentonite or montmorillonite and their derivatives), solvents, polymeric materials, plasticizers, and combinations thereof.

In a further embodiment, an ultracapacitor is disclosed. The ultracapacitor includes an energy storage cell employing an electrolyte including an additive, as described above, and disposed within a housing (e.g., a hermetically sealed housing). In certain embodiments, an ultracapacitor includes a gel-based electrolyte. In certain embodiments, an ultracapacitor including a gel-based electrolyte does not employ a separator between the electrodes.

In a further embodiment, a solid state polymer electrolyte for use in an ultracapacitor is disclosed. The electrolyte includes an ionic liquid and a polymer and may include other additives, wherein an ultracapacitor that utilizes the solid state electrolyte is configured to output electrical energy at temperatures between about −40° C. and about 250° C. In certain embodiments, other additives are mixed with the polymer, e.g., gelling agents (e.g., silica or silicates), other inorganic or ceramic powders (e.g., alumina, titania, magnesia, aluminosilicates, or titanates such as BaTiOs), clays (e.g., bentonite or montmorillonite and their derivatives), solvents, other polymeric materials, plasticizers, and combinations thereof.

In an embodiment, wherein the electrolyte is configured to increase the operational lifetime of the ultracapacitor in comparison to an equivalent ultracapacitor utilizing an electrolyte including the ionic liquid but lacking the at least one additive.

In various embodiments, a solid state polymer electrolyte for use in an ultracapacitor includes an ionic liquid and a polymer. Other additives including inorganic or ceramic powders, clays, solvents, and other polymeric materials, plasticizers, and combinations thereof may be added to the solid state polymer electrolyte.

In various embodiments, the electrolytes disclosed herein includes an ionic liquid and an additive, and are configured to increase the maximum operating voltage of a ultracapacitor in comparison to an equivalent ultracapacitor utilizing an electrolyte including the ionic liquid but lacking the additive.

In various embodiments, the electrolytes disclosed herein includes an ionic liquid and an additive, and are configured to increase the maximum operating temperature of an ultracapacitor in comparison to an equivalent ultracapacitor utilizing an electrolyte including the ionic liquid but lacking the at least one additive.

In various embodiments, the electrolytes disclosed herein includes an ionic liquid and an additive, and are configured to provide increased performance of an ultracapacitor in comparison to an equivalent ultracapacitor utilizing an electrolyte including the ionic liquid but lacking the at least one additive, the increase performance including at least one of: decreased total resistance, increased long-term stability of resistance, increased total capacitance, increased long-term stability of capacitance, increased energy density, increased voltage stability, reduced vapor pressure, wider temperature range performance, increased temperature durability.

In a further embodiment, an ultracapacitor is disclosed. The ultracapacitor includes an energy storage cell employing a solid state polymer electrolyte, as described above, and disposed within a housing (e.g., a hermetically sealed housing). In certain embodiments, an ultracapacitor includes a solid state polymer electrolyte, which may further include other additives, as described above. An ultracapacitor including a solid state polymer electrolyte typically does not employ a separator between the electrodes.

In a further embodiment, an ultracapacitor is disclosed. The ultracapacitor includes an energy storage cell having an electrolyte and disposed within a housing (e.g., a hermetically sealed housing), wherein a level of moisture within the housing is no greater than about 1,000 parts per million (ppm), 500 ppm, 200 ppm, 100 ppm, 50 ppm, 10 ppm, or less by combined weight of the storage cell and electrolyte.

In yet a further embodiment, an ultracapacitor is disclosed. The ultracapacitor includes an energy storage cell having an electrolyte and disposed within a housing (e.g., a hermetically sealed housing), wherein a level of halide impurities within the housing is no greater than 1,000 parts per million (ppm), 500 ppm, 200 ppm, 100 ppm, 50 ppm, or 10 ppm, by combined weight of the storage cell and electrolyte.

In another embodiment, a method for characterizing a contaminant within an ultracapacitor is provided. The method includes breaching a housing of the ultracapacitor to access contents thereof; sampling the contents; and analyzing the sample.

In one embodiment, an ultracapacitor is disclosed. The ultracapacitor exhibits a volumetric leakage current (mA/cc) that is less than about 10 mA/cc while held at a substantially constant temperature within a range of between −40° C. to 250° C., and about 100° C. and about 250° C.

In one embodiment, an ultracapacitor is disclosed. The ultracapacitor exhibits a volumetric leakage current of less than about 10 mA/cc while held at a substantially constant temperature within a temperature range of between about 150° C. and about 250° C.

In one embodiment, an ultracapacitor is disclosed. The ultracapacitor exhibits a volumetric leakage current of less than about 10 mA/cc while held at a substantially constant temperature within a temperature range of between about 200° C. and about 250° C.

In one embodiment, an ultracapacitor is disclosed. The ultracapacitor exhibits a volumetric leakage current of less than about 10 mA/cc while held at a substantially constant temperature within a temperature range of between about 150° C. and about 220° C.

In one embodiment, an ultracapacitor is disclosed. The ultracapacitor exhibits a volumetric leakage current of less than about 10 mA/cc while held at a substantially constant temperature within a temperature range of between about 180° C. and about 220° C.

In one embodiment, an ultracapacitor is disclosed. The ultracapacitor exhibits a volumetric leakage current of less than about 10 mA/cc while held at a substantially constant temperature within a temperature range of between about 100° C. and about 250° C.

In another embodiment, a method for providing a high temperature rechargeable energy storage device is disclosed. The method includes selecting a high temperature rechargeable energy storage device (HTRESD) that exhibits initial peak power density between 0.01 W/liter and 100 kW/liter and a lifetime of at least 20 hours when exposed to an ambient temperature between about −40° C. and about 250° C.; and providing the storage device.

In another embodiment, a method for using a high temperature rechargeable energy storage device is disclosed. The method includes (a) obtaining an HTRESD and (b) at least one of (1) cycling the HTRESD by alternatively charging and discharging the HTRESD at least twice over a duration of 20 hours and (b) maintaining a voltage across the HTRESD for 20 hours, such that the HTRESD exhibits a peak power density between 0.005 W/liter and 75 kW/liter after 20 hours when operated at an ambient temperature between about −40° C. and about 250° C.

In another embodiment, a method for using a high temperature rechargeable energy storage device is disclosed. The method includes (a) obtaining an ultracapacitor and (b) maintaining a voltage across the ultracapacitor, such that the ultracapacitor will exhibit a peak power density of between about 0.005 W/liter and about 75 kW/liter after 20 hours when operated at an ambient temperature between about −40° C. and about 250° C.

In another embodiment, a method for using an ultracapacitor is disclosed. The method includes (a) obtaining an ultracapacitor that has an electrolyte and two electrodes, wherein each the electrode is in electrical communication with a current collector and separated from the other by a separator; and (b) charging and discharging the ultracapacitor at least twice to provide for an initial combination of peak power and energy densities in a range from about 0.1 Wh-kW/liter$^2$ to about 100 Wh-kW/liter$^2$; wherein said combination is mathematically a product of the peak power density and the energy density of the ultracapacitor; and wherein the ultracapacitor exhibits a durability period of at least 20 hours when exposed to an ambient temperature between about −40° C. and about 250° C., wherein the durability is indicated by a decrease in peak power density of no more than about 50 percent over the period.

BRIEF DESCRIPTION OF THE DRAWINGS

The foregoing and other features and advantages of the invention are apparent from the following detailed description taken in conjunction with the accompanying drawings in which:

FIG. 6 is a block diagram depicting the electrode element subsequent to transfer;

FIG. 7 is a block diagram depicting an exemplary electrode fabricated from a plurality of the electrode elements;

FIGS. 14A and 14B, collectively referred to herein as FIG. 14, depict aspects of a cap for the housing;

FIG. 15 depicts assembly of the ultracapacitor according to the teachings herein;

FIG. 29 is a transparent isometric view of the energy storage cell disposed in a cylindrical housing;

FIG. 30 is a side view of the storage cell, showing the various layers of one embodiment;

FIG. 31 is an isometric view of a rolled up storage cell which includes a reference mark for placing a plurality of leads;

FIG. 35 shows a plot of current versus operating time for an exemplary ultracapacitor, FIG. 36 shows a plot of equivalent series resistance versus operating time for an exemplary ultracapacitor, FIG. 37 shows a plot of current versus operating time for an exemplary ultracapacitor, and FIG. 38 shows a plot of equivalent series resistance versus operating time for an exemplary ultracapacitor;

FIG. 39 shows a plot of voltage versus operating time for an exemplary ultracapacitor, FIG. 40 shows a plot of equivalent series resistance versus operating time for an exemplary ultracapacitor, FIG. 41 shows a plot of current versus operating time for an exemplary ultracapacitor, FIG. 42 shows a plot of current versus operating time for an exemplary ultracapacitor, and FIG. 43 shows a plot of internal resistance versus operating time for an exemplary ultracapacitor;

FIG. 63A shows Nyquist plots for the capacitor obtained at temperatures of 100 degrees Celsius, 150 degrees Celsius, 200 degrees Celsius, 225 degrees Celsius, and 250 degrees Celsius. FIG. 63B shows plots of capacitance as a function of frequency for the capacitor obtained at temperatures of 100 degrees Celsius, 150 degrees Celsius, 200 degrees Celsius, 225 degrees Celsius, and 250 degrees Celsius. FIG. 63C shows plots of relative capacitance and relative equivalent series resistance (ESR) as the ultracapacitor is charged and discharged over 10,000 cycles in the course of 115 hours at a temperature of 250 degrees Celsius and at a voltage of 0.5 V.

DETAILED DESCRIPTION OF CERTAIN EMBODIMENTS

Figure 1A:
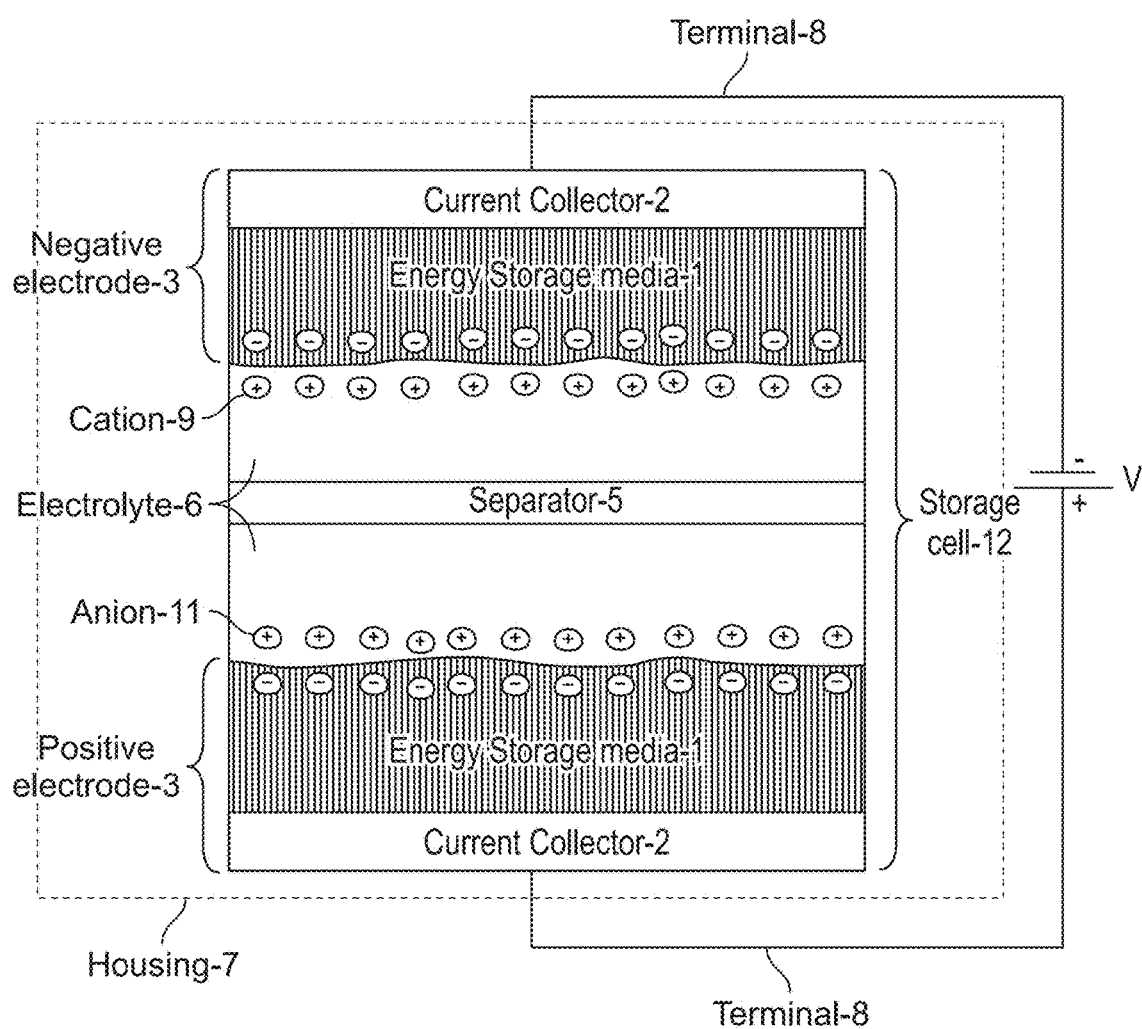
FIG. 1A illustrates aspects of an exemplary ultracapacitor that employs a separator.

Disclosed herein is a capacitor that provides users with improved performance in a wide range of temperatures. For example, the capacitor may be operable at temperatures ranging from about as low as minus 40 degrees Celsius to as high as about 250 degrees Celsius. In some embodiments, the capacitor is operable temperatures as high as about 200 degrees Celsius, as high as about 210 degrees Celsius, as high as about 220 degrees Celsius, as high as about 230 degrees Celsius, as high as about 240 degrees Celsius, or as high as about 250 degrees Celsius. In some embodiments, the capacitor is operable temperatures as low as about 0 degrees Celsius, as low as about minus 5 degrees Celsius, as low as about minus 10 degrees Celsius, as low as about minus 15 degrees Celsius, as low as about minus 20 degrees Celsius, as low as about minus 30 degrees Celsius, or as low as about minus 40 degrees Celsius. In an embodiment, the capacitor can operate in the temperature ranges of 0-150° C., 0-175° C., 0-225° C., −10° C. to 225° C. and −40° C. to 225° C.

In general, the capacitor includes energy storage media that is adapted for providing high power density and high energy density when compared to prior art devices. The capacitor includes components that are configured for ensuring operation over the temperature range, and includes any one or more of a variety of forms of electrolyte that are likewise rated for the temperature range. The combination of construction, energy storage media and electrolyte result in capabilities to provide robust operation under extreme conditions. To provide some perspective, aspects of an exemplary embodiment are now introduced.

Figure 1B:
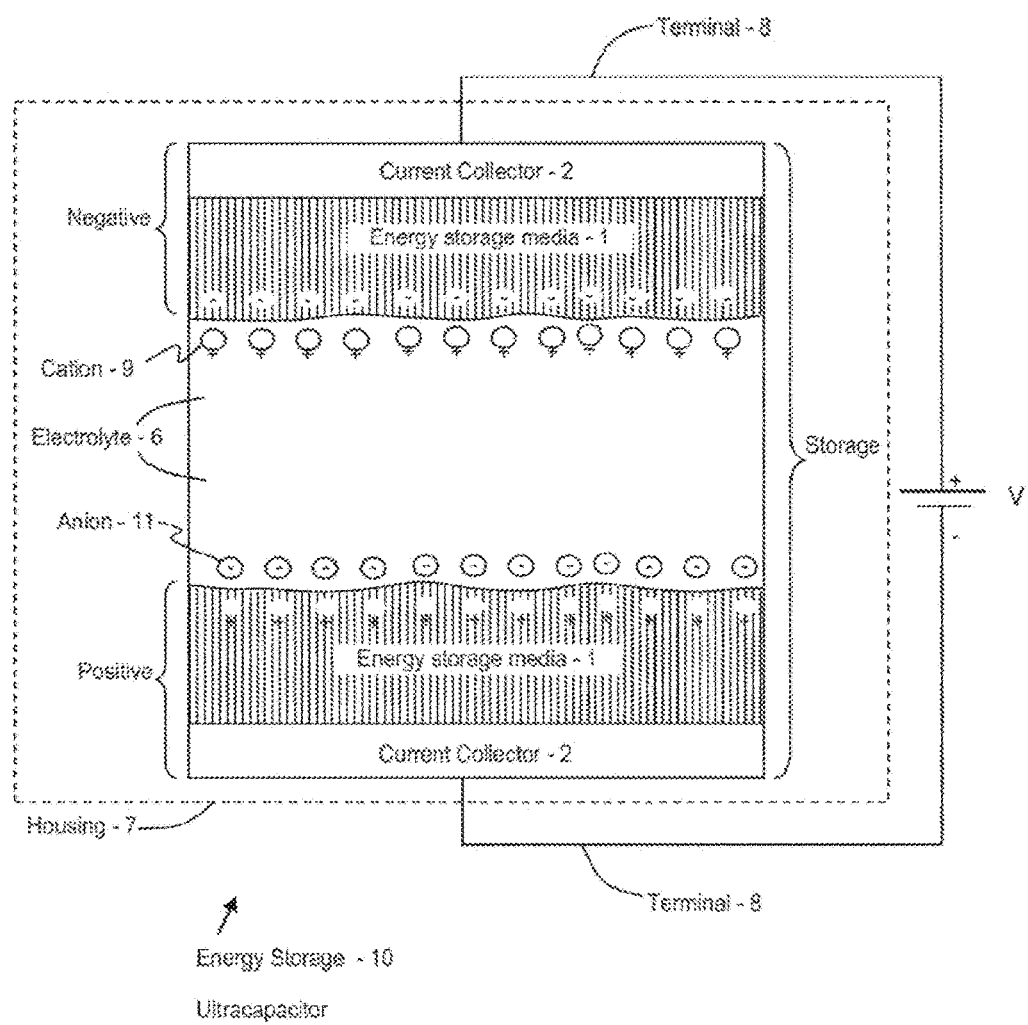
FIG. 1B illustrates aspects of an exemplary ultracapacitor without a separator.

As shown in FIGS. 1A and 1B, exemplary embodiments of a capacitor are shown. In each case, the capacitor is an "ultracapacitor 10." The difference between FIG. 1A and FIG. 1B is the inclusion of a separator in exemplary ultracapacitor 10 of FIG. 1A. The concepts disclosed herein generally apply equally to any exemplary ultracapacitor 10. Certain electrolytes of certain embodiments are uniquely suited to constructing an exemplary ultracapacitor 10 without a separator. Unless otherwise noted, the discussion herein applies equally to any ultracapacitor 10, with or without a separator.

The exemplary ultracapacitor 10 is an electric double-layer capacitor (EDLC). The EDLC includes at least one pair of electrodes 3 (where the electrodes 3 may be referred to as a negative electrode 3 and a positive electrode 3, merely for purposes of referencing herein). When assembled into the ultracapacitor 10, each of the electrodes 3 presents a double layer of charge at an electrolyte interface. In some embodiments, a plurality of electrodes 3 is included (for example, in some embodiments, at least two pairs of electrodes 3 are included). However, for purposes of discussion, only one pair of electrodes 3 are shown. As a matter of convention herein, at least one of the electrodes 3 uses a carbon-based energy storage media 1 (as discussed further herein) to provide energy storage. However, for purposes of discussion herein, it is generally assumed that each of the electrodes includes the carbon-based energy storage media 1. It should be noted that an electrolytic capacitor differs from an ultracapacitor because metallic electrodes differ greatly (at least an order of magnitude) in surface area.

Each of the electrodes 3 includes a respective current collector 2 (also referred to as a "charge collector"). In some embodiments, the electrodes 3 are separated by a separator 5. In general, the separator 5 is a thin structural material (usually a sheet) used to separate the negative electrode 3 from the positive electrode 3. The separator 5 may also serve to separate pairs of the electrodes 3. Once assembled, the electrodes 3 and the separator 5 provide a storage cell 12. Note that, in some embodiments, the carbon-based energy storage media 1 may not be included on one or both of the electrodes 3. That is, in some embodiments, a respective electrode 3 might consist of only the current collector 2. The material used to provide the current collector 2 could be roughened, anodized or the like to increase a surface area thereof. In these embodiments, the current collector 2 alone may serve as the electrode 3. With this in mind, however, as used herein, the term "electrode 3" generally refers to a combination of the energy storage media 1 and the current collector 2 (but this is not limiting, for at least the foregoing reason).

At least one form of electrolyte 6 is included in the ultracapacitor 10. The electrolyte 6 fills void spaces in and between the electrodes 3 and the separator 5. In general, the electrolyte 6 is a substance that disassociates into electrically charged ions. A solvent that dissolves the substance may be included in some embodiments of the electrolyte 6, as appropriate. The electrolyte 6 conducts electricity by ionic transport.

Generally, the storage cell 12 is formed into one of a wound form or prismatic form which is then packaged into a cylindrical or prismatic housing 7. Once the electrolyte 6 has been included, the housing 7 may be hermetically sealed. In various examples, the package is hermetically sealed by techniques making use of laser, ultrasonic, and/or welding technologies. In addition to providing robust physical protection of the storage cell 12, the housing 7 is configured with external contacts to provide electrical communication with respective terminals 8 within the housing 7. Each of the terminals 8, in turn, provides electrical access to energy stored in the energy storage media 1, generally through electrical leads which are coupled to the energy storage media 1.

As discussed herein, "hermetic" refers to a seal whose quality (i.e., leak rate) is defined in units of "atm-cc/second," which means one cubic centimeter of gas (e.g., He) per second at ambient atmospheric pressure and temperature. This is equivalent to an expression in units of "standard He-cc/sec." Further, it is recognized that 1 atm-cc/sec is equal to 1.01325 mbar-liter/sec. Generally, the ultracapacitor 10 disclosed herein is capable of providing a hermetic seal that has a leak rate no greater than about $5.0 \times 10^{-6}$ atm-cc/sec, and may exhibit a leak rate no higher than about $5.0 \times 10^{-10}$ atm-cc/sec. It is also considered that performance of a successfully hermetic seal is to be judged by the user, designer or manufacturer as appropriate, and that "hermetic" ultimately implies a standard that is to be defined by a user, designer, manufacturer or other interested party.

Leak detection may be accomplished, for example, by use of a tracer gas. Using tracer gas such as helium for leak testing is advantageous as it is a dry, fast, accurate and non-destructive method. In one example of this technique, the ultracapacitor 10 is placed into an environment of helium. The ultracapacitor 10 is subjected to pressurized helium. The ultracapacitor 10 is then placed into a vacuum chamber that is connected to a detector capable of monitoring helium presence (such as an atomic absorption unit). With knowledge of pressurization time, pressure and internal volume, the leak rate of the ultracapacitor 10 may be determined.

In some embodiments, at least one lead (which may also be referred to herein as a "tab") is electrically coupled to a respective one of the current collectors 2. A plurality of the leads (accordingly to a polarity of the ultracapacitor 10) may be grouped together and coupled to into a respective terminal 8. In turn, the terminal 8 may be coupled to an electrical access, referred to as a "contact" (e.g., one of the housing 7 and an external electrode (also referred to herein for convention as a "feed-through" or "pin")). Reference may be had to FIGS. 28 and 32-34. Consider now the energy storage media 1 in greater detail.

In the exemplary ultracapacitor 10, the energy storage media 1 is formed of carbon nanotubes. The energy storage media 1 may include other carbonaceous materials including, for example, activated carbon, carbon fibers, rayon, graphene, aerogel, carbon cloth, and a plurality of forms of carbon nanotubes. Activated carbon electrodes can be manufactured, for example, by producing a carbon base material by carrying out a first activation treatment to a carbon material obtained by carbonization of a carbon compound, producing a formed body by adding a binder to the carbon base material, carbonizing the formed body, and finally producing an active carbon electrode by carrying out a second activation treatment to the carbonized formed body. Carbon fiber electrodes can be produced, for example, by using paper or cloth pre-form with high surface area carbon fibers.

In some embodiments, the electrode of the ultracapacitor 10 includes a current collector including aluminum with an aluminum carbide layer on at least one surface, on which at least one layer of carbon nanotubes (CNTs) is disposed. The electrode may include vertically-aligned, horizontally-aligned, or nonaligned (e.g., tangled or clustered) CNTs. The electrode may include compressed CNTs. The electrode may include single-walled, double-walled, or multiwalled CNTs. The electrode may include multiple layers of CNTs. In some embodiments, the carbide layer includes elongated whisker structures with a nanoscale width. In some embodiments, the whiskers protrude into the layer of CNTs. In some embodiments, the whiskers protrude through an intervening layer (e.g., an oxide layer) into the layer of CNTs. Further details relating to electrodes of this type may be found in U.S. Provisional Patent Application No. 62/061,947 "ELECTRODE FOR ENERGY STORAGE DEVICE USING ANODIZED ALUMINUM" filed Oct. 9, 2014, the entire contents of which are incorporated herein by reference. In an exemplary method for fabricating carbon nanotubes, an apparatus for producing an aligned carbon-nanotube aggregate includes apparatus for synthesizing the aligned carbon-nanotube aggregate on a base material having a catalyst on a surface thereof. The apparatus includes a formation unit that processes a formation step of causing an environment surrounding the catalyst to be an environment of a reducing gas and heating at least either the catalyst or the reducing gas; a growth unit that processes a growth step of synthesizing the aligned carbon-nanotube aggregate by causing the environment surrounding the catalyst to be an environment of a raw material gas and by heating at least either the catalyst or the raw material gas; and a transfer unit that transfers the base material at least from the formation unit to the growth unit. A variety of other methods and apparatus may be employed to provide the aligned carbon-nanotube aggregate.

In some embodiments, material used to form the energy storage media 1 may include material other than pure carbon (and the various forms of carbon as may presently exist or be later devised). That is, various formulations of other materials may be included in the energy storage media 1. More specifically, and as a non-limiting example, at least one binder material may be used in the energy storage media 1, however, this is not to suggest or require addition of other materials (such as the binder material). In general, however, the energy storage media 1 is substantially formed of carbon, and may therefore referred to herein as a "carbonaceous material," as a "carbonaceous layer" and by other similar terms. In short, although formed predominantly of carbon, the energy storage media 1 may include any form of carbon (as well as any additives or impurities as deemed appropriate or acceptable) to provide for desired functionality as energy storage media 1.

In one set of embodiments, the carbonaceous material includes at least about 60% elemental carbon by mass, and in other embodiments at least about 75%, 85%, 90%, 95% or 98% by mass elemental carbon.

Carbonaceous material can include carbon in a variety forms, including carbon black, graphite, and others. The carbonaceous material can include carbon particles, including nanoparticles, such as nanotubes, nanorods, graphene sheets in sheet form, and/or formed into cones, rods, spheres (buckyballs) and the like.

Some embodiments of various forms of carbonaceous material suited for use in energy storage media 1 are provided herein as examples. These embodiments provide robust energy storage and are well suited for use in the electrode 3. It should be noted that these examples are illustrative and are not limiting of embodiments of carbonaceous material suited for use in energy storage media 1.

In general, the term "electrode" refers to an electrical conductor that is used to make contact to another material which is often non-metallic, in a device that may be incorporated into an electrical circuit. Generally, the term "electrode," as used herein, is with reference to the current collector 2 and the additional components as may accompany the current collector 2 (such as the energy storage media 1) to provide for desired functionality (for example, the energy storage media 1 which is mated to the current collector 2 to provide for energy storage and energy transmission). An exemplary process for complimenting the energy storage media 1 with the current collector 2 to provide the electrode 3 is now provided.

Figure 2:
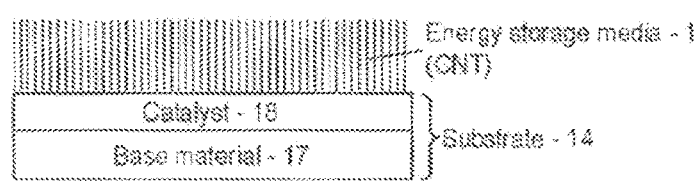
FIG. 2 is a block diagram depicting a plurality of carbon nanotubes (CNT) grown onto a substrate.

Referring now to FIG. 2, a substrate 14 that is host to carbonaceous material in the form of carbon nanotube aggregate (CNT) is shown. In the embodiment shown, the substrate 14 includes a base material 17 with a thin layer of a catalyst 18 disposed thereon.

In general, the substrate 14 is at least somewhat flexible (i.e., the substrate 14 is not brittle), and is fabricated from components that can withstand environments for deposition of the energy storage media 1 (e.g., CNT). For example, the substrate 14 may withstand a high-temperature environment of between about 400 degrees Celsius to about 1,100 degrees Celsius. A variety of materials may be used for the substrate 14, as determined appropriate.

Figure 3:
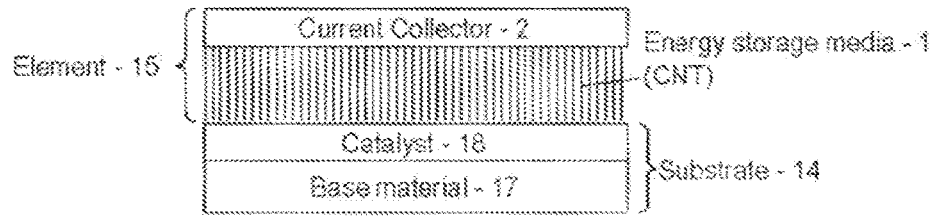
FIG. 3 is a block diagram depicting deposition of a current collector onto the CNT of FIG. 2 to provide an electrode element.

Refer now to FIG. 3. Once the energy storage media 1 (e.g., CNT) has been fabricated on the substrate 14, the current collector 2 may be disposed thereon. In some embodiments, the current collector 2 is between about 0.5 micrometers (pm) to about 25 micrometers (pm) thick. In some embodiments, the current collector 2 is between about 20 micrometers (pm) to about 40 micrometers (pm) thick. The current collector 2 may appear as a thin layer, such as layer that is applied by chemical vapor deposition (CVD), sputtering, e-beam, thermal evaporation or through another suitable technique. Generally, the current collector 2 is selected for its properties such as conductivity, being electrochemically inert and compatible with the energy storage media 1 (e.g., CNT). Some exemplary materials include aluminum, platinum, gold, tantalum, titanium, and may include other materials as well as various alloys.

Once the current collector 2 is disposed onto the energy storage media 1 (e.g., CNT), an electrode element 15 is realized. Each electrode element 15 may be used individually as the electrode 3, or may be coupled to at least another electrode element 15 to provide for the electrode 3.

Figure 4:
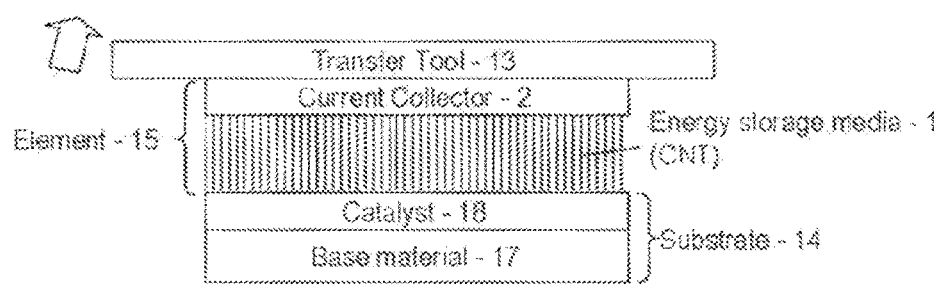
FIG. 4 is a block diagram depicting addition of transfer tape to the electrode element of FIG. 3.

Once the current collector 2 has been fabricated according to a desired standard, post-fabrication treatment may be undertaken. Exemplary post-treatment includes heating and cooling of the energy storage media 1 (e.g., CNT) in a slightly oxidizing environment. Subsequent to fabrication (and optional post-treatment), a transfer tool may be applied to the current collector 2. Reference may be had to FIG. 4.

FIG. 4 illustrates application of transfer tool 13 to the current collector 2. In this example, the transfer tool 13 is a thermal release tape, used in a "dry" transfer method. Exemplary thermal release tape is manufactured by NITTO DENKO CORPORATION of Fremont, Calif. and Osaka, Japan. One suitable transfer tape is marketed as REVAL-PHA. This release tape may be characterized as an adhesive tape that adheres tightly at room temperature and can be peeled off by heating. This tape, and other suitable embodiments of thermal release tape, will release at a predetermined temperature. Advantageously, the release tape does not leave a chemically active residue on the electrode element 15.

In another process, referred to as a "wet" transfer method, tape designed for chemical release may be used. Once applied, the tape is then removed by immersion in a solvent. The solvent is designed to dissolve the adhesive.

In other embodiments, the transfer tool 13 uses a "pneumatic" method, such as by application of suction to the current collector 2. The suction may be applied, for example, through a slightly oversized paddle having a plurality of perforations for distributing the suction. In another example, the suction is applied through a roller having a plurality of perforations for distributing the suction. Suction driven embodiments offer advantages of being electrically controlled and economic as consumable materials are not used as a part of the transfer process. Other embodiments of the transfer tool 13 may be used.

Figure 5:
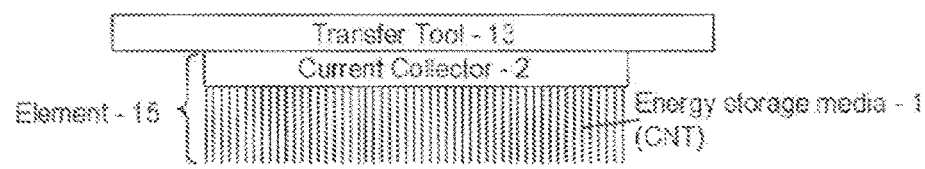
FIG. 5 is a block diagram depicting the electrode element during a transfer process.

Once the transfer tool 13 has been temporarily coupled to the current collector 2, the electrode element 15 is gently removed from the substrate 14 (see FIGS. 4 and 5). The removal generally involves peeling the energy storage media 1 (e.g., CNT) from the substrate 14, beginning at one edge of the substrate 14 and energy storage media 1 (e.g., CNT).

Subsequently, the transfer tool 13 may be separated from the electrode element 15 (see FIG. 6). In some embodiments, the transfer tool 13 is used to install the electrode element 15. For example, the transfer tool 13 may be used to place the electrode element 15 onto the separator 5. In general, once removed from the substrate 14, the electrode element 15 is available for use.

In instances where a large electrode 3 is desired, a plurality of the electrode elements 15 may be mated. Reference may be had to FIG. 7. As shown in FIG. 7, a plurality of the electrode elements 15 may be mated by, for example, coupling a coupling 22 to each electrode element 15 of the plurality of electrode elements 15. The mated electrode elements 15 provide for an embodiment of the electrode 3.

In some embodiments, the coupling 22 is coupled to each of the electrode elements 15 at a weld 21. Each of the welds 21 may be provided as an ultrasonic weld 21. It has been found that ultrasonic welding techniques are particularly well suited to providing each weld 21. That is, in general, the aggregate of energy storage media 1 (e.g., CNT) is not compatible with welding, where only a nominal current collector, such as disclosed herein is employed. As a result, many techniques for joining electrode elements 15 are disruptive, and damage the element 15. However, in other embodiments, other forms of coupling are used, and the coupling 22 is not a weld 21.

The coupling 22 may be a foil, a mesh, a plurality of wires or in other forms. Generally, the coupling 22 is selected for properties such as conductivity and being electrochemically inert. In some embodiments, the coupling 22 is fabricated from the same material(s) as are present in the current collector 2.

In some embodiments, the coupling 22 is prepared by removing an oxide layer thereon. The oxide may be removed by, for example, etching the coupling 22 before providing the weld 21. The etching may be accomplished, for example, with potassium hydroxide (KOH). The electrode 3 may be used in a variety of embodiments of the ultracapacitor 10. For example, the electrode 3 may be rolled up into a "jelly roll" type of energy storage.

The separator 5 may be fabricated from various materials, embodiments, the separator 5 is non-woven glass. The separator 5 may also be fabricated from fiberglass, ceramics and fluoro-polymers, such as polytetrafluoroethylene (PTFE), commonly marketed as TEFLON' by DuPont Chemicals of Wilmington, Del. For example, using non-woven glass, the separator 5 can include main fibers and binder fibers each having a fiber diameter smaller than that of each of the main fibers and allowing the main fibers to be bonded together.

For longevity of the ultracapacitor 10 and to assure performance at high temperature, the separator 5 should have a reduced amount of impurities and in particular, a very limited amount of moisture contained therein. In particular, it has been found that a limitation of about 200 ppm of moisture is desired to reduce chemical reactions and improve the lifetime of the ultracapacitor 10, and to provide for good performance in high temperature applications. Some embodiments of materials for use in the separator 5 include polyamide, polytetrafluoroethylene (PTFE), polyether-ether-ketone (PEEK), aluminum oxide ($Al_2O_3$), fiberglass, glass-reinforced plastic (GRP), polyester, nylon, and polyphenylene sulfide (PPS).

In general, materials used for the separator 5 are chosen according to moisture content, porosity, melting point, impurity content, resulting electrical performance, thickness, cost, availability and the like. In some embodiments, the separator 5 is formed of hydrophobic materials.

Accordingly, procedures may be employed to ensure excess moisture is eliminated from each separator 5. Among other techniques, a vacuum drying procedure may be used. A selection of materials for use in the separator 5 is provided in Table 1. Some related performance data is provided in Table 2.

TABLE 1

Separator Materials

| Material | Melting point | PPM $H_2O$ unbaked | PPM $H_2O$ baked | Vacuum dry procedure |
|---|---|---|---|---|
| Polyamide | 256° C. | 2052 | 20 | 180° C. for 24 h |
| Polytetrafluoro-ethylene, PTFE | 327° C. | 286 | 135 | 150° C. for 24 h |
| Polyether ether ketone, PEEK | 256° C. | 130 | 50 | 215° C. for 12 h |
| Aluminum Oxide, $Al_2O_3$ | 330° C. | 1600 | 100 | 215° C. for 24 h |
| Fiberglass (GRP) | 320° C. | 2000 | 167 | 215° C. for 12 h |

TABLE 2

Separator Performance Data

| Material | pm | Porosity | ESR $1^{st}$ test ($\Omega$) | ESR $2^{nd}$ test ($\Omega$) | After 10 CV |
|---|---|---|---|---|---|
| Polyamide | 42 | Nonwoven | 1.069 | 1.069 | 1.213 |
| PEEK | 45 | Mesh | 1.665 | 1.675 | 2.160 |
| PEEK 60% | 25 | 60 | 0.829 | 0.840 | 0.883 |
| Fiberglass (GRP) | 160 | Nonwoven | 0.828 | 0.828 | 0.824 |
| Aluminum Oxide, $Al_2O_3$ | 25 | — | 2.400 | 2.400 | 2.400 |

In order to collect data for Table 2, two electrodes 3, based on carbonaceous material, were provided. The electrodes 3 were disposed opposite to and facing each other. Each of the separators 5 were placed between the electrodes 3 to prevent a short circuit. The three components were then wetted with electrolyte 6 and compressed together. Two aluminum bars and PTFE material was used as an external structure to enclose the resulting ultracapacitor 10.

The ESR $1^{st}$ test and ESR $2^{nd}$ test were performed with the same configuration one after the other. The second test was run five minutes after the first test, leaving time for the electrolyte 6 to further soak into the components.

Note that, in some embodiments, the ultracapacitor 10 does not require or include the separator 5. For example, in some embodiments, such as where the electrodes 3 are assured of physical separation by a geometry of construction, it suffices to have electrolyte 6 alone between the electrodes 3. More specifically, and as an example of physical separation, one such ultracapacitor 10 may include electrodes 3 that are disposed within a housing such that separation is assured on a continuous basis. A bench-top example would include an ultracapacitor 10 provided in a beaker.

The ultracapacitor 10 may be embodied in several different form factors (i.e., exhibit a certain appearance). Examples of potentially useful form factors include, a cylindrical cell, an annular or ring-shaped cell, a flat prismatic cell or a stack of flat prismatic cells including a box-like cell, and a flat prismatic cell that is shaped to accommodate a particular geometry such as a curved space. A cylindrical form factor may be most useful in conjunction with a cylindrical tool or a tool mounted in a cylindrical form factor. An annular or ring-shaped form factor may be most useful in conjunction with a tool that is ring-shaped or mounted in a ring-shaped form factor. A flat prismatic cell shaped to accommodate a particular geometry may be useful to make efficient use of "dead space" (i.e., space in a tool or equipment that is otherwise unoccupied, and may be generally inaccessible).

While generally disclosed herein in terms of a "jelly roll" application (i.e., a storage cell 12 that is configured for a cylindrically shaped housing 7), the rolled storage cell 23 may take any form desired. For example, as opposed to rolling the storage cell 12, folding of the storage cell 12 may be performed to provide for the rolled storage cell 23. Other types of assembly may be used. As one example, the storage cell 12 may be a flat cell, referred to as a "coin type" of cell. Accordingly, rolling is merely one option for assembly of the rolled storage cell 23. Therefore, although discussed herein in terms of being a "rolled storage cell 23", this is not limiting. It may be considered that the term "rolled storage cell 23" generally includes any appropriate form of packaging or packing the storage cell 12 to fit well within a given design of the housing 7.

Various forms of the ultracapacitor 10 may be joined together. The various forms may be joined using known techniques, such as welding contacts together, by use of at least one mechanical connector, by placing contacts in electrical contact with each other and the like. A plurality of the ultracapacitors 10 may be electrically connected in at least one of a parallel and a series fashion.

Figure 8:
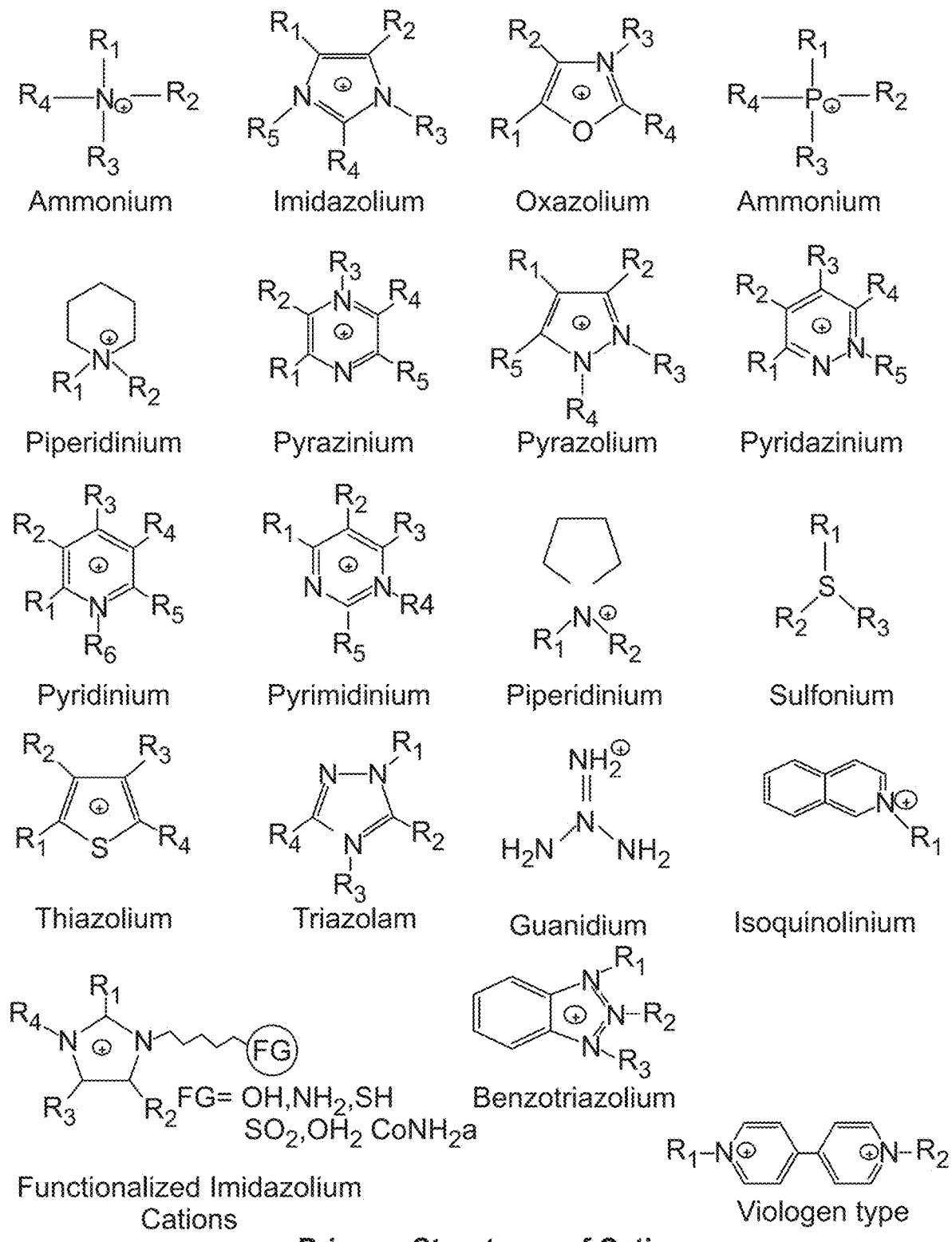
FIG. 8 depicts embodiments of primary structures for cations that may be included in the exemplary ultracapacitor.

The electrolyte 6 includes a pairing of cations 9 and anions 11 and may include a solvent or other additives. The electrolyte 6 may be referred to as a "ionic liquid" as appropriate. Various combinations of cations 9, anions 11 and solvent may be used. In the exemplary ultracapacitor 10, the cations 9 may include at least one of tetrabutylammonium, 1-(3-Cyanopropyl)-3-methylimidazolium, 1,2-Dimethyl-3-propylimidazolium, 1,3-Bis(3-cyanopropyl)imidazolium, 1,3-Diethoxyimidazolium, 1-Butyl-1-methylpiperidinium, 1-Butyl-2,3-dimethylimidazolium, 1-Butyl-3-methylimidazolium, 1-Butyl-4-methylpyridinium, 1-Butylpyridinium, 1-Decyl-3-methylimidazolium, 1-Ethyl-3-methylimidazolium, 1-Pentyl-3-methylimidazolium, 1-Hexyl-3-methylimidazolium, 3-Methyl-1-propylpyridinium, and combinations thereof as well as other equivalents as deemed appropriate. Additional exemplary cations 9 include ammonium, imidazolium, pyrazinium, piperidinium, pyridinium, pyrimidinium, and pyrrobdinium (structures of which are depicted in FIG. 8). In the exemplary ultracapacitor 10, the anions 11 may include at least one of bis(trifluoromethanesulfonyl)imide, tris(trifluoromethanesulfonyl)methide, dicyanamide, tetrafluoroborate, tetra(cyano)borate, hexafluorophosphate, tris(pentafluoroethyl)trifluorophosphate, trifluoromethanesulfonate, bis(pentafluoroethanesulfonyl)imide, thiocyanate, trifluoro(trifluoromethyl)borate, and combinations thereof as well as other equivalents as deemed appropriate.

The solvent may include acetonitrile, amides, benzonitrile, butyrolactone, cyclic ether, dibutyl carbonate, diethyl carbonate, diethylether, dimethoxyethane, dimethyl carbonate, dimethylformamide, dimethylsulfone, dioxane, dioxolane, ethyl formate, ethylene carbonate, ethylmethyl carbonate, lactone, linear ether, methyl formate, methyl propionate, methyltetrahydrofuran, nitrobenzene, nitromethane, n-methylpyrrobdone, propylene carbonate, sulfolane, sulfone, tetrahydrofuran, tetramethylene sulfone, thiophene, ethylene glycol, diethylene glycol, triethylene glycol, polyethylene glycols, carbonic acid ester, tricyanohexane, any combination thereof or other material(s) that exhibit appropriate performance characteristics.

In certain embodiments, electrolyte 6 may include one or more additional additives, e.g., gelling agents (e.g., silica or silicates), other inorganic or ceramic powders (e.g., alumina, titania, magnesia, aluminosilicates, or titanates such as BaTiOs), clays (e.g., bentonite or montmorillonite and their derivatives), solvents, polymeric materials (including polymeric microbeads), plasticizers, and combinations thereof. In some embodiments, the additives decrease the rate of degradation of the ionic liquid when the ultracapacitor is operating. Porous inorganic oxides are useful additives for providing a gel electrolyte. Exemplary additives include silica, silicates, alumina, titania, magnesia, aluminosilicates, zeolites, or titanates. For example, an electrolyte according to one embodiment includes an ionic liquid, e.g., one of the ionic liquids described herein, such as an ionic liquid including a cation, as described herein, and an anion, as described herein, and fumed silica as a gelling agent, which are mixed in a ratio to produce an ionic liquid gel. Certain embodiments may employ a different form of silica as a gelling agent, e.g., silica gel, mesoporous silica, or a microcrystalline or polycrystalline form of silica. The amount of the additive will vary according to the nature of the application and is typically in the range of about 2 wt. % to about 20 wt. %, e.g., about 5 wt. % to about 10 wt. %, in the range of potentially as much as about 50 wt. %, of the electrolyte. For example, FIG. 50 demonstrates the performance of two ultracapacitors with different amounts (i.e., 6% vs. 8%) of silica of two different types (i.e., 7 nm vs. 14 nm), comparing the performance of those ultracapacitors at 200° C. to an ultracapacitor that employs an ionic liquid without an additive. The lifetime of the ultracapacitor with 6% of 7 nm silica was 650 hours and the lifetime of the ultracapacitor with 8% of 14 nm silica was 150 hours, whereas the lifetime of the ultracapacitor without any silica was 4 hours, wherein end of lifetime is determine as either a 50% increase in the ESR or a 50% decrease in the capacitance of the ultracapacitor. In these embodiments, impurities were also minimized in the ultracapacitor cell as described above, specifically less than 1,000 ppm moisture, less than 500 ppm moisture, and preferably less than 200 ppm moisture. In addition, other impurities were minimized in these embodiments as described above, particularly halide impurities and organic impurities.

Figure 50:
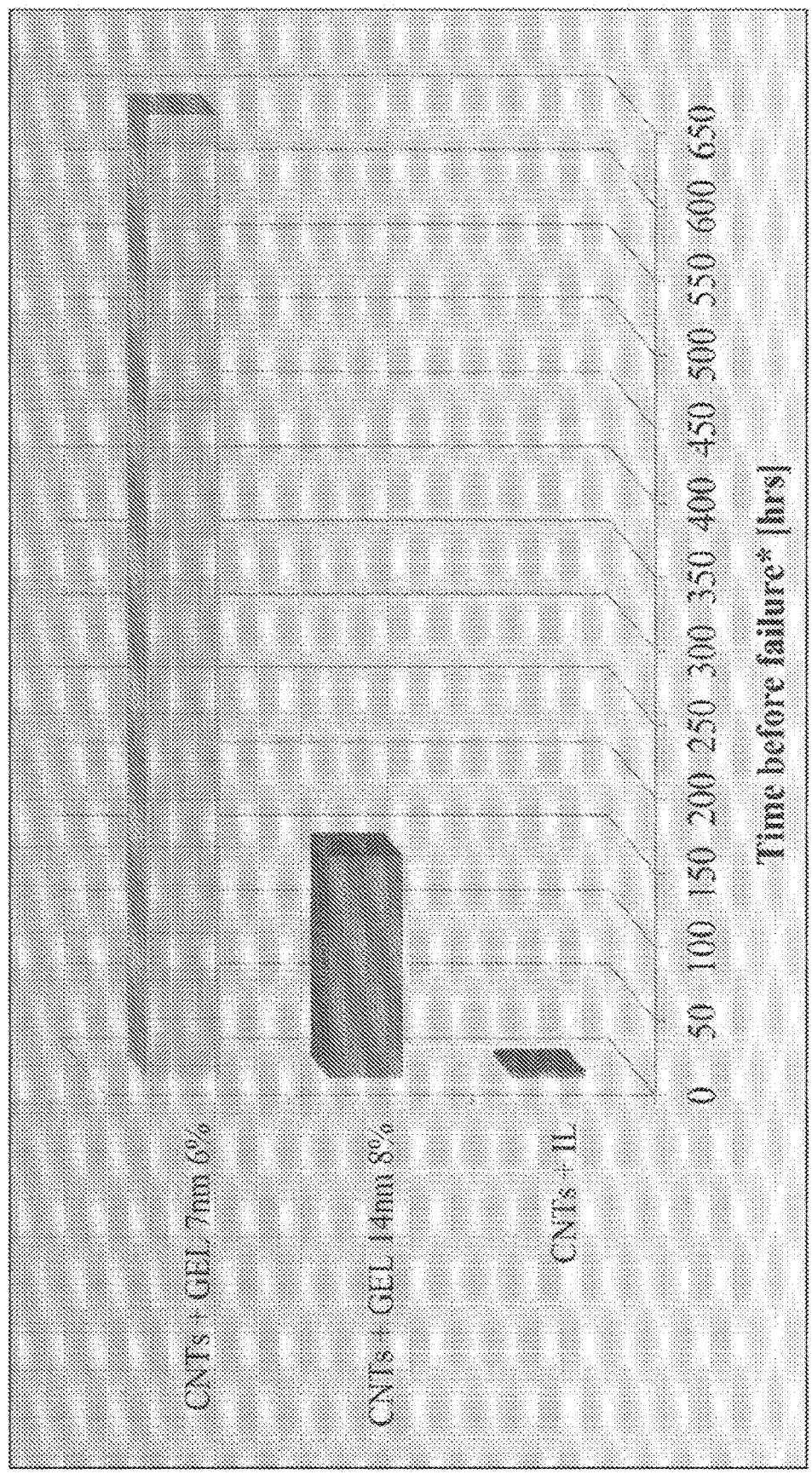
FIG. 50 is a graph comparing performance, in terms of the lifetime, of ultracapacitors that employ a gel electrolyte including silica and an ionic liquid and an ultracapacitor with an ionic liquid electrolyte.
Figure 51:
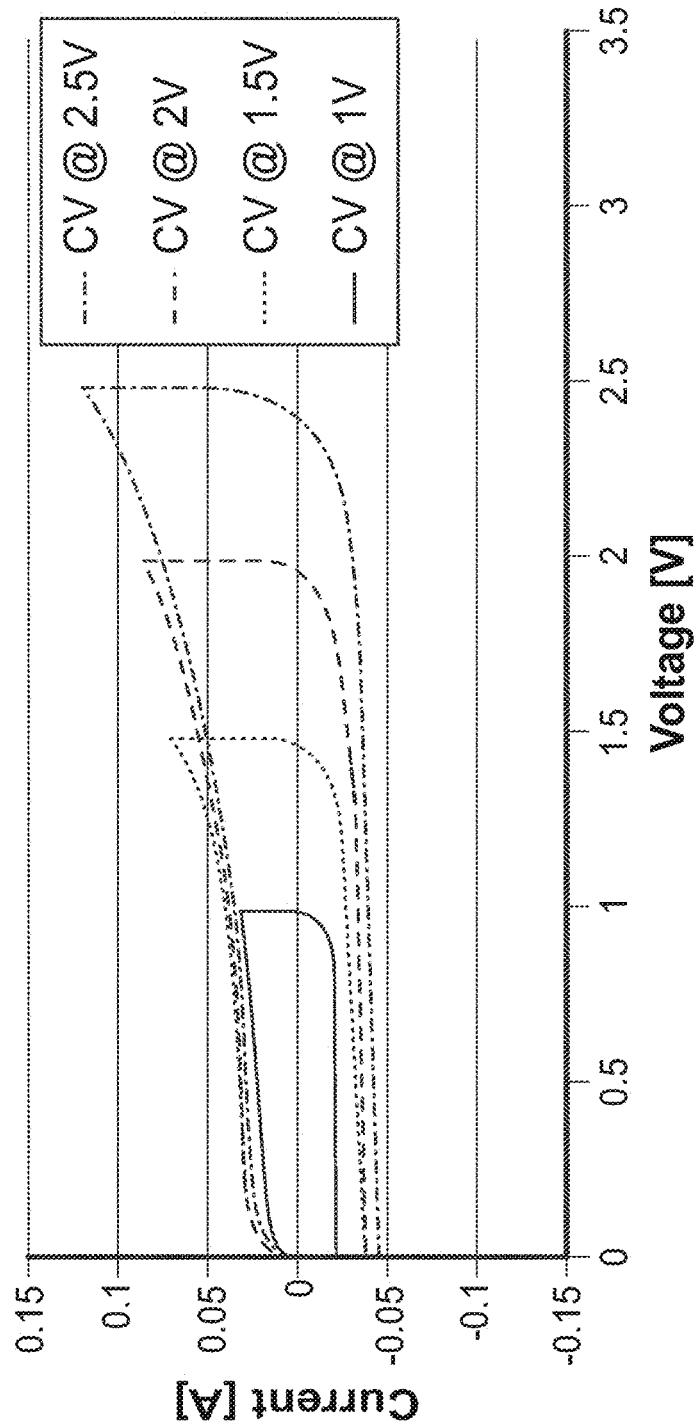
FIG. 51 is a graph depicting the cyclic voltammetry performance at 200° C. of an ultracapacitor that employs a gel electrolyte including silica and an ionic liquid.
Figure 53:
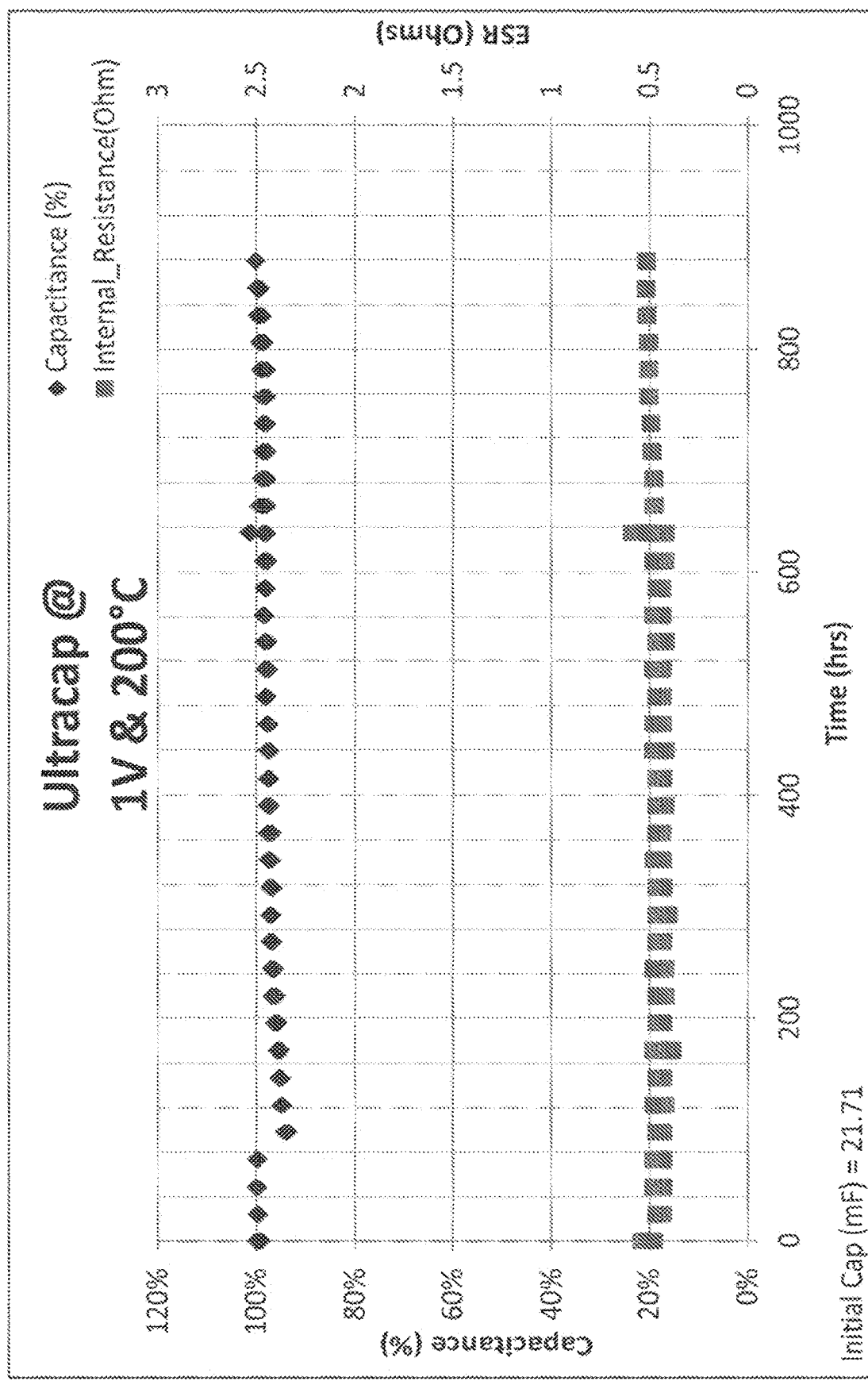
FIG. 53 is a graph depicting performance of an ultracapacitor that employs a gel electrolyte including silica and an ionic liquid in a standard button cell, wherein the ultracapacitor was held at 200° C. and IV for an extended period of time.
Figure 54:
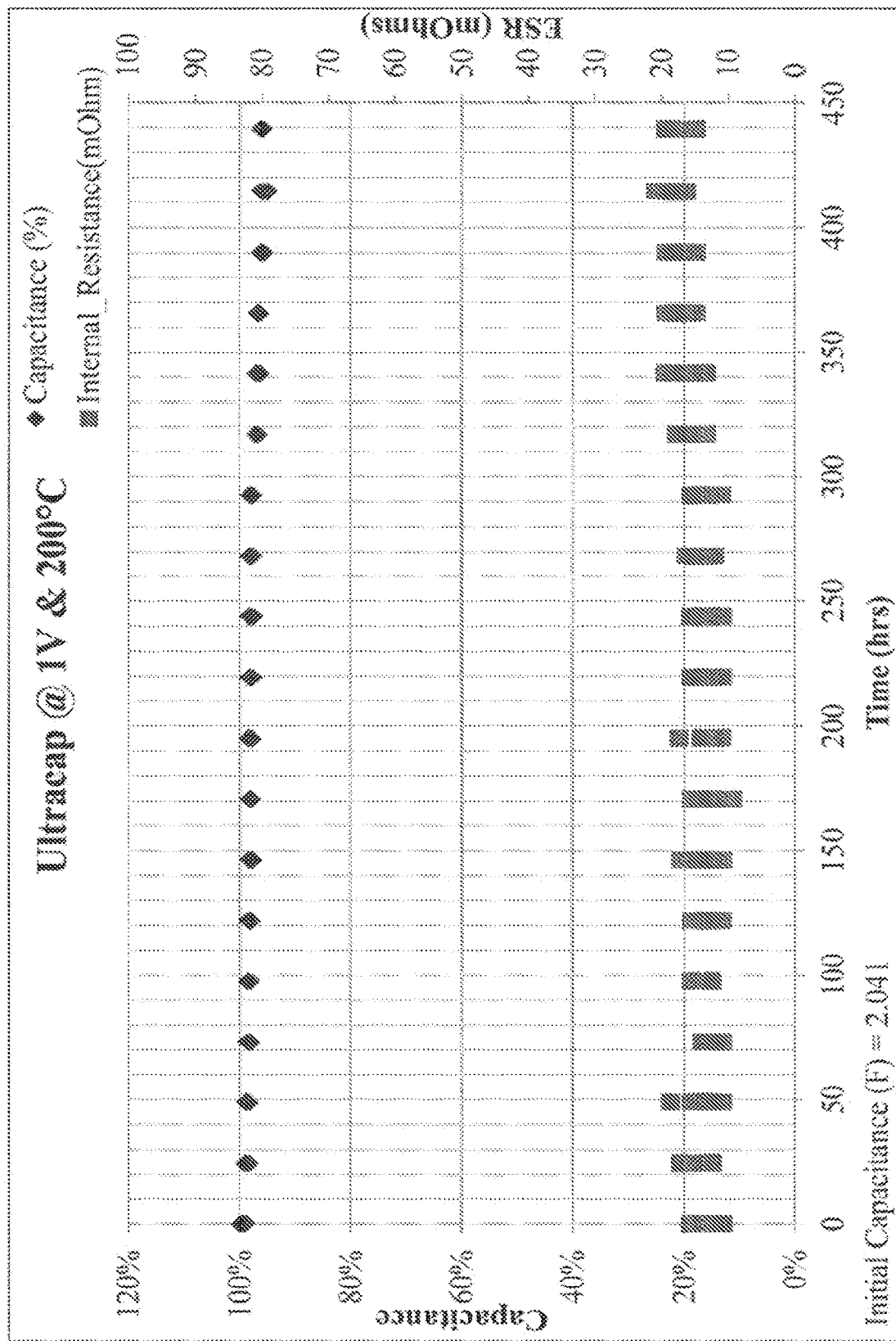
FIG. 54 is a graph depicting performance of an ultracapacitor that employs a gel electrolyte including silica and an ionic liquid in a standard AA cell, wherein the ultracapacitor was held at 200° C. and IV for an extended period of time.
Figure 56:
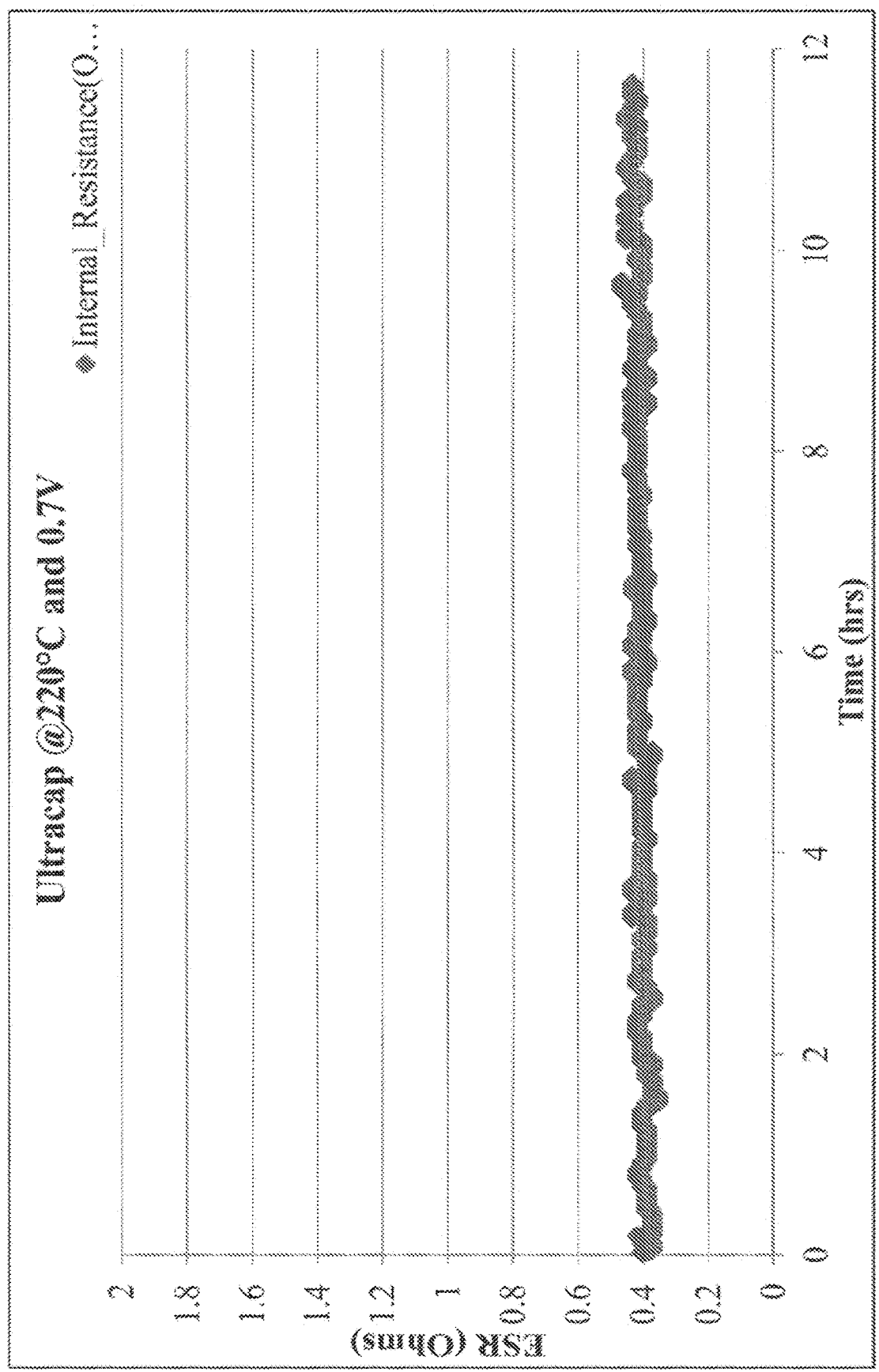
FIG. 56 is a graph depicting performance of an ultracapacitor that employs a gel electrolyte including silica and an ionic liquid in a standard AA cell, wherein the ultracapacitor was held at 220° C. and 0.7V for an extended period of time.
Figure 57:
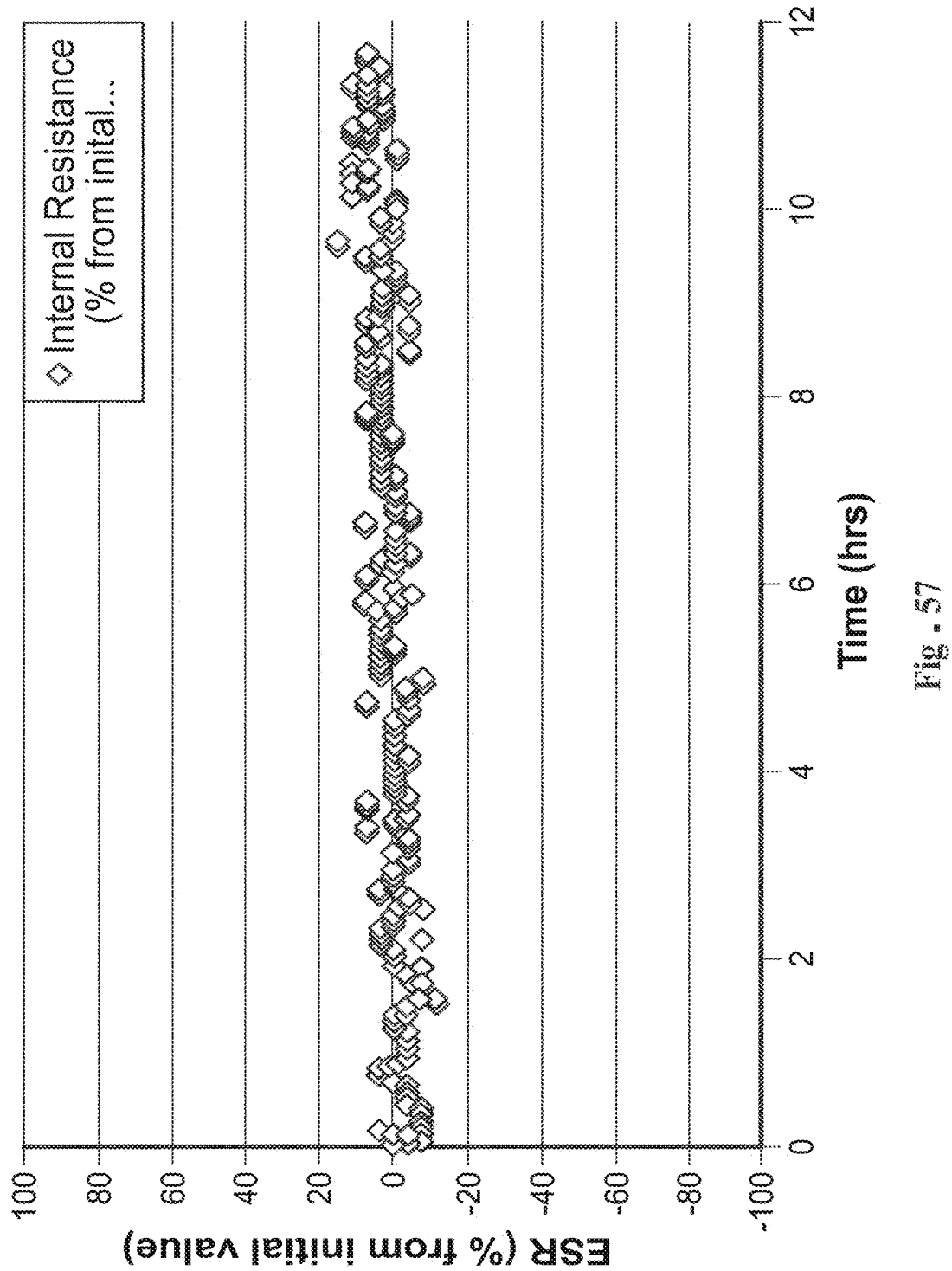
FIG. 57 is a graph depicting performance of an ultracapacitor that employs a gel electrolyte including silica and an ionic liquid in a standard AA cell, wherein the ultracapacitor was held at 220° C. and 0.7V for an extended period of time.

In certain embodiments, an ultracapacitor including a gel electrolyte is disclosed. As shown in FIG. 50, such ultracapacitors are able to perform better than a comparable ultracapacitor employing a liquid electrolyte. Such ultracapacitors can also operate stably at high temperatures and high voltages. FIG. 51 is a graph depicting the cyclic voltammetry performance between 0V and 2.5V at 200° C. of an ultracapacitor that employs a gel electrolyte including silica and an ionic liquid. In addition, such ultracapacitors can operate under such conditions for an extended lifetime. As shown FIGS. 53 and 54, ultracapacitors including gel electrolytes showed no signs of performance degradation after nearly 450 or 900 hours, respectively, of operational time at IV and 200° C. As shown in FIGS. 56 and 57, another ultracapacitor performed similarly over nearly 12 hours at 0.7V and 220° C. Thus, an ultracapacitor is disclosed that is capable of maintaining its operational performance at temperatures in excess of 200° C. and up to IV for more than 500 hours, particularly up to 1000 hours or higher.

Figure 60:
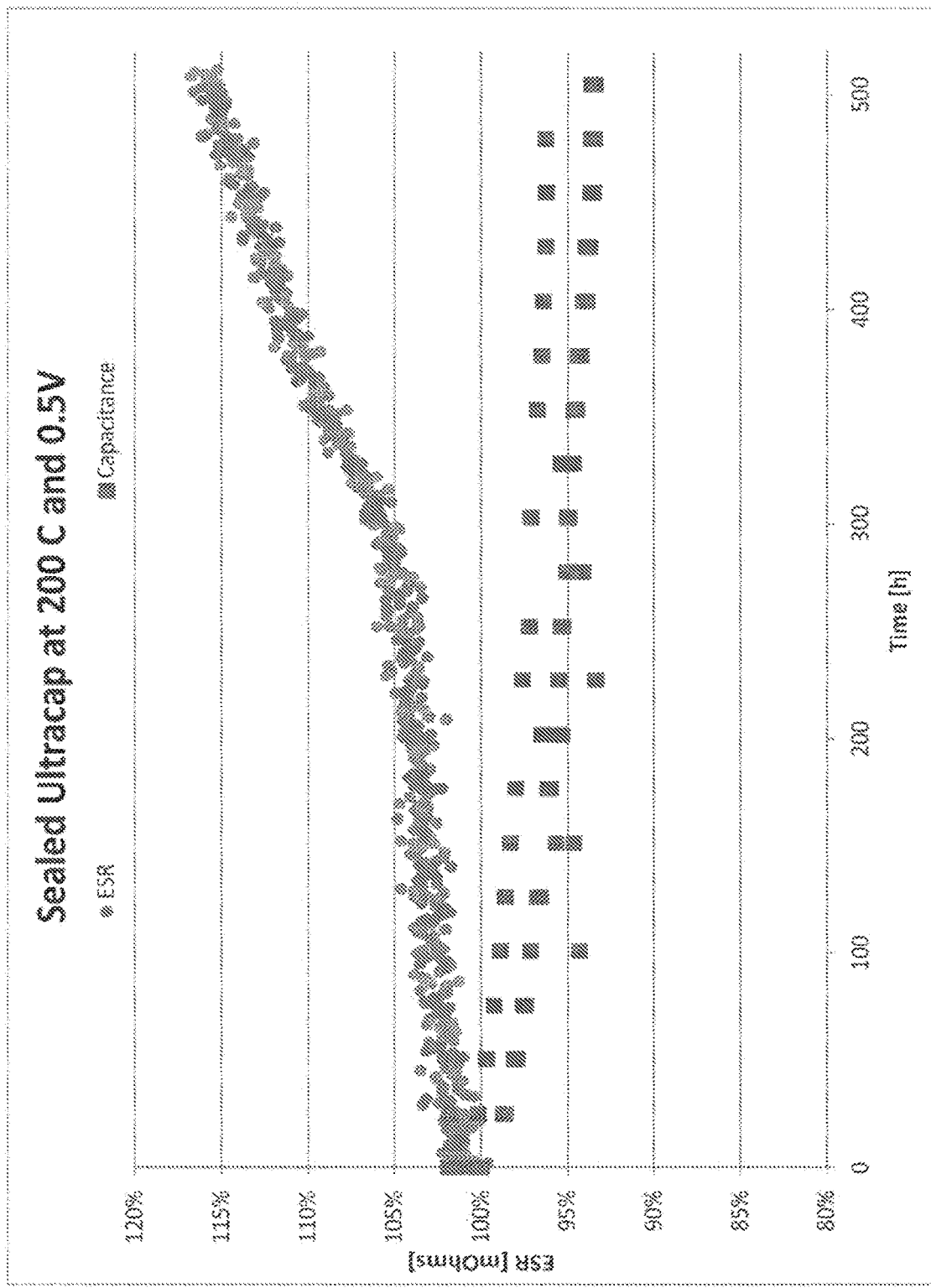
FIGS. 60-62 are graphs depicting performance of ultracapacitors that employ gel electrolytes including silica and an ionic liquid in a standard AA cell, wherein the ultracapacitor was held at 200° C. and 0.5V for an extended period of time.
Figure 61:
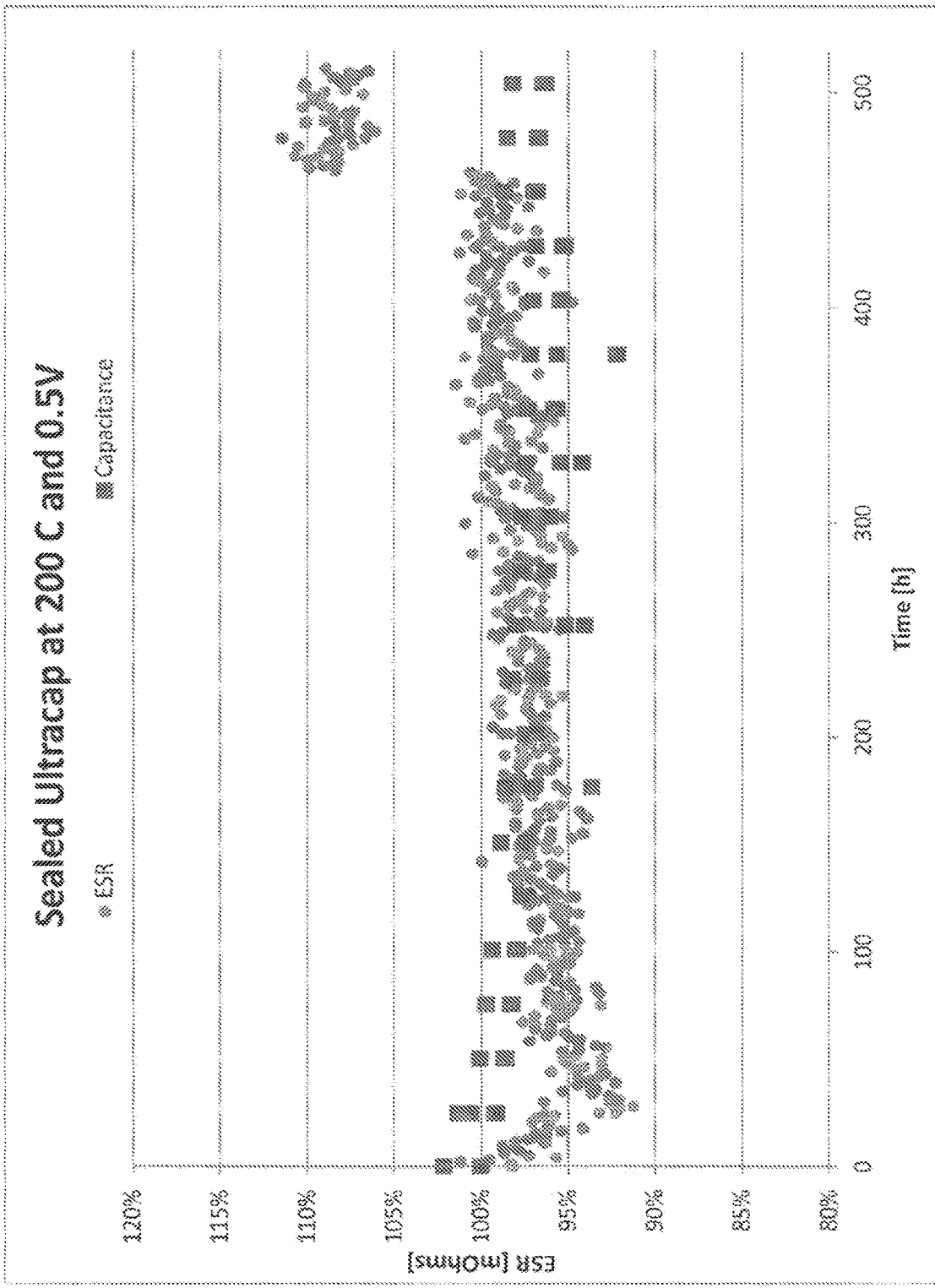
Figure 62:
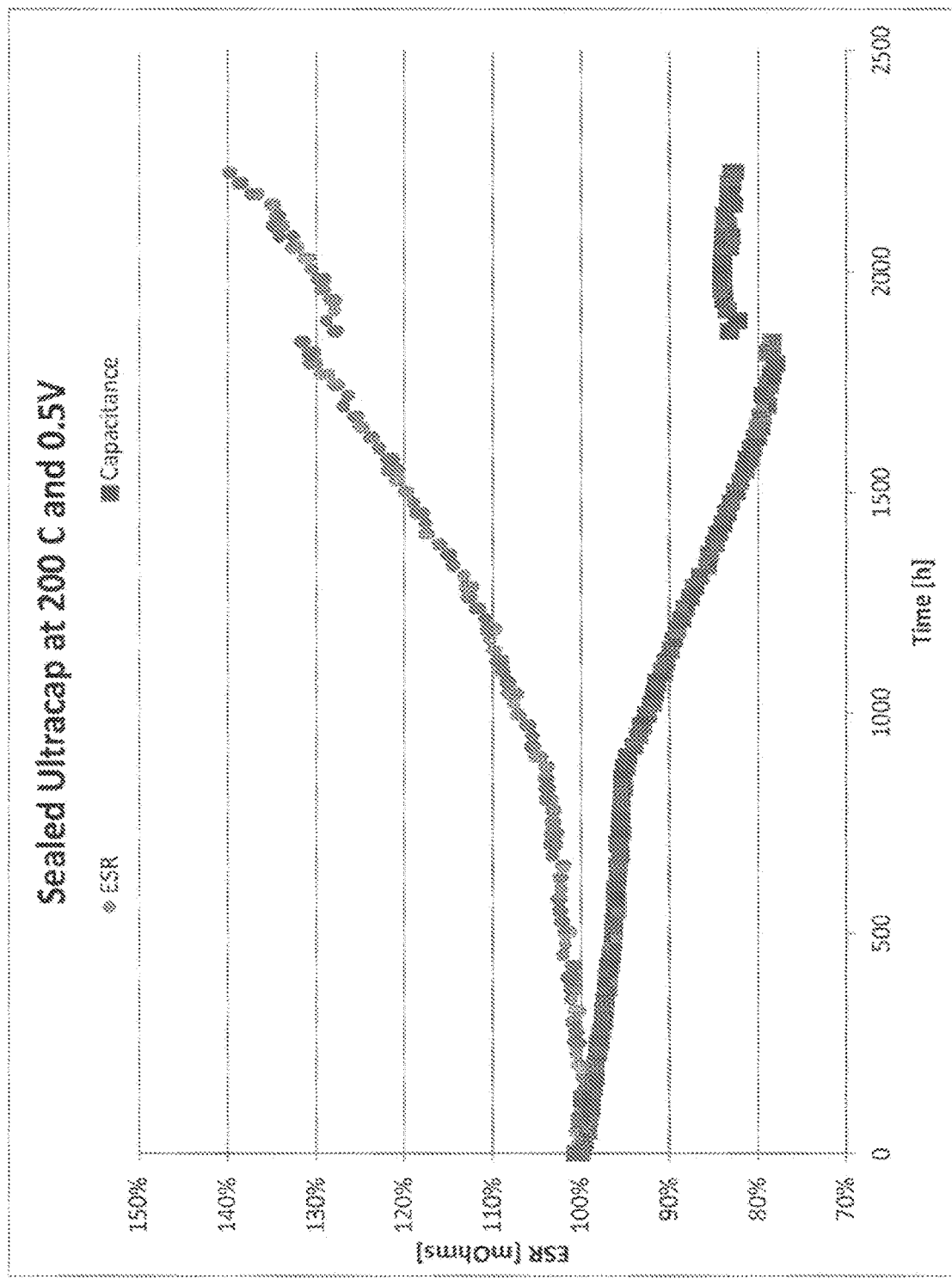

As shown in FIGS. 60-62, another ultracapacitor performed similarly. In one embodiment, an ultracapacitor, including another gel electrolyte having an ionic liquid and about 4-5% silica gel (14 nm), CNT-based electrodes, a PTFE separator, and two hermetic seals around the positive and negative terminals, showed little performance degradation after over 500 hours of charge-discharge cycling at a maximum voltage of 0.5V and average temperature above 200° C. The ESR of the ultracapacitors increased by 8-15% during this test, and the capacitance of the ultracapacitors decreased by 3-7% during this test, which was stopped after almost 600 hours. The following test procedure was used to perform these tests:

1. Place each ultracapacitor inside a BlueM 146 series oven and connect each cell to a Keithley 2400 Source Measurement Unit (SMU).
2. Perform a connection check by running a single charge/discharge cycle up the operating voltage ($V_{op}$ e.g., 0.5V), at constant current of +100 mA for charge and −100 mA for discharge.
3. Raise the temperature in the oven to approximately 200° C. Wait 20 minutes for the ultracapacitor to reach uniform temperature.
4. Open circuit for 10 seconds.
5. Charge the ultracapacitor to $V_{op}$. The SMU is set in voltage source mode with compliance of 100 mA.
6. Hold the ultracapacitor at $V_{op}$ for 30 seconds.
7. Discharge the ultracapacitor at −100 mA for 500 milliseconds. Record the voltage ($V_i$).
8. Wait 10 milliseconds and record the voltage ($V_2$). Calculate the ESR based on the difference in the voltage, i.e., ESR=$[V_i-V_2]/0.1$ A.
9. Recharge the ultracapacitor to $V_{op}$. The SMU is set in voltage source mode with compliance of 100 mA.
10. Hold the ultracapacitor at $V_{op}$ for 30 seconds.
11. Discharge the ultracapacitor at −100 mA down to 0.01V. Set SMU in voltage mode with voltage of 0.01V and compliance of 100 mA. Monitor and record the voltage and current during the discharge process at maximum sampling rate to calculate the stored energy.
12. Hold rest for 10 seconds.
13. Repeat steps 5-12 two times (two charge/discharge cycles).
14. Charge the ultracapacitor to $V_{op}$. The SMU is set in voltage source mode with compliance of 100 mA.
15. Hold the ultracapacitor at $V_{op}$ for 60 minutes.
16. Discharge the ultracapacitor at −100 mA down to 0.01V. Set SMU in voltage mode with voltage of 0.01V and compliance of 100 mA.
17. Repeat steps 4-16 until the end of the test.

As shown in FIG. 62, a nearly identical ultracapacitor cell was subjected to nearly identical conditions and has maintained its ESR and capacitance for over 2200 hours (i.e., over 90 days) within typical tolerance limits (e.g., less than 100% increase in ESR and less than 50% decrease in capacitance). Certain abrupt changes in the ESR values that appear in FIGS. 60-62 are believed to have been caused by external changes in the ohmic resistance, as opposed to internal changes in the ultracapacitors cells.

Figure 52:
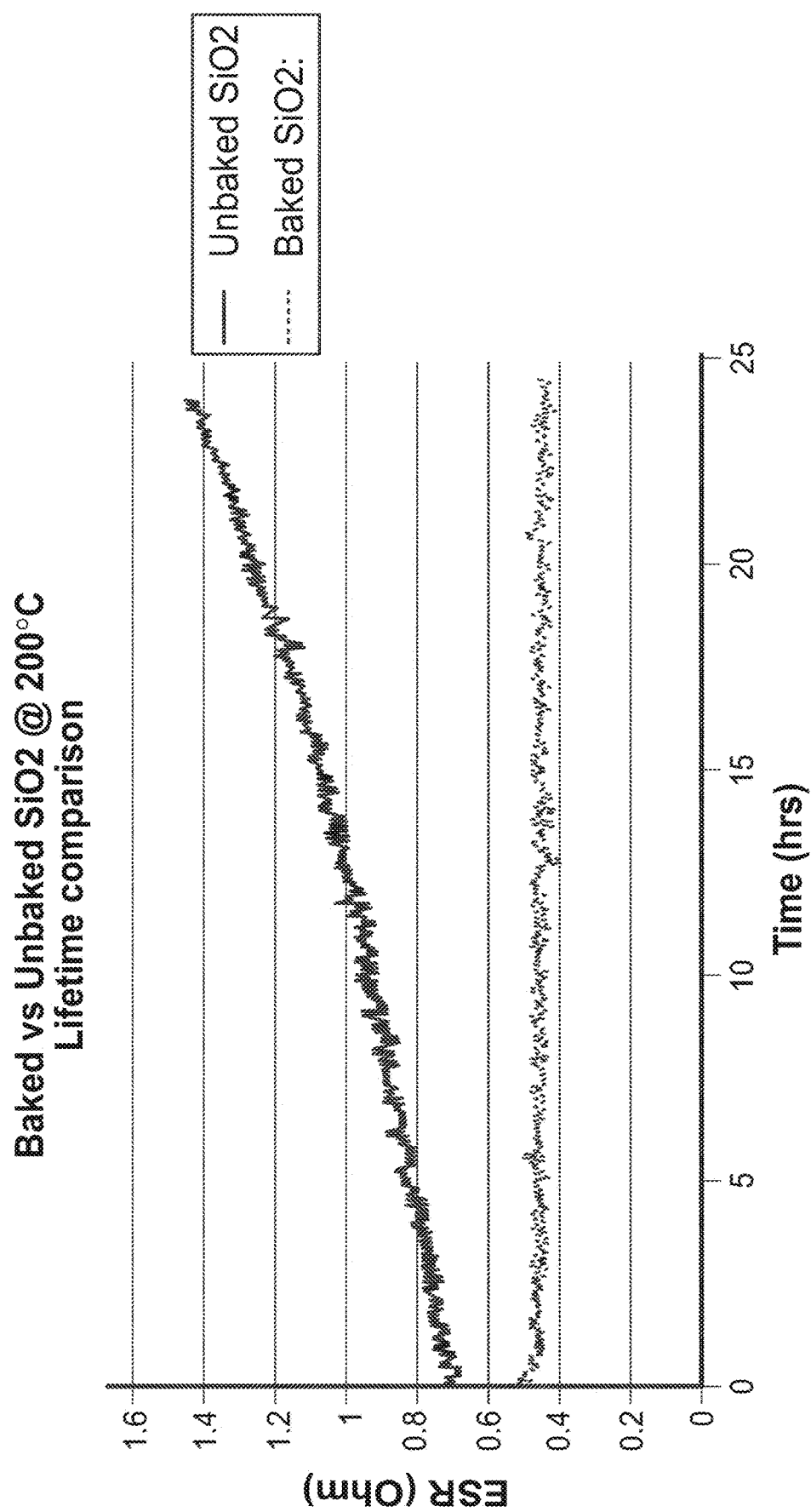
FIG. 52 is graph comparing the performance of ultracapacitors that employ a gel electrolyte including silica and an ionic liquid, wherein one ultracapacitor contained unbaked silica and one ultracapacitor contained baked silica.

As discussed herein, water and other contaminants may impede ultracapacitor performance. In certain embodiments, the additives described herein are dried or otherwise purified prior to incorporating them in an ultracapacitor or ultracapacitor electrolyte. For example, FIG. 52 is graph comparing the performance of ultracapacitors that employ a gel electrolyte including silica and an ionic liquid, wherein one ultracapacitor contained unbaked silica and one ultracapacitor contained baked silica. The moisture content of the electrolyte including an additive, e.g., a gelling agent, should be comparable to the ranges described above, e.g., less than about 1000 ppm, preferably less than about 500 ppm.

Figure 55:
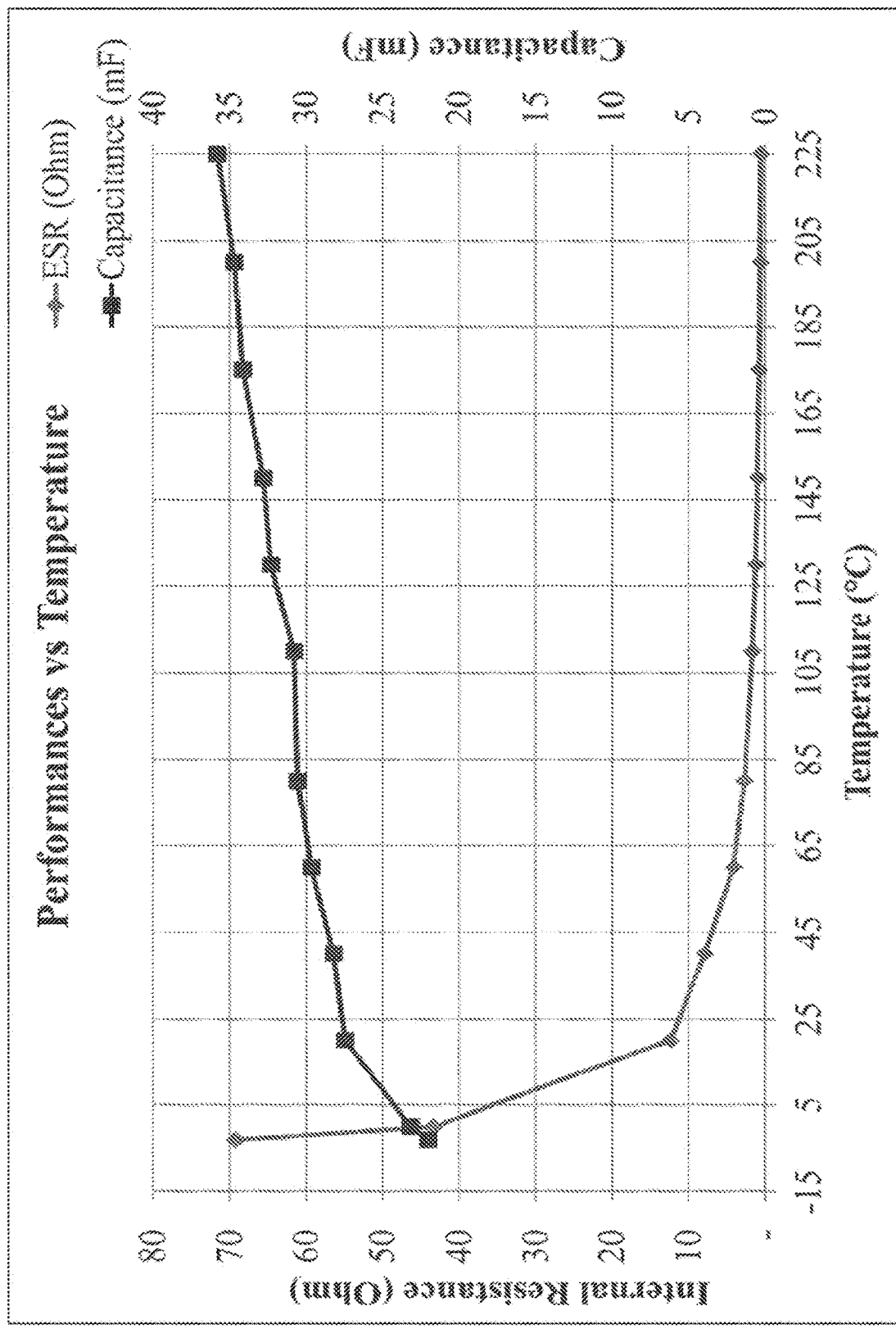
FIG. 55 is a graph depicting performance at various temperatures ranging from −5° C. to 225° C. of an ultracapacitor that employs a gel electrolyte including silica and an ionic liquid.

In certain embodiments, ultracapacitors including a gel electrolyte operate over a wide temperature range. FIG. 55 is a graphic depicting performance at various temperatures ranging from −5° C. to 225° C. of an ultracapacitor that employs a gel electrolyte including silica and an ionic liquid.

Figure 58:
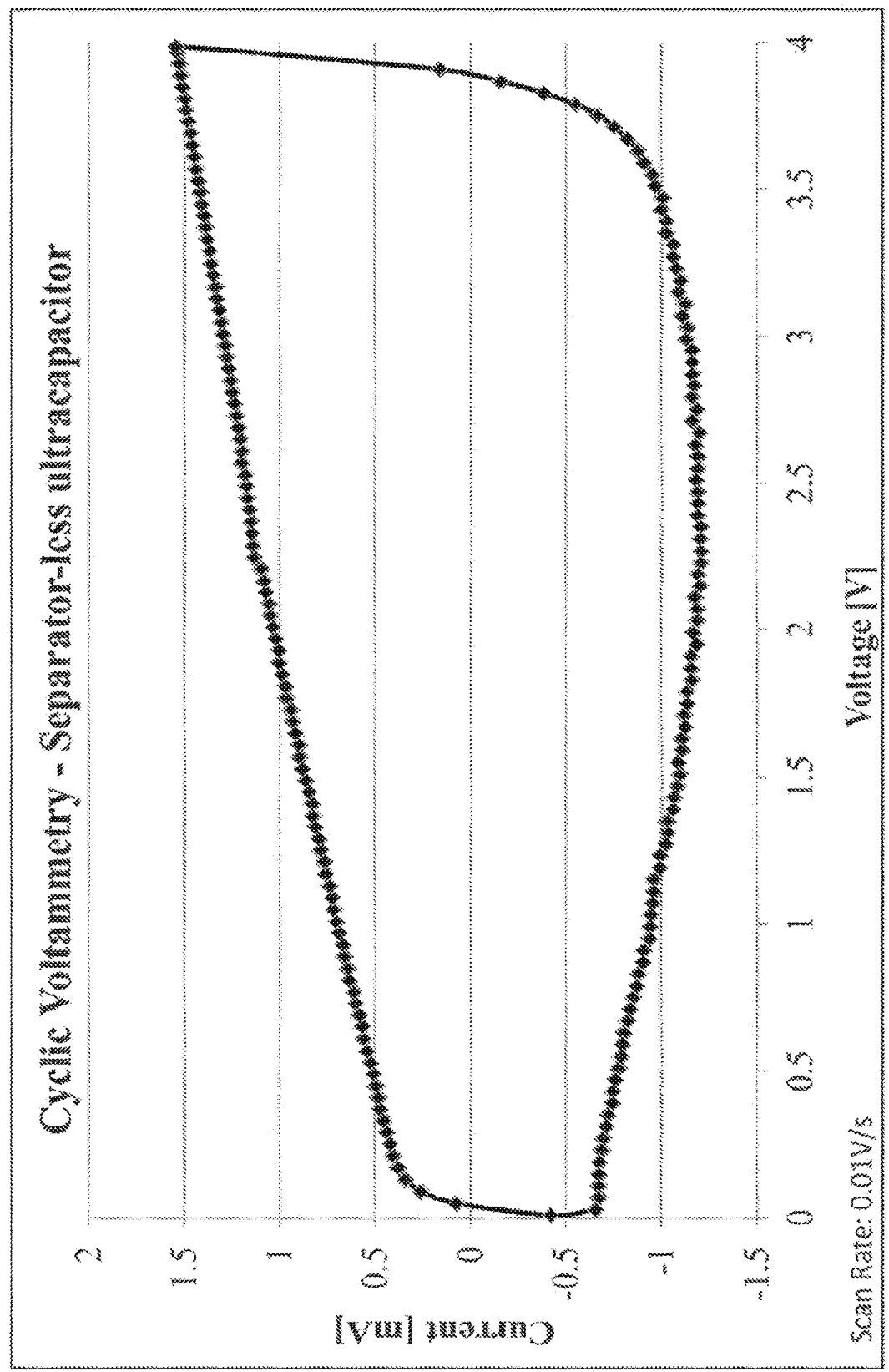
FIG. 58 is a graph depicting the cyclic voltammetry performance of an ultracapacitor that employs a gel electrolyte including silica and an ionic liquid without a separator.

In certain embodiments, ultracapacitors including a gel electrolyte do not require a separator. FIG. 58 is a graph depicting the cyclic voltammetry performance from 0V to 4V of such a separator-less ultracapacitor that employs a gel electrolyte including silica and an ionic liquid selected from those described herein.

A suitable concentration of additive will be determined based on the desired properties of the electrolyte and/or ultracapacitor, e.g., the viscosity of the electrolyte or the leakage current, capacitance, or ESR of the ultracapacitor. The specific surface area (SSA) also affects the properties of the electrolyte and the resultant ultracapacitor. Generally, a high SSA is desirable, e.g., above about 100 $m^2/g$, above about 200 $m^2/g$, about 400 $m^2/g$, about 800 $m^2/g$, or about 1000 $m^2/g$. The viscosity of the electrolyte including the additive affects the performance of the resultant ultracapacitor and must be controlled by adding an appropriate amount of the additive.

In certain embodiments, where an appropriate gel-based electrolyte is employed, a separator-less ultracapacitor 10 can be prepared, as shown in FIG. 1B. A separator-less ultracapacitor 10 of FIG. 1B is prepared in a manner analogous a typical ultracapacitor having a separator, e.g., an ultracapacitor of FIG. 1A, except that the gel-based electrolyte is of a sufficient stability that a separator is not required. FIG. 58 depicts the cyclic voltammetry performance of such a separator-less ultracapacitor employing a silica-based gel electrolyte.

Figure 59:
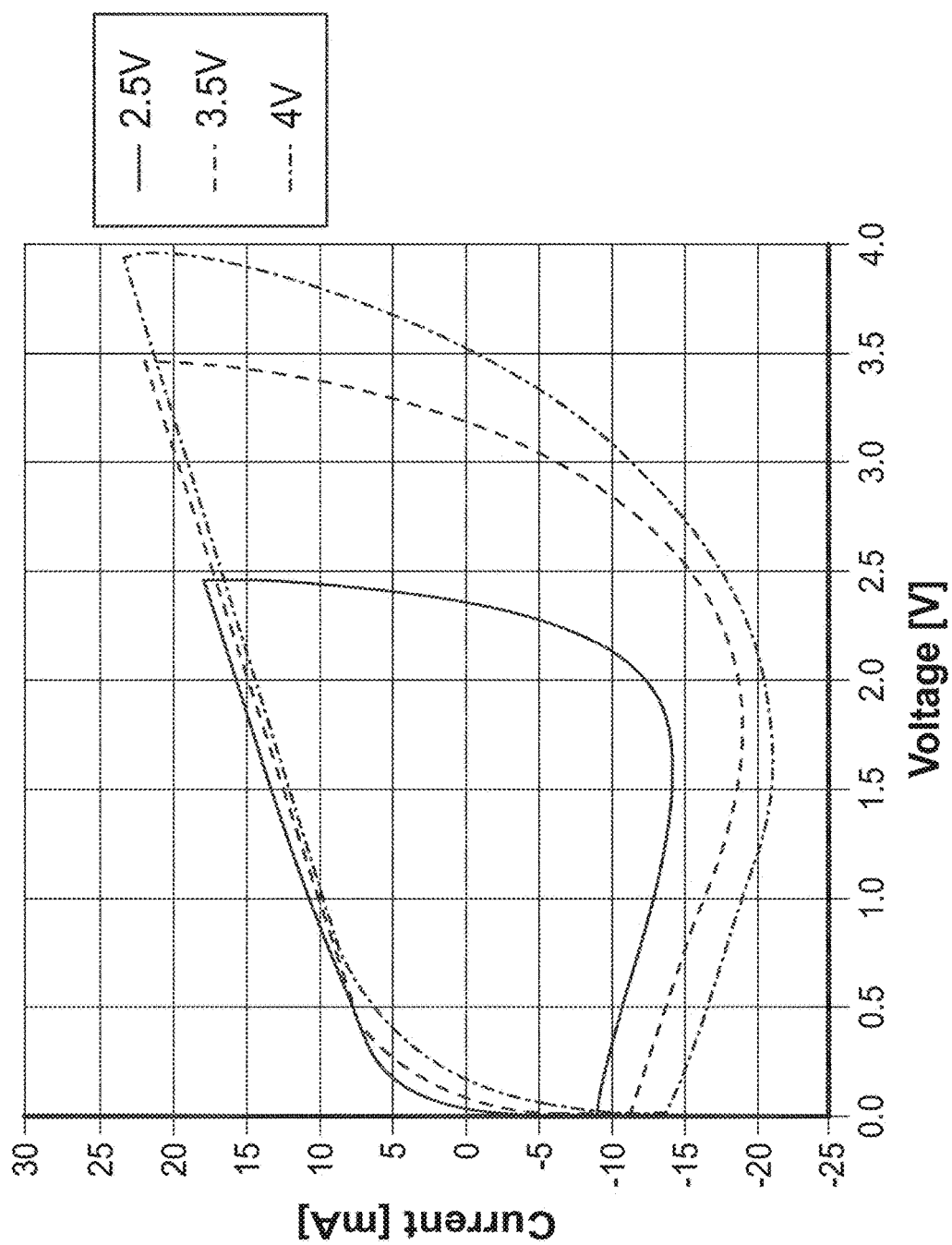
FIG. 59 is a graph depicting the cyclic voltammetry performance of an ultracapacitor of that employs a solid state polymer electrolyte including PVDF-HFP copolymer and an ionic liquid without a separator.

In certain embodiments, a solid state polymeric electrolyte may be prepared and employed in an ultracapacitor. In such embodiments, a polymer containing an ionic liquid is cast by dissolving a polymer in a solvent together with an electrolyte and any other additives, e.g., e.g., gelling agents (e.g., silica or silicates), other inorganic or ceramic powders (e.g., alumina, titania, magnesia, aluminosilicates, or titanates such as BaTiOs), clays (e.g., bentonite or montmorillonite and their derivatives), solvents, other polymeric materials, plasticizers, and combinations thereof. After drying the cast polymer electrolyte film can be incorporated into an ultracapacitor using the techniques for assembling ultracapacitors described herein, except that the polymer electrolyte replaces both the liquid (or gel) electrolyte and the separator in the ultracapacitor. The polymer film may also be cast directly onto the electrode of an ultracapacitor. Exemplary polymers include polyamide, polytetrafluoroethylene (PTFE), polyvinylidene fluoride-hexafluoropropylene copolymer (PVDF-HFP), polyether ether ketone (PEEK), CRAFT, sulfonated poly(ether ketone) (SPEEK), cross-linked sulfonated poly(ether ether ketone) (XSPEEK), and other polymer and copolymers stable at high temperature and appropriate for hermetic applications. FIG. 59 is a graph depicting the cyclic voltammetry performance of an ultracapacitor that employs a solid state polymer electrolyte including PVDF-HFP copolymer and an ionic liquid without a separator. The ultracapacitor of this embodiment operates stably at voltages up to 4V and does not require a separator, which typically adversely affects the performance of ultracapacitors, although it is usually required to prevent internal short circuits. In an embodiment the ultracapacitor that utilizes the electrolyte is configured to output electrical energy at operating voltages throughout an operating voltage range, the operating voltage range being between 0 V and about 2 V, 0 V and about 4 V, 0 V and about 5 V.

The advanced electrolyte systems (AES) may include, in one embodiment, certain novel electrolytes for use in high temperature ultracapacitors. In this respect, it has been found that maintaining purity and low moisture relates to a degree of performance of the energy storage 10; and that the use of electrolytes that contain hydrophobic materials and which have been found to demonstrate greater purity and lower moisture content are advantageous for obtaining improved performance. These electrolytes exhibit good performance characteristics in a temperature range of about minus 40 degrees Celsius to about 250 degrees Celsius, e.g., about minus 10 degrees Celsius to about 250 degrees Celsius, e.g., about minus 5 degrees Celsius to about 250 degrees Celsius e.g., about 0 degrees Celsius to about 250 degrees Celsius e.g., about minus 20 degrees Celsius to about 200 degrees Celsius e.g., about 150 degrees Celsius to about 250 degrees Celsius e.g., about 150 degrees Celsius to about 220 degrees Celsius e.g., about 150 degrees Celsius to about 200 degrees Celsius, e.g., about minus 10 degrees Celsius to about 210 degrees Celsius e.g., about minus 10 degrees Celsius to about 220 degrees Celsius e.g., about minus 10 degrees Celsius to about 230 degrees Celsius.

Accordingly, novel electrolyte entities useful as the advanced electrolyte system (AES) include species including a cation (e.g., cations shown in FIG. 8 and described herein) and an anion, or combinations of such species. In some embodiments, the species includes a nitrogen-containing, oxygen-containing, phosphorus-containing, and/or sulfur-containing cation, including heteroaryl and heterocyclic cations. In one set of embodiments, the advanced electrolyte system (AES) include species including a cation selected from the group consisting of ammonium, imidazolium, oxazolium, phosphonium, piperidinium, pyrazinium, pyrazolium, pyridazinium, pyridinium, pyrimidinium, sulfonium, thiazolium, triazolium, guanidium, isoquinolinium, benzotriazolium, and viologen-type cations, any of which may be substituted with substituents as described herein. In one embodiment, the novel electrolyte entities useful for the advanced electrolyte system (AES) include any combination of cations presented in FIG. 8, selected from the group consisting of phosphonium, piperidinium, and ammonium, wherein the various branch groups Rx (e.g., Ri, $R_2$, $R_3$, . . . Rx) may be selected from the group consisting of alkyl, heteroalkyl, alkenyl, heteroalkenyl, alkynyl, heteroalkynyl, halo, amino, nitro, cyano, hydroxyl, sulfate, sulfonate, and carbonyl, any of which is optionally substituted, and wherein at least two Rx are not H (i.e., such that the selection and orientation of the R groups produce the cationic species shown in FIG. 8); and the anion selected from the group consisting of tetrafluoroborate, bis(trifluoromethylsulfonyl) imide, tetracyanoborate, and trifluoromethanesulfonate.

For example, given the combinations of cations and anions above, in a particular embodiment, the AES may be selected from the group consisting of trihexyltetradecylphosphonium bis(trifluoromethylsulfonyl)imide, 1-butyl-1-methylpiperidinium bis(trifluoromethylsulfonyl) imide, and butyltrimethylammonium bis(trifluoromethylsulfonyl)imide. Data supporting the enhanced performance characteristics in a temperature range as demonstrated through Capacitance and ESR measurements over time, indicating high temperature utility and long term durability is provided in FIGS. 44A and 44B, FIGS. 45A and 45B, and FIGS. 46A and 46B.

In certain embodiments, the AES is trihexyltetradecylphosphonium bis(trifluoromcthylsulfonyl)imidc.

In certain embodiments, the AES is 1-butyl-1-methylpiperidinium bis(trifluoromethylsulfonyl)imide.

In certain embodiments, the AES is butyltrimethylammonium bis(trifluoromethylsulfonyl)imide.

In another embodiment, the novel electrolyte entities useful for the advanced electrolyte system (AES) include any combination of cations presented in FIG. 8, selected from the group consisting of imidazolium and pyrrolidinium, wherein the various branch groups Rx (e.g., $R_1$, $R_2$, $R_3$, . . . Rx) may be selected from the group consisting of alkyl, heteroalkyl, alkenyl, heteroalkenyl, alkynyl, heteroalkynyl, halo, amino, nitro, cyano, hydroxyl, sulfate, sulfonate, and carbonyl, any of which is optionally substituted, and wherein at least two Rx are not H (i.e., such that the selection and orientation of the R groups produce the cationic species shown in FIG. 8); and the anion selected from the group consisting of tetrafluoroborate, bis(trifluoromethylsulfonyl)imide, tetracyanoborate, and trifluoromethanesulfonate. In one particular embodiment, the two Rx that are not H, are alkyl. Moreover, the noted cations exhibit high thermal stability, as well as high conductivity and exhibit good electrochemical performance over a wide range of temperatures.

For example, given the combinations of cations and anions above, in a particular embodiment, the AES may be selected from the group consisting of 1-butyl-3-methylimidazolium tetrafluoroborate; 1-butyl-3-methylimidazolium bis(trifluoromethylsulfonyl)imide, 1-ethyl-3-methylimidazolium tetrafluoroborate; 1-ethyl-3-methylimidazolium tetracyanoborate; 1-hexyl-3-methylimidazolium tetracyanoborate; 1-butyl-1-methylpyrrolidinium bis(trifluoromethylsulfonyl)imide; 1-butyl-1-methylpyrrolidinium tris(pentafluoroethyl)trifluorophosphate; 1-butyl-1-methylpyrrolidinium tetracyanoborate, and 1-butyl-3-methylimidazolium trifluoromethanesulfonate.

In one embodiment, the AES is 1-butyl-3-methylimidazolium tetrafluoroborate.

In one embodiment, the AES is 1-butyl-3-methylimidazolium bis(trifluoromethylsulfonyl)imide.

In one embodiment, the AES is 1-ethyl-3-methylimidazolium tetrafluoroborate.

In one embodiment, the AES is 1-ethyl-3-methylimidazolium tetracyanoborate.

In one embodiment, the AES is 1-hexyl-3-methylimidazolium tetracyanoborate.

In one embodiment, the AES is 1-butyl-1-methylpyrrolidinium bis(trifluoromethylsulfonyl)imide.

In one embodiment, the AES is 1-butyl-1-methylpyrrolidinium tris(pentafhioroethyl)trifluorophosphate.

In one embodiment, the AES is 1-butyl-1-methylpyrrolidinium tetracyanoborate.

In one embodiment, the AES is 1-butyl-3-methylimidazolium trifluoromethanesulfonate.

In another particular embodiment, one of the two Rx that are not H, is alkyl, e.g., methyl, and the other is an alkyl substituted with an alkoxy. Moreover, it has been found that cations having an N,O-acetal skeleton structure of the formula (1) in the molecule have high electrical conductivity, and that an ammonium cation included among these cations and having a pyrrolidine skeleton and an N,O-acetal group is especially high in electrical conductivity and solubility in organic solvents and supports relatively high voltage. As such, in one embodiment, the advanced electrolyte system includes a salt of the following formula:

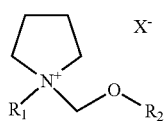

(1)

wherein $R_1$ and $R_2$ can be the same or different and are each alkyl, and X− is an anion. In some embodiments, $R_1$ is straight-chain or branched alkyl having 1 to 4 carbon atoms, $R_2$ is methyl or ethyl, and $X^−$ is a cyanoborate-containing anion 11. In a specific embodiment, $X^−$ includes $[B(CN)]^4$ and $R_2$ is one of a methyl and an ethyl group. In another specific embodiment, $R_1$ and $R_2$ are both methyl. In addition, in one embodiment, cyanoborate anions 11, $X^−$ suited for the advanced electrolyte system include, $[B(CN)4]^−$ or $[BFn(CN)4\text{-}n]^−$, where n=0, 1, 2 or 3.

Examples of cations of the AES including a Novel Electrolyte Entity of formula (1), and which are composed of a quaternary ammonium cation shown in formula (I) and a cyanoborate anion are selected from N-methyl-N-methoxymethylpyrrolidinium (N-methoxymethyl-N-methylpyrrolidinium), N-ethyl-N-methoxymethylpyrrolidinium, N-methoxymethyl-N-n-propylpyrrolidinium, N-methoxymethyl-N-iso-propylpyrrolidinium, N-n-butyl-N-methoxymethylpyrrolidinium, N-iso-butyl-N-methoxymethylpyrrolidinium, N-tert-butyl-N-methoxymethylpyrrolidinium, N-ethoxymethyl-N-methylpyrrolidinium, N-ethyl-N-ethoxymethylpyrrolidinium (N-ethoxymethyl-N-ethylpyrrolidinium), N-ethoxymethyl-N-n-propylpyrrolidinium, N-ethoxymethyl-N-iso-propylpyrrolidinium, N-n-butyl-N-ethoxymethylpyrrolidinium, N-iso-butyl-N-ethoxymethylpyrrolidinium and N-tert-butyl-N-ethoxymethylpyrrolidinium. Other examples include N-methyl-N-methoxymethylpyrrolidinium (N-methoxymethyl-N-methylpyrrolidinium), N-ethyl-N-methoxymethylpyrrolidinium and N-ethoxymethyl-N-methylpyrrolidinium.

Additional examples of the cation of formula (1) in combination with additional anions may be selected from N-methyl-N-methoxymethylpyrrolidinium tetracyanoborate (N-methoxymethy-N-methylpyrrolidinium tetracyanoborate), N-ethyl-N-methoxymethylpyrrolidinium tetracyanoborate, N-ethoxymethyl-N-methylpyrrolidinium tetracyanoborate, N-methyl-N-methoxymethylpyrrolidinium bistrifluoromethanesulfonylimide, (N-methoxymethy-N-methylpyrrolidinium bistrifluoromethanesulfonylimide), N-ethyl-N-methoxymethylpyrrolidinium bistrifluoromethanesulfonylimide, N-ethoxymethyl-N-methylpyrrolidinium bistrifluoromethanesulfonylimide, N-methyl-N-methoxymethylpyrrolidinium trifluoromethanesulfonate (N-methoxymethyl-N-methyltrifluoromethanesulfonate).

When to be used as an electrolyte, the quaternary ammonium salt may be used as admixed with a suitable organic solvent. Useful solvents include cyclic carbonic acid esters, chain carbonic acid esters, phosphoric acid esters, cyclic ethers, chain ethers, lactone compounds, chain esters, nitrile compounds, amide compounds and sulfonic compounds. Examples of such compounds are given below although the solvents to be used are not limited to these compounds.

Examples of cyclic carbonic acid esters are ethylene carbonate, propylene carbonate, butylene carbonate and the like, among which propylene carbonate is preferable.

Examples of chain carbonic acid esters are dimethyl carbonate, ethylmethyl carbonate, diethyl carbonate and the like, among which dimethyl carbonate and ethylmethyl carbonate are preferred.

Examples of phosphoric acid esters are trimethyl phosphate, triethyl phosphate, ethyldimethyl phosphate, diethylmethyl phosphate and the like. Examples of cyclic ethers are tetrahydrofuran, 2-methyltetrahydrofuran and the like. Examples of chain ethers are dimethoxyethane and the like. Examples of lactone compounds are γ-butyrolactone and the like. Examples of chain esters are methyl propionate, methyl acetate, ethyl acetate, methyl formate and the like. Examples of nitrile compounds are acetonitrile and the like. Examples of amide compounds are dimethylformamide and the like. Examples of sulfone compounds are sulfolane, methyl sulfolane and the like. Cyclic carbonic acid esters, chain carbonic acid esters, nitrile compounds and sulfone compounds may be particularly desirable, in some embodiments.

These solvents may be used singly, or at least two kinds of solvents may be used in admixture. Examples of preferred organic solvent mixtures are mixtures of cyclic carbonic acid ester and chain carbonic acid ester such as those of ethylene carbonate and dimethyl carbonate, ethylene carbonate and ethylmethyl carbonate, ethylene carbonate and diethyl carbonate, propylene carbonate and dimethyl carbonate, propylene carbonate and ethylmethyl carbonate and propylene carbonate and diethyl carbonate, mixtures of chain carbonic acid esters such as dimethyl carbonate and ethylmethyl carbonate, and mixtures of sulfolane compounds such as sulfolane and methylsulfolane. More preferable are mixtures of ethylene carbonate and ethylmethyl carbonate, propylene carbonate and ethylmethyl carbonate, and dimethyl carbonate and ethylmethyl carbonate.

In some embodiments, when the quaternary ammonium salt disclosed herein is to be used as an electrolyte, the electrolyte concentration is at least 0.1 M, in some cases at least 0.5 M and may be at least 1 M. If the concentration is less than 0.1 M, low electrical conductivity will result, producing electrochemical devices of impaired performance. The upper limit concentration is a separation concentration when the electrolyte is a liquid salt at room temperature. When the solution does not separate, the limit concentration is 100%. When the salt is solid at room temperature, the limit concentration is the concentration at which the solution is saturated with the salt.

In certain embodiments, the advanced electrolyte system (AES) may be admixed with electrolytes other than those disclosed herein provided that such combination does not significantly affect the advantages achieved by utilization of the advanced electrolyte system, e.g., by altering the performance or durability characteristics by greater than 10%. Examples of electrolytes that may be suited to be admixed with the AES are alkali metal salts, quaternary ammonium salts, quaternary phosphonium salts, etc. These electrolytes may be used singly, or at least two kinds of them are usable in combination, as admixed with the AES disclosed herein. Useful alkali metal salts include lithium salts, sodium salts and potassium salts. Examples of such lithium salts are lithium hexafluorophosphate, lithium borofluoride, lithium perchlorate, lithium trifluoromethanesulfonate, sulfonylimide lithium, sulfonylmethide lithium and the like, which nevertheless are not limitative. Examples of useful sodium salts are sodium hexafluorophosphate, sodium borofluoride, sodium perchlorate, sodium trifluoromethanesulfonate, sulfonylimide sodium, sulfonylmethide sodium and the like. Examples of useful potassium salts are potassium hexafluorophosphate, potassium borofluoride, potassium perchlorate, potassium trifluoromethanesulfonate, sulfonylimide potassium, sulfonylmethide potassium and the like although these are not limitative.

Useful quaternary ammonium salts that may be used in the combinations described above (i.e., which do not significantly affect the advantages achieved by utilization of the advanced electrolyte system) include tetraalkylammonium salts, imidazolium salts, pyrazolium salts, pyridinium salts, triazolium salts, pyridazinium salts, etc., which are not limitative. Examples of useful tetraalkylammonium salts are tetraethylammonium tetracyanoborate, tetramethylammonium tetracyanoborate, tetrapropylammonium tetracyanoborate, tetrabutylammonium tetracyanoborate, triethylmethylammonium tetracyanoborate, trimethylethylammonium tetracyanoborate, dimethyldiethylammonium tetracyanoborate, trimethylpropylammonium tetracyanoborate, trimethylbutylammonium tetracyanoborate, dimethylethylpropylammonium tetracyanoborate, methylethylpropylbutylammonium tetracyanoborate, N,N-dimethylpyrrolidinium tetracyanoborate, N-ethyl-N-methylpyrrolidinium tetracyanoborate, N-methyl-N-propylpyrrolidinium tetracyanoborate, N-ethyl-N-propylpyrrolidinium tetracyanoborate, N,N-dimethylpiperidinium tetracyanoborate, N-methyl-N-ethylpiperidinium tetracyanoborate, N-methyl-N-propylpiperidinium tetracyanoborate, N-ethyl-N-propylpiperidinium tetracyanoborate, N,N-dimethylmorpholinium tetracyanoborate, Nmethyl-N-ethylmorpholinium tetracyanoborate, N-methyl-N-propylmorpholinium tetracyanoborate, N-ethyl-N-propylmorpholinium tetracyanoborate and the like, whereas these examples are not limitative.

Examples of imidazolium salts that may be used in the combinations described above (i.e., which do not significantly affect the advantages achieved by utilization of the advanced electrolyte system) include 1,3-dimethylimidazolium tetracyanoborate, 1-ethyl-3-methylimidazolium tetracyanoborate, 1,3-diethylimidazolium tetracyanoborate, 1,2-dimethyl-3-ethylimidazolium tetracyanoborate and 1,2-dimethyl-3-propylimidazolium tetracyanoborate, but are not limited to these. Examples of pyrazolium salts are 1,2-dimethylpyrazolium tetracyanoborate, 1-methyl-2-ethylpyrazolium tetracyanoborate, 1-propyl-2-methylpyrazolium tetracyanoborate and 1-methyl-2-butylpyrazolium tetracyanoborate, but are not limited to these. Examples of pyridinium salts are Nmethylpyridinium tetracyanoborate, N-ethylpyridinium tetracyanoborate, Npropylpyridinium tetracyanoborate and N-butylpyridinium tetracyanoborate, but are not limited to these. Examples of triazolium salts are 1-methyltriazolium tetracyanoborate, 1-ethyltriazolium tetracyanoborate, 1-propyltriazolium tetracyanoborate and 1-butyltriazolium tetracyanoborate, but are not limited to these. Examples of pyridazinium salts are 1-methylpyridazinium tetracyanoborate, 1-ethylpyridazinium tetracyanoborate, 1-propylpyridazinium tetracyanoborate and 1-butylpyridazinium tetracyanoborate, but are not limited to these. Examples of quaternary phosphonium salts are tetraethylphosphonium tetracyanoborate, tetramethylphosphonium tetracyanoborate, tetrapropylphosphonium tetracyanoborate, tetrabutylphosphonium tetracyanoborate, triethylmethylphosphonium tetrafluoroborate, trimethylethylphosphonium tetracyanoborate, dimethyldiethylphosphonium tetracyanoborate, trimethylpropylphosphonium tetracyanoborate, trimethylbutylphosphonium tetracyanoborate, dimethylethylpropylphosphonium tetracyanoborate, methylethylpropylbutylphosphonium tetracyanoborate, but are not limited to these.

FIGS. 35 through 43 depict performance of an exemplary ultracapacitor having AES including 1-butyl-1-methylpyrrolidinium and tetracyanoborate for temperatures in the range from 125 degrees Celsius to 210 degrees Celsius.

Figure 44A:
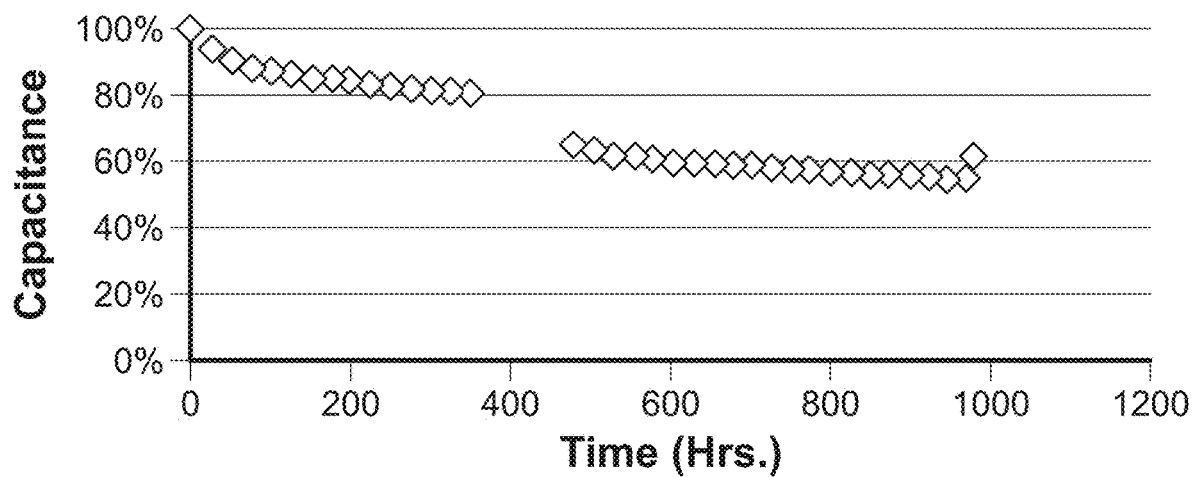
FIGS. 44A and 44B are capacitance and ESR graphs, respectively, depicting performance for an ultracapacitor with the novel electrolyte entity 1-butyl-1-methylpiperidinium bis(trifluoromethylsulfonyl)imide at 150 degrees Celsius and 1.5 V.
Figure 44B:
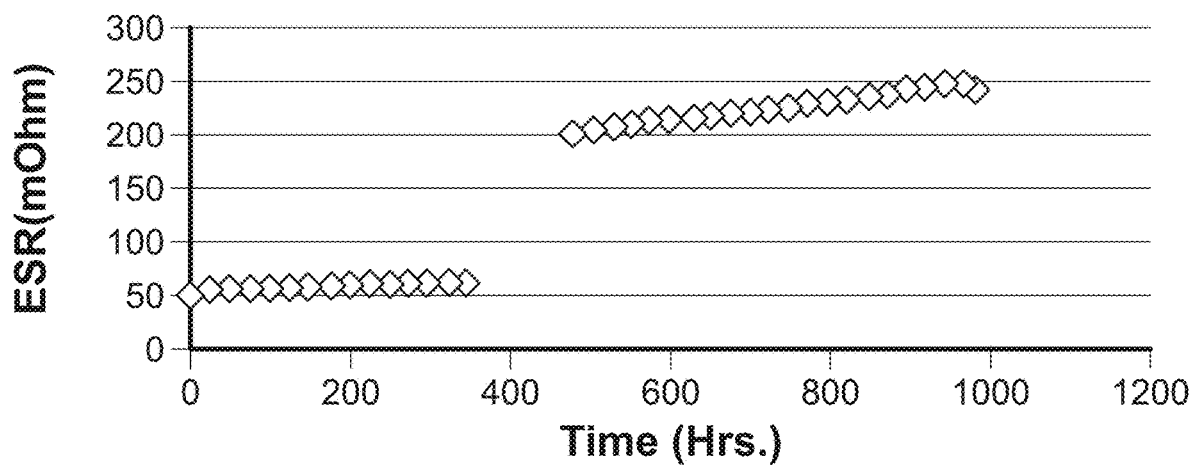

FIGS. 44A and 44B depict performance data of an exemplary ultracapacitor having AES including 1-butyl-1-methylpiperidinium bis(trifluoromethylsulfonyl)imide.

Figure 45A:
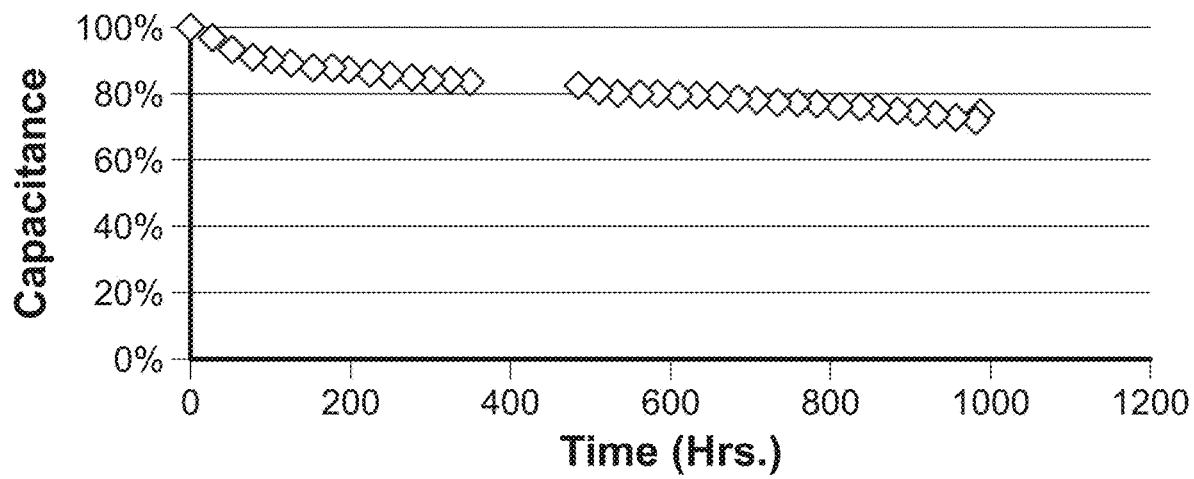
FIGS. 45A and 45B are capacitance and ESR graphs, respectively, depicting ultracapacitor with the novel electrolyte entity trihexyltetradecylphosphonium bis(trifluoromethylsulfonyl)imide at 150 degrees Celsius and 1.5 V.
Figure 45B:
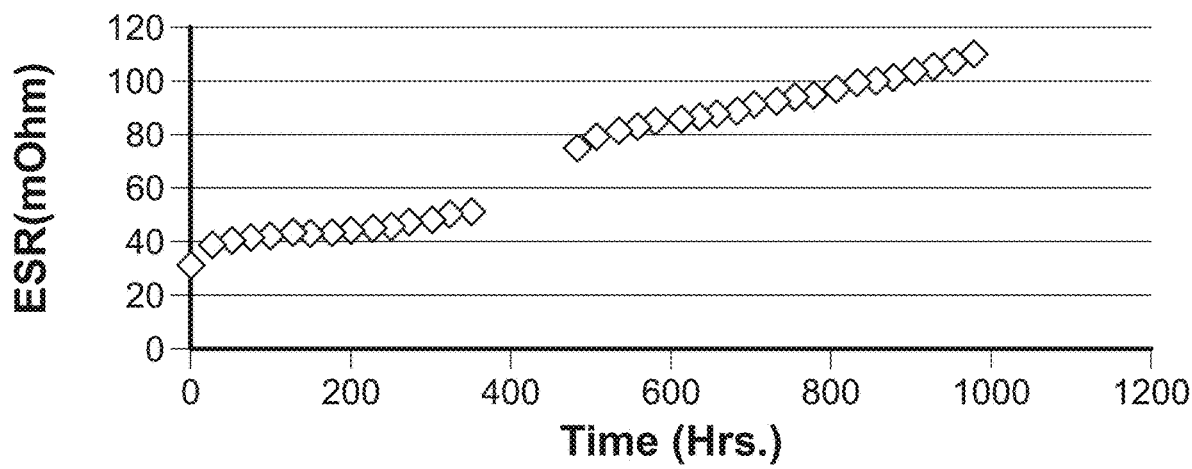

FIGS. 45A and 45B depict performance data of an exemplary ultracapacitor having AES including trihexyltetradecylphosphonium bis(trifluoromethylsulfonyl)imide.

Figure 46A:
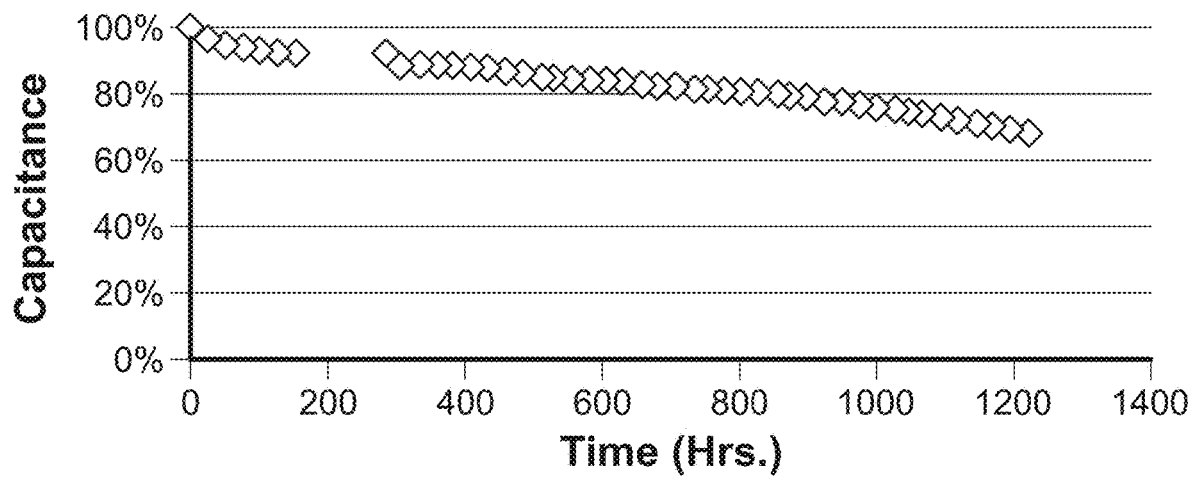
FIGS. 46A and 46B are capacitance and ESR graphs, respectively, depicting performance for an ultracapacitor with the novel electrolyte entity butyltrimethylammonium bis(trifhioromethylsulfonyl)imide at 150 degrees Celsius and 1.5 V.
Figure 46B:
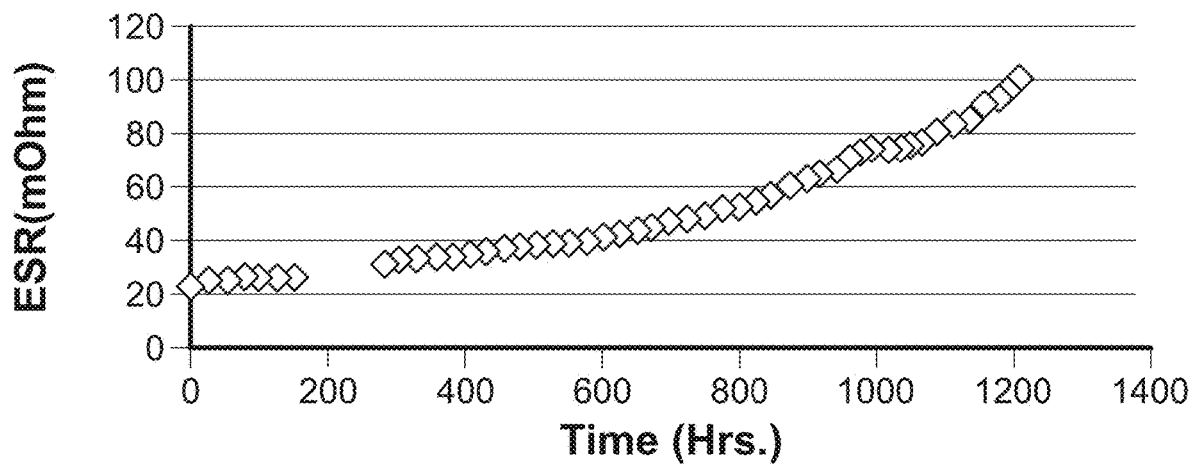

FIGS. 46A and 46B depict performance data of an exemplary ultracapacitor having AES including butyltrimethylammonium bis(trifluoromethylsulfonyl)imide.

Figure 47A:
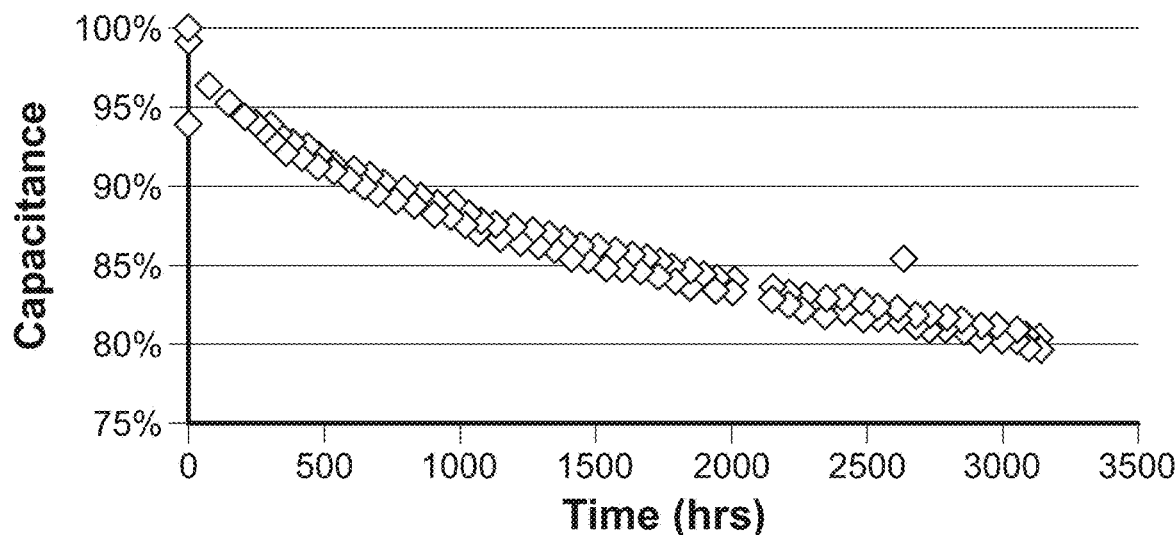
FIGS. 47A and 47B are capacitance and ESR graphs, respectively, depicting performance for an ultracapacitor with an ionic liquid selected from the ionic liquids used in preparing the enhanced electrolyte combinations, at 125 degrees Celsius and 1.5V.
Figure 47B:
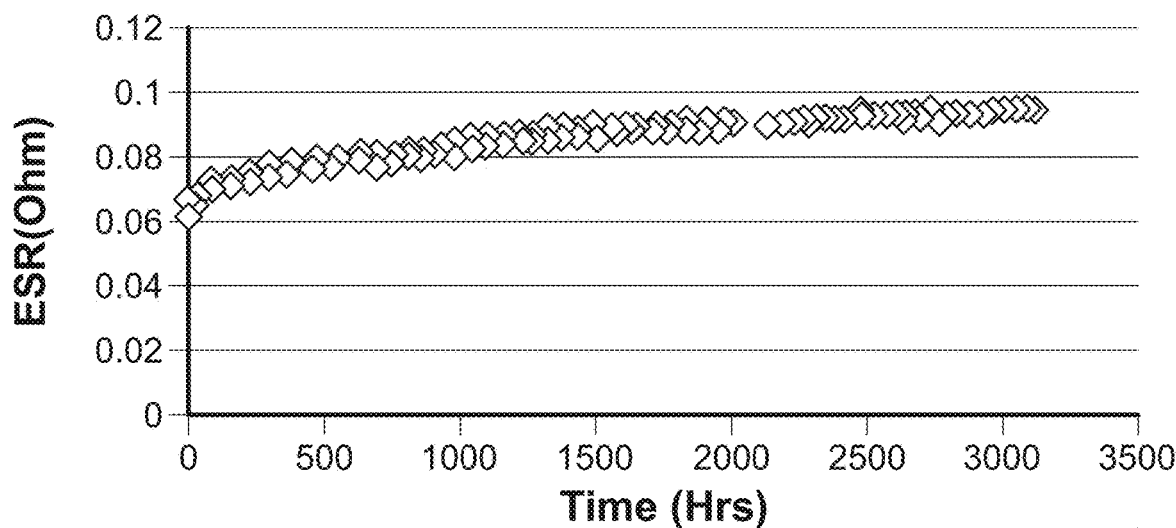

FIGS. 47A and 47B depict performance data of an exemplary ultracapacitor having AES including 1-butyl-1-methylpyrrolidinium and tetracyanoborate at 125 degrees Celsius.

Figure 48A:
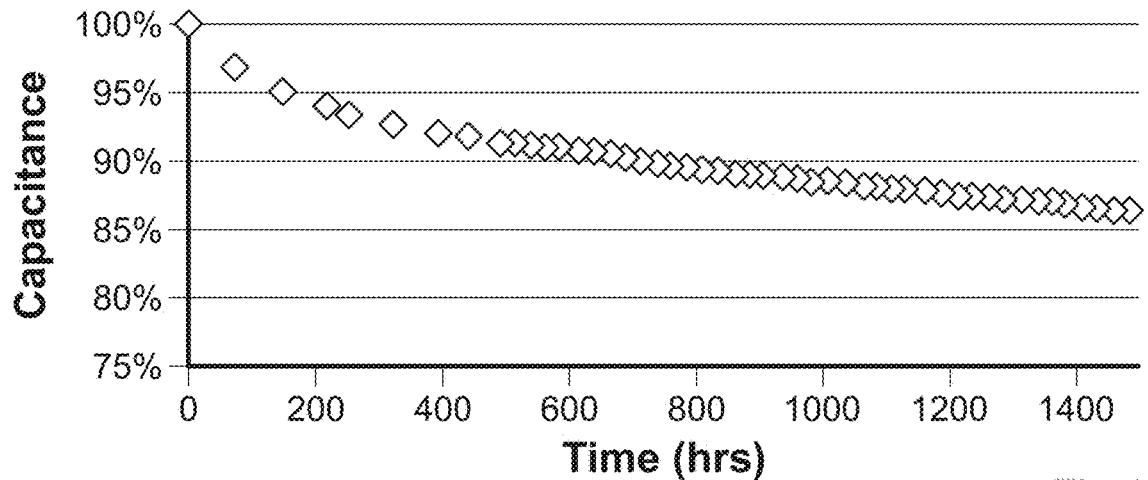
FIGS. 48A and 48B are capacitance and ESR graphs, respectively, depicting performance for an ultracapacitor with a 37.5% organic solvent-ionic liquid (same as in FIG. 47) v/v, at 125 degrees Celsius and 1.5V.
Figure 48B:
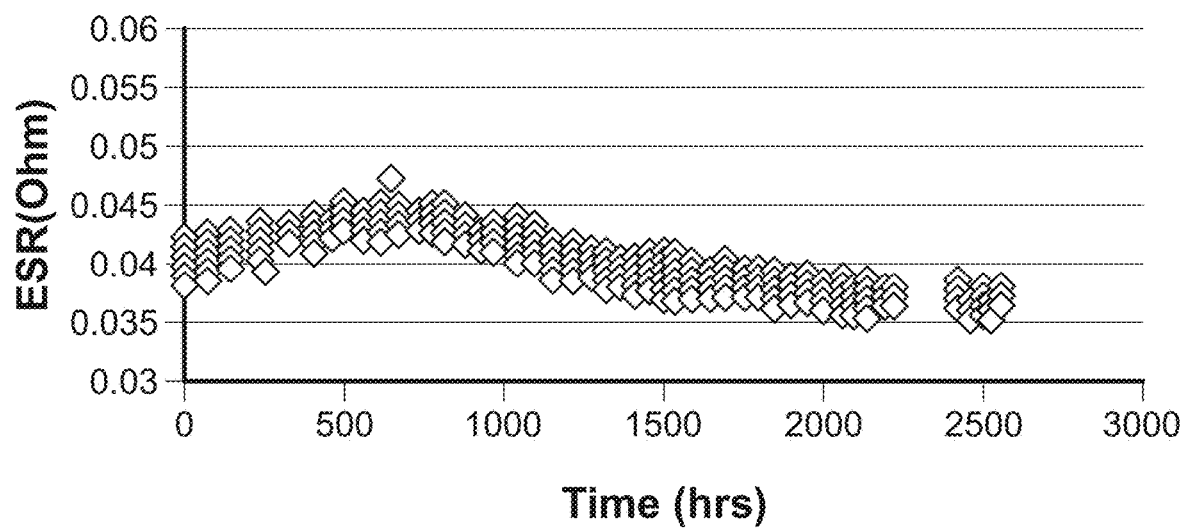
Figure 49:
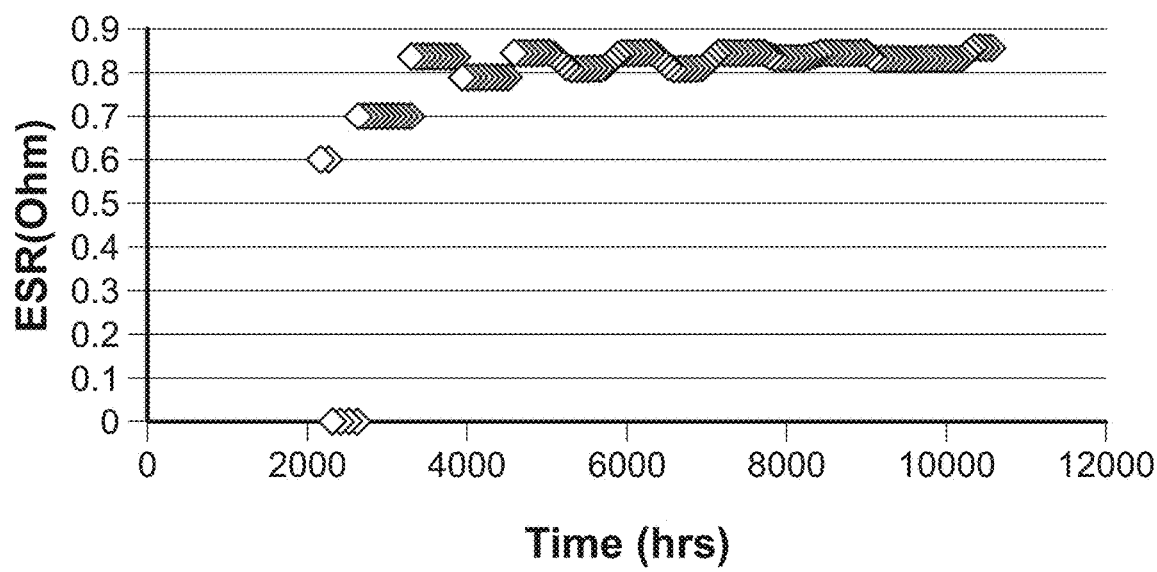
FIG. 49 is an ESR graph depicting performance for an ultracapacitor with a 37.5% organic solvent-ionic liquid v/v, at −40 degrees Celsius and 1.5V.

FIGS. 48A and 48B and 49 depict performance data of an exemplary ultracapacitor having AES including a mixture of propylene carbonate and 1-butyl-1-methylpyrrolidinium and tetracyanoborate, the mixture being about 37.5% propylene carbonate by volume; the capacitor operating at 125 degrees Celsius (FIGS. 48A and 48B) and at −40 degrees Celsius (FIG. 49). Another exemplary ultracapacitor tested included an AES including 1-butyl-3-methylimidazolium tetrafluoroborate.

Another exemplary ultracapacitor tested included an AES including 1-butyl-3-methylimidazolium bis(trifluoromethylsulfonyl)imide.

Another exemplary ultracapacitor tested included an AES including 1-ethyl-3-methylimidazolium tetrafluoroborate.

Another exemplary ultracapacitor tested included an AES including 1-ethyl-3-methylimidazolium tetracyanoborate.

Another exemplary ultracapacitor tested included an AES including 1-hexyl-3-methylimidazolium tetracyanoborate.

Another exemplary ultracapacitor tested included an AES including 1-butyl-1-methylpyrrolidinium bis(trifluoromethylsulfonyl)imide Another exemplary ultracapacitor tested included an AES including 1-butyl-1-methylpyrrolidinium tris(pentafluoroethyl)trifluorophosphate.

Another exemplary ultracapacitor tested included an AES including 1-butyl-1-methylpyrrolidinium tetracyanoborate.

Another exemplary ultracapacitor tested included an AES including 1-butyl-3-methylimidazolium trifluoromethanesulfonate.

Another exemplary ultracapacitor tested included an AES including 1-ethyl-3-methylimidazolium tetracyanoborate.

Another exemplary ultracapacitor tested included an AES including 1-ethyl-3-methylimidazolium and 1-butyl-1-methylpyrrolidinium and tetracyanoborate.

Another exemplary ultracapacitor tested included an AES including 1-butyl-1-methylpyrrolidinium and tetracyanoborate and ethyl isopropyl sulfone.

In certain embodiments, the novel electrolytes selected herein for use the advanced electrolyte systems may also be purified. Such purification may be performed using art-recognized techniques or the techniques provided herein. This purification may further improve the characteristics of the Novel Electrolyte Entities described herein.

The advanced electrolyte systems disclosed herein, in one embodiment, include certain highly purified electrolytes for use in high temperature ultracapacitors. The highly purified electrolytes that include the AES are those electrolytes described below as well as those novel electrolytes described above purified by the purification process described herein. The purification methods provided herein produce impurity levels that afford an advanced electrolyte system with enhanced properties for use in high temperature applications, e.g., high temperature ultracapacitors, for example in a temperature range of about minus 40 degrees Celsius to about 250 degrees Celsius, e.g., about minus 10 degrees Celsius to about 250 degrees Celsius, e.g., about minus 5 degrees Celsius to about 250 degrees Celsius e.g., about 0 degrees Celsius to about 250 degrees Celsius e.g., about minus 20 degrees Celsius to about 200 degrees Celsius e.g., about 150 degrees Celsius to about 250 degrees Celsius e.g., about 150 degrees Celsius to about 220 degrees Celsius e.g., about 150 degrees Celsius to about 200 degrees Celsius, e.g., about minus 10 degrees Celsius to about 210 degrees Celsius e.g., about minus 10 degrees Celsius to about 220 degrees Celsius e.g., about minus 10 degrees Celsius to about 230 degrees Celsius.

Obtaining improved properties of the ultracapacitor 10 results in a requirement for better electrolyte systems than presently available. For example, it has been found that increasing the operational temperature range may be achieved by the significant reduction/removal of impurities from certain forms of known electrolytes. Impurities of particular concern include water, halide ions (chloride, bromide, fluoride, iodide), free amines (ammonia), sulfate, and metal cations (Ag, Al, Ba, Ca, Cd, Co, Cr, Cu, Fe, K, Li, Mg, Mn, Mo, Na, Ni, Pb, Sr, Ti, Zn). The highly purified electrolyte product of such purification provides electrolytes that are surprisingly far superior to the unpurified electrolyte, and as such, fall with the advanced electrolyte systems.

In a particular embodiment, a purified mixture of cation 9 and anion 11 is provided and, in some instances a solvent, which may serve as the AES which includes less than about 5000 parts per million (ppm) of chloride ions; less than about 1000 ppm of fluoride ions; and/or less than about 1000 ppm of water (e.g. less than about 2000 ppm of chloride ions; less than about less than about 200 ppm of fluoride ions; and/or less than about 200 ppm of water, e.g. less than about 1000 ppm of chloride ions; less than about less than about 100 ppm of fluoride ions; and/or less than about 100 ppm of water, e.g. less than about 500 ppm of chloride ions; less than about less than about 50 ppm of fluoride ions; and/or less than about 50 ppm of water, e.g. less than about 780 parts per million of chloride ions; less than about 11 parts per million of fluoride ions; and less than about 20 parts per million of water.)

Generally, impurities in the purified electrolyte are removed using the methods of purification described herein. For example, in some embodiments, a total concentration of halide ions (chloride, bromide, fluoride, iodide), may be reduced to below about 1,000 ppm. A total concentration of metallic species (e.g., Cd, Co, Cr, Cu, Fe, K, Li, Mo, Na, Ni, Pb, Zn, including an at least one of an alloy and an oxide thereof), may be reduced to below about 1,000 ppm. Further, impurities from solvents and precursors used in the synthesis process may be reduced to below about 1,000 ppm and can include, for example, bromoethane, chloroethane, 1-bromobutane, 1-chlorobutane, 1-methylimidazole, ethyl acetate, methylene chloride and so forth.

In some embodiments, the impurity content of the ultracapacitor 10 has been measured using ion selective electrodes and the Karl Fischer titration procedure, which has been applied to electrolyte 6 of the ultracapacitor 10. In certain embodiments, it has been found that the total halide content in the ultracapacitor 10 according to the teachings herein has been found to be less than about 200 ppm of halides ($Cl^-$ and $F^-$) and water content is less than about 100 ppm.

Impurities can be measured using a variety of techniques, such as, for example, Atomic Absorption Spectrometry (AAS), Inductively Coupled Plasma-Mass Spectrometry (ICPMS), or simplified solubilizing and electrochemical sensing of trace heavy metal oxide particulates. AAS is a spectro-analytical procedure for the qualitative and quantitative determination of chemical elements employing the absorption of optical radiation (light) by free atoms in the gaseous state. The technique is used for determining the concentration of a particular element (the analyte) in a sample to be analyzed. AAS can be used to determine over seventy different elements in solution or directly in solid samples. ICPMS is a type of mass spectrometry that is highly sensitive and capable of the determination of a range of metals and several non-metals at concentrations below one part in 10 (part per trillion). This technique is based on coupling together an inductively coupled plasma as a method of producing ions (ionization) with a mass spectrometer as a method of separating and detecting the ions. TCPMS is also capable of monitoring isotopic speciation for the ions of choice.

Additional techniques may be used for analysis of impurities. Some of these techniques are particularly advantageous for analyzing impurities in solid samples. Ion Chromatography (IC) may be used for determination of trace levels of halide impurities in the electrolyte 6 (e.g., an ionic liquid). One advantage of Ion Chromatography is that relevant halide species can be measured in a single chromatographic analysis. A Dionex AS9-HC column using an eluent consisting 20 mM NaOH and 10% (v/v) acetonitrile is one example of an apparatus that may be used for the quantification of halides from the ionic liquids. A further technique is that of X-ray fluorescence.

X-ray fluorescence (XRF) instruments may be used to measure halogen content in solid samples. In this technique, the sample to be analyzed is placed in a sample cup and the sample cup is then placed in the analyzer where it is irradiated with X-rays of a specific wavelength. Any halogen atoms in the sample absorb a portion of the X-rays and then reflect radiation at a wavelength that is characteristic for a given halogen. A detector in the instrument then quantifies the amount of radiation coming back from the halogen atoms and measures the intensity of radiation. By knowing the surface area that is exposed, concentration of halogens in the sample can be determined. A further technique for assessing impurities in a solid sample is that of pyrolysis.

Adsorption of impurities may be effectively measured through use of pyrolysis and microcoulometers. Microcoulometers are capable of testing almost any type of material for total chlorine content. As an example, a small amount of sample (less than 10 milligrams) is either injected or placed into a quartz combustion tube where the temperature ranges from about 600 degrees Celsius to about 1,000 degrees Celsius. Pure oxygen is passed through the quartz tube and any chlorine containing components are combusted completely. The resulting combustion products are swept into a titration cell where the chloride ions are trapped in an electrolyte solution. The electrolyte solution contains silver ions that immediately combine with any chloride ions and drop out of solution as insoluble silver chloride. A silver electrode in the titration cell electrically replaces the used up silver ions until the concentration of silver ions is back to where it was before the titration began. By keeping track of the amount of current needed to generate the required amount of silver, the instrument is capable of determining how much chlorine was present in the original sample. Dividing the total amount of chlorine present by the weight of the sample gives the concentration of chlorine that is actually in the sample. Other techniques for assessing impurities may be used.

Surface characterization and water content in the electrode 3 may be examined, for example, by infrared spectroscopy techniques. The four major absorption bands at around 1130, 1560, 3250 and 2300 cm$^1$, correspond to vC=O in, vC=C in aryl, vO—H and vC—N, respectively. By measuring the intensity and peak position, it is possible to quantitatively identify the surface impurities within the electrode 3.

Another technique for identifying impurities in the electrolyte 6 and the ultracapacitor 10 is Raman spectroscopy. This spectroscopic technique relies on inelastic scattering, or Raman scattering, of monochromatic light, usually from a laser in the visible, near infrared, or near ultraviolet range. The laser light interacts with molecular vibrations, phonons or other excitations in the system, resulting in the energy of the laser photons being shifted up or down. Thus, this technique may be used to characterize atoms and molecules within the ultracapacitor 10. A number of variations of Raman spectroscopy are used, and may prove useful in characterizing contents the ultracapacitor 10.

The advanced electrolyte systems disclosed herein, in one embodiment, include certain enhanced electrolyte combinations suitable for use in a temperature range of about minus 40 degrees Celsius to about 250 degrees Celsius, e.g., about minus 10 degrees Celsius to about 250 degrees Celsius, e.g., about minus 5 degrees Celsius to about 250 degrees Celsius e.g., about 0 degrees Celsius to about 250 degrees Celsius e.g., about minus 20 degrees Celsius to about 200 degrees Celsius e.g., about 150 degrees Celsius to about 250 degrees Celsius e.g., about 150 degrees Celsius to about 220 degrees Celsius e.g., about 150 degrees Celsius to about 200 degrees Celsius, e.g., about minus 10 degrees Celsius to about 210 degrees Celsius e.g., about minus 10 degrees Celsius to about 220 degrees Celsius e.g., about minus 10 degrees Celsius to about 230 degrees Celsius.

Generally, a higher degree of durability at a given temperature may be coincident with a higher degree of voltage stability at a lower temperature. Accordingly, the development of a high temperature durability AES, with enhanced electrolyte combinations, generally leads to simultaneous development of high voltage, but lower temperature AES, such that these enhanced electrolyte combinations described herein may also be useful at higher voltages, and thus higher energy densities, but at lower temperatures.

In one embodiment, the teachings herein provide for an enhanced electrolyte combination suitable for use in an energy storage cell, e.g., an ultracapacitor, including a novel mixture of electrolytes selected from the group consisting of an ionic liquid mixed with a second ionic liquid, an ionic liquid mixed with an organic solvent, and an ionic liquid mixed with a second ionic liquid and an organic solvent:

wherein each ionic liquid is selected from the salt of any combination of the following cations and anions, wherein the cations are selected from the group consisting of 1-butyl-3-methylimidazolium, 1-ethyl-3-methylimidazolium, 1-hexyl-3-methylimidazolium, 1-butyl-1-methylpiperidinium, butyltrimethylammonium, 1-butyl-1-methylpyrrolidinium, trihexyltetradecylphosphonium, and 1-butyl-3-methylimidazolium; and the anions are selected from the group consisting of tetrafluoroborate, bis(trifluoromethylsulfonyl)imide, tetracyanoborate, and trifluoromethanesulfonate; and wherein the organic solvent is selected from the group consisting of linear sulfones (e.g. ethyl isopropyl sulfone, ethyl isobutyl sulfone, ethyl methyl sulfone, methyl isopropyl sulfone, isopropyl isobutyl sulfone, isopropyl s-butyl sulfone, butyl isobutyl sulfone, and dimethyl sulfone), linear carbonates (e.g., ethylene carbonate, propylene carbonate, and dimethyl carbonate), and acetonitrile.

For example, given the combinations of cations and anions above, each ionic liquid may be selected from the group consisting of 1-butyl-3-methylimidazolium tetrafluoroborate; 1-butyl-3-methylimidazolium bis(trifluoromethylsulfonyl)imide; 1-ethyl-3-methylimidazolium tetrafluoroborate; 1-ethyl-3-methylimidazolium tetracyanoborate; 1-hexyl-3-methylimidazolium tetracyanoborate; 1-butyl-1-methylpyrrolidinium bis(trifluoromethylsulfonyl)imide; 1-butyl-1-methylpyrrolidinium tris(pentafluoroethyl)trifluorophosphate; 1-butyl-1-methylpyrrolidinium tetracyanoborate; trihexyltetradecylphosphonium bis(trifluoromethylsulfonyl)imide, methylpiperidinium bis(trifluoromcthylsulfonyl)imidc, butyltrimethylammonium bis(trifluoromethylsulfonyl)imide, and 1-butyl-3-methylimidazolium trifluoromethanesulfonate.

In certain embodiments, the ionic liquid is 1-butyl-3-methylimidazolium tetrafluoroborate.

In certain embodiments, the ionic liquid is 1-butyl-3-methylimidazolium bis(trifluoromethylsulfonyl)imide.

In certain embodiments, the ionic liquid is 1-ethyl 3-methylimidazolium tetrafluoroborate.

In certain embodiments, the ionic liquid is 1-ethyl-3 methylimidazolium tetracyanoborate.

In certain embodiments, the ionic liquid is 1-hexyl-3 methylimidazolium tetracyanoborate.

In certain embodiments, the ionic liquid is 1-butyl-1-methylpyrrolidinium bis(trifluoromethylsulfonyl)imide.

In one embodiment, the ionic liquid is 1-butyl-1-methylpyrrolidinium tris(pentafluoroethyl)trifluorophosphate.

In certain embodiments, the ionic liquid is 1-butyl 1-methylpyrrolidinium tetracyanoborate.

In certain embodiments, the ionic liquid is trihexyltetradecylphosphonium bis(trifluoromethylsulfonyl)imide.

In certain embodiments, the ionic liquid is 1-butyl-1-methylpiperidinium bis(trifluoromethylsulfonyl)imide.

In certain embodiments, the ionic liquid is butyltrimethylammonium bis(trifluoromethylsulfonyl)imide In certain embodiments, the ionic liquid is 1-butyl-3 methylimidazolium trifluoromethanesulfonate.

In certain embodiments, the organic solvent is selected from ethyl isopropyl sulfone, ethyl isobutyl sulfone, ethyl methyl sulfone, methyl isopropyl sulfone, isopropyl isobutyl sulfone, isopropyl s-butyl sulfone, butyl isobutyl sulfone, or bimethyl sulfone, linear sulfones.

In certain embodiments, the organic solvent is selected from polypropylene carbonate, propylene carbonate, dimethyl carbonate, ethylene carbonate.

In certain embodiments, the organic solvent is acetonitrile.

In certain embodiments, the enhanced electrolyte composition is an ionic liquid with an organic solvent, wherein the organic solvent is 55%-90%, e.g., 37.5%, by volume of the composition.

In certain embodiments, the enhanced electrolyte composition is an ionic liquid with a second ionic liquid, wherein one ionic liquid is 5%-90%, e.g., 60%, by volume of the composition.

The enhanced electrolyte combinations provide a wider temperature range performance for an individual capacitor (e.g. without a significant drop in capacitance and/or increase in ESR when transitioning between two temperatures, e.g. without more than a 90% decrease in capacitance and/or a 1000% increase in ESR when transitioning from about +30° C. to about −40° C.), and increased temperature durability for an individual capacitor (e.g., less than a 50% decrease in capacitance at a given temperature after a given time and/or less than a 100% increase in ESR at a given temperature after a given time, and/or less than 10 A/L, of leakage current at a given temperature after a given time, e.g., less than a 40% decrease in capacitance and/or a 75% increase in ESR, and/or less than 5 A/L of leakage current, e.g., less than a 30% decrease in capacitance and/or a 50% increase in ESR, and/or less than 1 A/L of leakage current). FIG. 47A&B, FIG. 48A&B and FIG. 49 depicts the behavior of an ionic liquid from the above listing at 125 degrees Celsius, a 37.5% organic solvent-ionic liquid (same) v/v at 125 degrees Celsius, and the same composition at −40 degrees Celsius, respectively.

Without wishing to be bound by theory, the combinations described above provide enhanced eutectic properties that affect the freezing point of the advanced electrolyte system to afford ultracapacitors that operate within performance and durability standards at temperatures of down to −40 degrees Celsius.

As described above for the novel electrolytes disclosed herein, in certain embodiments, the advanced electrolyte system (AES) may be admixed with electrolytes provided that such combination does not significantly affect the advantages achieved by utilization of the advanced electrolyte system.

In certain embodiments, the enhanced electrolyte combinations are selected herein for use the advanced electrolyte systems may also be purified. Such purification may be performed using art-recognized techniques or techniques provided herein.

Referring now to FIG. 8, there are shown various additional embodiments of cations 9 suited for use in an ionic liquid to provide the electrolyte 6. These cations 9 may be used alone or in combination with each other, in combination with at least some of the foregoing embodiments of cations 9, and may also be used in combination with other cations 9 that are deemed compatible and appropriate by a user, designer, manufacturer or other similarly interested party. The cations 9 depicted in FIG. 8 include, without limitation, ammonium, imidazolium, oxazolium, phosphonium, piperidinium, pyrazinium, pyrazinium, pyridazinium, pyridinium, pyrimidinium, pyrrolidinium, sulfonium, thiazolium, triazolium, guanidium, isoquinolinium, benzotriazolium, viologen-types, and functionalized imidazolium cations.

With regard to the cations 9 shown in FIG. 8, various branch groups ($R_1, R_2, R_3, \ldots R_x$) are included. In the case of the cations 9, each branch groups ($R_x$) may be one of alkyl, heteroalkyl, alkenyl, heteroalkenyl, alkynyl, heteroalkynyl, halo, amino, nitro, cyano, hydroxyl, sulfate, sulfonate, or a carbonyl group any of which is optionally substituted.

The term "alkyl" is recognized in the art and may include saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 20 or fewer carbon atoms in its backbone (e.g., $C_1$-$C_{20}$ for straight chain, $C_1$-$C_{20}$ for branched chain). Likewise, cycloalkyls have from about 3 to about 10 carbon atoms in their ring structure, and alternatively about 5, 6 or 7 carbons in the ring structure. Examples of alkyl groups include, but are not limited to, methyl, ethyl, propyl, butyl, pentyl, hexyl, ethyl hexyl, cyclopropyl, cyclobutyl, cyclopentyl, cyclohexyl and the like.

The term "heteroalkyl" is recognized in the art and refers to alkyl groups as described herein in which one or more atoms is a heteroatom (e.g., oxygen, nitrogen, sulfur, and the like). For example, alkoxy group (e.g., —OR) is a heteroalkyl group.

The terms "alkenyl" and "alkynyl" are recognized in the art and refer to unsaturated aliphatic groups analogous in length and possible substitution to the alkyls described above, but that contain at least one double or triple bond respectively.

The "heteroalkenyl" and "heteroalkynyl" are recognized in the art and refer to alkenyl and alkynyl alkyl groups as described herein in which one or more atoms is a heteroatom (e.g., oxygen, nitrogen, sulfur, and the like).

Generally, any ion with a negative charge may be used as the anion 11. The anion 11 selected is generally paired with a large organic cation 9 to form a low temperature melting ionic salt. Room temperature (and lower) melting salts come from mainly large anions 9 with a charge of −1. Salts that melt at even lower temperatures generally are realized with anions 11 with easily delocalized electrons. Anything that will decrease the affinity between ions (distance, delocalization of charge) will subsequently decrease the melting point. Although possible anion formations are virtually infinite, only a subset of these will work in low temperature ionic liquid application. This is a non-limiting overview of possible anion formations for ionic liquids.

Common substitute groups (a) suited for use of the anions 11 provided in Table 3 include: —F, —Cl$^-$, —Br$^-$, —OCH$_3^-$, —C$_2$H$_3$O$_2^-$, —ClO$^-$, —ClO$_2^-$, —ClO$_3^-$, —ClO$_4^-$, —NCO$^-$, —NCS$^-$, —NCSe$^-$, —NCN$^-$, —OCH(CH$_3$)$_2^-$, —CH$_2$OCH$_3^-$, —COOH$^-$, —OH$^-$, —SOCH$_3^-$, —SO$_2$CF$_3^-$, —SOCH$_3^-$, —SO$_2$CF$_3^-$, —SO$_3$H$^-$, —SO$_3$CF$_3^-$, —O(CF$_3$)$_2$C$_2$(CF$_3$)$_2$O$^-$, —CF$_3^-$, —CH$_2$F$^-$, —CH$_3^-$, NO$_3^-$, —NO$_2^-$, —SO$_3^-$, —SO$_4^{2-}$, —SF$_5^-$, —CB$_{11}$H$_6$C$_{16}^-$, CH$_3$CB$_{11}$H$_{11}^-$, -A-PO$_4^-$, -A-SO$_2^-$, A-SO$_3^-$, -A-SO$_3$H$^-$, -A-COO$^-$, -A-CO$^-$; where A is a phenyl (the phenyl group or phenyl ring is a cyclic group of atoms with the formula C$_6$H$_5$) or substituted phenyl, alkyl, (a radical that has the general formula CnH$_{2n+1}$, formed by removing a hydrogen atom from an alkane) or substituted alkyl group, negatively charged radical alkanes, (alkane are chemical compounds that consist only of hydrogen and carbon atoms and are bonded exclusively by single bonds) halogenated alkanes and ethers (which are a class of organic compounds that contain an oxygen atom connected to two alkyl or aryl groups).

With regard to anions 11 suited for use in an ionic liquid that provides the electrolyte 6, various organic anions 11 may be used. Exemplary anions 11 and structures thereof are provided in Table 3. In a first embodiment, (No. 1), exemplary anions 11 are formulated from the list of substitute groups (a) provided above, or their equivalent. In additional embodiments, (Nos. 2-5), exemplary anions 11 are formulated from a respective base structure ($Y_2, Y_3, Y_4, \ldots Yn$) and a respective number of anion substitute groups ($\alpha_i, \alpha_2, \alpha_3, \ldots \alpha n$), where the respective number of anion substitute groups ($\alpha$) may be selected from the list of substitute ($\alpha$) groups provided above, or their equivalent. Note that in some embodiments, a plurality of anion substitute groups ($\alpha$) (i.e., at least one differing anion substitute group ($\alpha$)) may be used in any one embodiment of the anion 11. Also, note that in some embodiments, the base structure (Y) is a single atom or a designated molecule (as described in Table 3), or may be an equivalent.

More specifically, and by way of example, with regard to the exemplary anions provided in Table 3, certain combinations may be realized. As one example, in the case of No. 2, the base structure ($Y_2$) includes a single structure (e.g., an atom, or a molecule) that is bonded to two anion substitute groups ($\alpha_2$). While shown as having two identical anion substitute groups ($\alpha$), this need not be the case. That is, the base structure ($Y_2$) may be bonded to varying anion substitute groups ($\alpha_2$), such as any of the anion substitute groups (a) listed above. Similarly, the base structure ($Y_3$) includes a single structure (e.g., an atom) that is bonded to three anion substitute groups ($\alpha_3$), as shown in case No. 3. Again, each of the anion substitute groups (a) included in the anion may be varied or diverse, and need not repeat (be repetitive or be symmetric) as shown in Table 3. In general, with regard to the notation in Table 3, a subscript on one of the base structures denotes a number of bonds that the respective base structure may have with anion substitute groups ($\alpha$), subscript on the respective base structure ($Y_n$) denotes a number of accompanying anion substitute groups ($\alpha n$) in the respective anion.

TABLE 3

Exemplary Organic Anions for an Ionic Liquid

| No.: | Ion | Guidelines for Anion Structure and Exemplary Ionic Liquids |
|---|---|---|
| 1 | -$\alpha_i$ | Some of the above a may mix with organic cations to form an ionic liquid. An exemplary anion: Cl⁻ Exemplary ionic liquid: [BMP][Cl] *BMT—butyl methyl immadizolium |
| 2 | -$Y_2\alpha_2$ | $Y_2$ may be any of the following: N, O, C=O, S=O. Exemplary anions include: B (CF₃CO₂)₄⁻ N(SO₂CF₃)₂⁻. Exemplary ionic liquid: [EMI*][NTF₂] *EMI— ethyl methyl immadizolium |
| 3 | -$Y_3\alpha_3$ | $Y_3$ may be any of the following: Be, C, N, O, Mg, Ca, Ba, Ra, Au. Exemplary anions include: ⁻C(SO₂CF₃)₃⁻ Exemplary ionic liquid: [BMI] C(SO₂CF₃)₃⁻ |

TABLE 3-continued

Exemplary Organic Anions for an Ionic Liquid

| No.: | Ion | Guidelines for Anion Structure and Exemplary Ionic Liquids |
|---|---|---|
| 4 | $-Y_4\alpha_4$ | Y4 may be any of the following: B, Al, Ga, Th, In, P.<br>Exemplary anions include: —$BF_4$VAlCl$_4^-$<br>Exemplary ionic liquid: [BMI][BF$_4$]<br>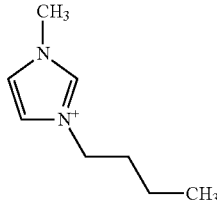 |
| 5 | $-Y_6\alpha_6$ | Ye can be any of the following: P, S, Sb, As, N, Bi, Nb, Sb.<br>Exemplary anions include: —$P(CF_3)_4F_2^-$, —$AsF_6^-$<br>Exemplary ionic liquid: [BMI][PFe]<br>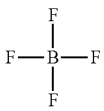 |

The term "cyano" is given its ordinary meaning in the art and refers to the group, CN. The term "sulfate" is given its ordinary meaning in the art and refers to the group, $SO_2$. The term "sulfonate" is given its ordinary meaning in the art and refers to the group, $SO_3X$, where X may be an electron pair, hydrogen, alkyl or cycloalkyl. The term "carbonyl" is recognized in the art and refers to the group, C=O.

An important aspect for consideration in construction of the ultracapacitor 10 is maintaining good chemical hygiene. In order to assure purity of the components, in various embodiments, the activated carbon, carbon fibers, rayon, carbon cloth, and/or nanotubes making up the energy storage media 1 for the two electrodes 3, are dried at elevated temperature in a vacuum environment. The separator 5 is also dried at elevated temperature in a vacuum environment. Once the electrodes 3 and the separator 5 are dried under vacuum, they are packaged in the housing 7 without a final seal or cap in an atmosphere with less than 50 parts per million (ppm) of water. The uncapped ultracapacitor 10 may be dried, for example, under vacuum over a temperature range of about 100 degrees Celsius to about 250 degrees Celsius. Once this final drying is complete, the electrolyte 6 may be added and the housing 7 is sealed in a relatively dry atmosphere (such as an atmosphere with less than about 50 ppm of moisture). Of course, other methods of assembly may be used, and the foregoing provides merely a few exemplary aspects of assembly of the ultracapacitor 10.

Generally, impurities in the electrolyte 6 are kept to a minimum. For example, in some embodiments, a total concentration of halide ions (chloride, bromide, fluoride, iodide), is kept to below about 1,000 ppm. A total concentration of metallic species (e.g., Br, Cd, Co, Cr, Cu, Fe, K, Li, Mo, Na, Ni, Pb, Zn, including an at least one of an alloy and an oxide thereof), is kept to below about 1,000 ppm. Further, impurities from solvents and precursors used in the synthesis process are kept below about 1,000 ppm and can include, for example, bromoethane, chloroethane, 1-bromobutane, 1-chlorobutane, 1-methylimidazole, ethyl acetate, methylene chloride and so forth.

In some embodiments, the impurity content of the ultracapacitor 10 has been measured using ion selective electrodes and the Karl Fischer titration procedure, which has been applied to electrolyte 6 of the ultracapacitor 10. It has been found that the total halide content in the ultracapacitor 10 according to the teachings herein has been found to be less than about 200 ppm of halides (Cl$^-$ and F$^-$) and water content is less than about 100 ppm.

One example of a technique for purifying electrolyte is provided in a reference entitled "The oxidation of alcohols in substituted imidazolium ionic liquids using ruthenium catalysts," Farmer and Welton, The Royal Society of Chemistry, 2002, 4, 97-102. An exemplary process is also provided herein.

Impurities can be measured using a variety of techniques, such as, for example, Atomic Absorption Spectrometry (AAS), Inductively Coupled Plasma-Mass Spectrometry (ICPMS), or simplified solubilizing and electrochemical sensing of trace heavy metal oxide particulates. AAS is a spectro-analytical procedure for the qualitative and quantitative determination of chemical elements employing the absorption of optical radiation (light) by free atoms in the gaseous state. The technique is used for determining the concentration of a particular element (the analyte) in a sample to be analyzed. AAS can be used to determine over seventy different elements in solution or directly in solid samples. ICPMS is a type of mass spectrometry that is highly sensitive and capable of the determination of a range of metals and several non-metals at concentrations below one part in $10^{12}$ (part per trillion). This technique is based on coupling together an inductively coupled plasma as a method of producing ions (ionization) with a mass spectrometer as a method of separating and detecting the ions. ICPMS is also capable of monitoring isotopic speciation for the ions of choice.

Additional techniques may be used for analysis of impurities. Some of these techniques are particularly advantageous for analyzing impurities in solid samples. Chromatography (IC) may be used for determination of trace levels of halide impurities in the electrolyte 6 (e.g., an ionic liquid). One advantage of Ion Chromatography is that relevant halide species can be measured in a single chromatographic analysis. A Dionex AS9-HC column using an eluent consisting 20 mM NaOH and 10% (v/v) acetonitrile is one example of an apparatus that may be used for the quantification of halides from the ionic liquids. A further technique is that of X-ray fluorescence.

X-ray fluorescence (XRF) instruments may be used to measure halogen content in solid samples. In this technique, the sample to be analyzed is placed in a sample cup and the sample cup is then placed in the analyzer where it is irradiated with X-rays of a specific wavelength. Any halogen atoms in the sample absorb a portion of the X-rays and then reflect radiation at a wavelength that is characteristic for a given halogen. A detector in the instrument then quantifies the amount of radiation coming back from the halogen atoms and measures the intensity of radiation. By knowing the surface area that is exposed, concentration of halogens in the sample can be determined. A further technique for assessing impurities in a solid sample is that of pyrolysis.

Adsorption of impurities may be effectively measured through use of pyrolysis and microcoulometers. Microcoulometers are capable of testing almost any type of material for total chlorine content. As an example, a small amount of sample (less than 10 milligrams) is either injected or placed into a quartz combustion tube where the temperature ranges from about 600 degrees Celsius to about 1,000 degrees Celsius. Pure oxygen is passed through the quartz tube and any chlorine containing components are combusted completely. The resulting combustion products are swept into a titration cell where the chloride ions are trapped in an electrolyte solution. The electrolyte solution contains silver ions that immediately combine with any chloride ions and drop out of solution as insoluble silver chloride. A silver electrode in the titration cell electrically replaces the used up silver ions until the concentration of silver ions is back to where it was before the titration began. By keeping track of the amount of current needed to generate the required amount of silver, the instrument is capable of determining how much chlorine was present in the original sample. Dividing the total amount of chlorine present by the weight of the sample gives the concentration of chlorine that is actually in the sample. Other techniques for assessing impurities may be used.

Surface characterization and water content in the electrode 3 may be examined, for example, by infrared spectroscopy techniques. The four major absorption bands at around 1130, 1560, 3250 and 2300 $cm^{-1}$, correspond to vC=O in, vC=C in aryl, vO—H and vC—N, respectively. By measuring the intensity and peak position, it is possible to quantitatively identify the surface impurities within the electrode 3.

Another technique for identifying impurities in the electrolyte 6 and the ultracapacitor 10 is Raman spectroscopy. This spectroscopic technique relies on inelastic scattering, or Raman scattering, of monochromatic light, usually from a laser in the visible, near infrared, or near ultraviolet range. The laser light interacts with molecular vibrations, phonons or other excitations in the system, resulting in the energy of the laser photons being shifted up or down. Thus, this technique may be used to characterize atoms and molecules within the ultracapacitor 10. A number of variations of Raman spectroscopy are used, and may prove useful in characterizing contents the ultracapacitor 10.

Once the ultracapacitor 10 is fabricated, it may be used in high temperature applications with little or no leakage current and little increase in resistance. The ultracapacitor 10 described herein can operate efficiently at temperatures from about minus 40 degrees Celsius to about 250 degrees Celsius with leakage currents normalized over the volume of the device less than 1 amp per liter (A/L) of volume of the device within the entire operating voltage and temperature range.

By reducing the moisture content in the ultracapacitor 10 (e.g., to less than 500 part per million (ppm) over the weight and volume of the electrolyte and the impurities to less than 1,000 ppm), the ultracapacitor 10 can efficiently operate over the temperature range, with a leakage current (T/L) that is less than 1,000 mAmp per Liter within that temperature range and voltage range.

In one embodiment, leakage current (I/L) at a specific temperature is measured by holding the voltage of the ultracapacitor 10 constant at the rated voltage (i.e., the maximum rated operating voltage) for seventy two (72) hours. During this period, the temperature remains relatively constant at the specified temperature. At the end of the measurement interval, the leakage current of the ultracapacitor 10 is measured.

In some embodiments, a maximum voltage rating of the ultracapacitor 10 is about 4 V at room temperature. An approach to ensure performance of the ultracapacitor 10 at elevated temperatures (for example, over 250 degrees Celsius), is to derate (i.e., to reduce) the voltage rating of the ultracapacitor 10. For example, the voltage rating may be adjusted down to about 0.5 V, such that extended durations of operation at higher temperature are achievable.

In some embodiments, a maximum voltage rating of the ultracapacitor 10 is about 4 V at room temperature. An approach to ensure performance of the ultracapacitor 10 at elevated temperatures (for example, over 250 degrees Celsius), is to derate (i.e., to reduce) the voltage rating of the ultracapacitor 10. For example, the voltage rating may be adjusted down to about 0.5 V, such that extended durations of operation at higher temperature are achievable.

In a first step of the process for purifying electrolyte, the electrolyte 6 (in some embodiments, the ionic liquid) is mixed with deionized water, and then raised to a moderate temperature for some period of time. In a proof of concept, fifty (50) milliliters (ml) of ionic liquid was mixed with eight hundred and fifty (850) milliliters (ml) of the deionized water. The mixture was raised to a constant temperature of sixty (60) degrees Celsius for about twelve (12) hours and subjected to constant stirring (of about one hundred and twenty (120) revolutions per minute (rpm)).

In a second step, the mixture of ionic liquid and deionized water is permitted to partition. In this example, the mixture was transferred via a funnel, and allowed to sit for about four (4) hours.

In a third step, the ionic liquid is collected. In this example, a water phase of the mixture resided on the bottom, with an ionic liquid phase on the top. The ionic liquid phase was transferred into another beaker.

In a fourth step, a solvent was mixed with the ionic liquid. In this example, a volume of about twenty five (25) milliliters (ml) of ethyl acetate was mixed with the ionic liquid. This mixture was again raised to a moderate temperature and stirred for some time.

Although ethyl acetate was used as the solvent, the solvent can be at least one of diethylether, pentone, cyclopentone, hexane, cyclohexane, benzene, toluene, 1-4 dioxane, chloroform or any combination thereof as well as other material(s) that exhibit appropriate performance characteristics. Some of the desired performance characteristics include those of a non-polar solvent as well as a high degree of volatility.

In a fifth step, carbon powder is added to the mixture of the ionic liquid and solvent. In this example, about twenty (20) weight percent (wt %) of carbon (of about a 0.45 micrometer diameter) was added to the mixture.

In a sixth step, the ionic liquid is again mixed. In this example, the mixture with the carbon powder was then subjected to constant stirring (120 rpm) overnight at about seventy (70) degrees Celsius.

In a seventh step, the carbon and the ethyl acetate are separated from the ionic liquid. In this example, the carbon was separated using Buchner filtration with a glass microfiber filter. Multiple filtrations (three) were performed. The ionic liquid collected was then passed through a 0.2 micrometer syringe filter in order to remove substantially all of the carbon particles. In this example, the solvent was then subsequently separated from the ionic liquid by employing rotary evaporation. Specifically, the sample of ionic liquid was stirred while increasing temperature from seventy (70) degrees Celsius to eighty (80) degrees Celsius, and finished at one hundred (100) degrees Celsius. Evaporation was performed for about fifteen (15) minutes at each of the respective temperatures.

The process for purifying electrolyte has proven to be very effective. For the sample ionic liquid, water content was measured by titration, with a titration instrument provided by Mettler-Toledo Inc., of Columbus, Ohio (model No: AQC22). Halide content was measured with an TSE instrument provided by Hanna Instruments of Woonsocket, R.I. (model no. AQC22). The standards solution for the ISE instrument was obtained from Hanna, and included HI 4007-03 (1,000 ppm chloride standard), HI 4010-03 (1,000 ppm fluoride standard) HI 4000-00 (ISA for halide electrodes), and HI 4010-00 (TISAB solution for fluoride electrode only). Prior to performing measurements, the ISE instrument was calibrated with the standards solutions using 0.1, 10, 100 and 1,000 parts per million (ppm) of the standards, mixed in with deionized water. ISA buffer was added to the standard in a 1:50 ratio for measurement of Cl ions. Results are shown in Table 4.

TABLE 4

Purification Data for Electrolyte

| Impurity | Before (ppm) | After (ppm) |
|---|---|---|
| $Cl^-$ | 5,300.90 | 769 |
| $F^-$ | 75.61 | 10.61 |
| $H_2O$ | 1080 | 20 |

A four step process was used to measure the halide ions. First, $Cl^-$ and $F^-$ ions were measured in the deionized water. Next, a 0.01 M solution of ionic liquid was prepared Subsequently, $Cl^-$ and $F^-$ ions were measured in the solution. Estimation of the halide content was then determined by subtracting the quantity of ions in the water from the quantity of ions in the solution.

As an overview, a method of assembly of a cylindrically shaped ultracapacitor 10 is provided. Beginning with the electrodes 3, each electrode 3 is fabricated once the energy storage media 1 has been associated with the current collector 2. A plurality of leads are then coupled to each electrode 3 at appropriate locations. A plurality of electrodes 3 are then oriented and assembled with an appropriate number of separators 5 therebetween to form the storage cell 12. The storage cell 12 may then be rolled into a cylinder, and may be secured with a wrapper. Generally, respective ones of the leads are then bundled to form each of the terminals 8.

Prior to incorporation of the electrolyte 6 into the ultracapacitor 10 (such as prior to assembly of the storage cell 12, or thereafter) each component of the ultracapacitor 10 may be dried to remove moisture. This may be performed with unassembled components (i.e., an empty housing 7, as well as each of the electrodes 3 and each of the separators 5), and subsequently with assembled components (such as the storage cell 12).

Drying may be performed, for example, at an elevated temperature in a vacuum environment. Once drying has been performed, the storage cell 12 may then be packaged in the housing 7 without a final seal or cap. In some embodiments, the packaging is performed in an atmosphere with less than 50 parts per million (ppm) of water. The uncapped ultracapacitor 10 may then be dried again. For example, the ultracapacitor 10 may be dried under vacuum over a temperature range of about 100 degrees Celsius to about 250 degrees Celsius. Once this final drying is complete, the housing 7 may then be sealed in, for example, an atmosphere with less than 50 ppm of moisture.

In some embodiments, once the drying process (which may also be referred to a "baking" process) has been completed, the environment surrounding the components may be filled with an inert gas. Exemplary gasses include argon, nitrogen, helium, and other gasses exhibiting similar properties (as well as combinations thereof).

Generally, a fill port (a perforation in a surface of the housing 7) is included in the housing 7, or may be later added. Once the ultracapacitor 10 has been filled with electrolyte 6, the fill port may then be closed. Closing the fill port may be completed, for example, by welding material (e.g., a metal that is compatible with the housing 7) into or over the fill port. In some embodiments, the fill port may be temporarily closed prior to filling, such that the ultracapacitor 10 may be moved to another environment, for subsequent reopening, filling and closure. However, as discussed herein, it is considered that the ultracapacitor 10 is dried and filled in the same environment.

A number of methods may be used to fill the housing 7 with a desired quantity of electrolyte 6. Generally, controlling the fill process may provide for, among other things, increases in capacitance, reductions in equivalent-series-resistance (ESR), and limiting waste of electrolyte 6. A vacuum filling method is provided as a non-limiting example of a technique for filling the housing 7 and wetting the storage cell 12 with the electrolyte 6.

First, however, note that measures may be taken to ensure that any material that has a potential to contaminate components of the ultracapacitor 10 is clean, compatible and dry. As a matter of convention, it may be considered that "good hygiene" is practiced to ensure assembly processes and components do not introduce contaminants into the ultracapacitor 10. Also, as a matter of convention, it may be considered that a "contaminant" may be defined as any unwanted material that will negatively affect performance of the ultracapacitor 10 if introduced. Also note that, generally herein, contaminants may be assessed as a concentration, such as in parts-per-million (ppm). The concentration may be taken as by weight, volume, sample weight, or in any other manner as determined appropriate.

In the "vacuum method" a container is placed onto the housing 7 around the fill port. A quantity of electrolyte 6 is then placed into the container in an environment that is substantially free of oxygen and water (i.e., moisture). A vacuum is then drawn in the environment, thus pulling any air out of the housing and thus simultaneously drawing the electrolyte 6 into the housing 7. The surrounding environment may then be refilled with inert gas (such as argon, nitrogen, or the like, or some combination of inert gases), if desired. The ultracapacitor 10 may be checked to see if the desired amount of electrolyte 6 has been drawn in. The process may be repeated as necessary until the desired amount of electrolyte 6 is in the ultracapacitor 10.

After filling with electrolyte 6, in some embodiments, material may be fit into the fill port to seal the ultracapacitor 10. The material may be, for example, a metal that is compatible with the housing 7 and the electrolyte 6. In one example, material is force fit into the fill port, essentially performing a "cold weld" of a plug in the fill port. Of course, the force fit may be complimented with other welding techniques as discussed further herein.

In order to show how the fill process effects the ultracapacitor 10, two similar embodiments of the ultracapacitor 10 were built. One was filled without a vacuum, the other was filled under vacuum. Electrical performance of the two embodiments is provided in Table 5. By repeated performance of such measurements, it has been noted that increased performance is realized with by filling the ultracapacitor 10 through applying a vacuum. It has been determined that, in general, is desired that pressure within the housing 7 is reduced to below about 150 mTorr, and more particularly to below about 40 mTorr.

TABLE 5

Comparative Performance for Fill Methods

| Parameter (at 0.1 V) | Without vacuum | With vacuum | Deviation |
| --- | --- | --- | --- |
| ESR @ 45° φ | 3.569 Ohms | 2.568 Ohms | (−28%) |
| Capacitance @ 12 mHz | 155.87 mF | 182.3 mF | (+14.49%) |
| Phase @ 12 mHz | 79.19 degrees | 83 degrees | (+4.59%) |

In order to evaluate efficacy of vacuum filling techniques, two different pouch cells were tested. The pouch cells included two electrodes 3, each electrode 3 being based on carbonaceous material. Each of the electrodes 3 were placed opposite and facing each other. The separator 5 was disposed between them to prevent short circuit and everything was soaked in electrolyte 6. Two external tabs were used to provide for four measurement points. The separator 5 used was a polyethylene separator 5, and the cell had a total volume of about 0.468 ml.

Figure 9:
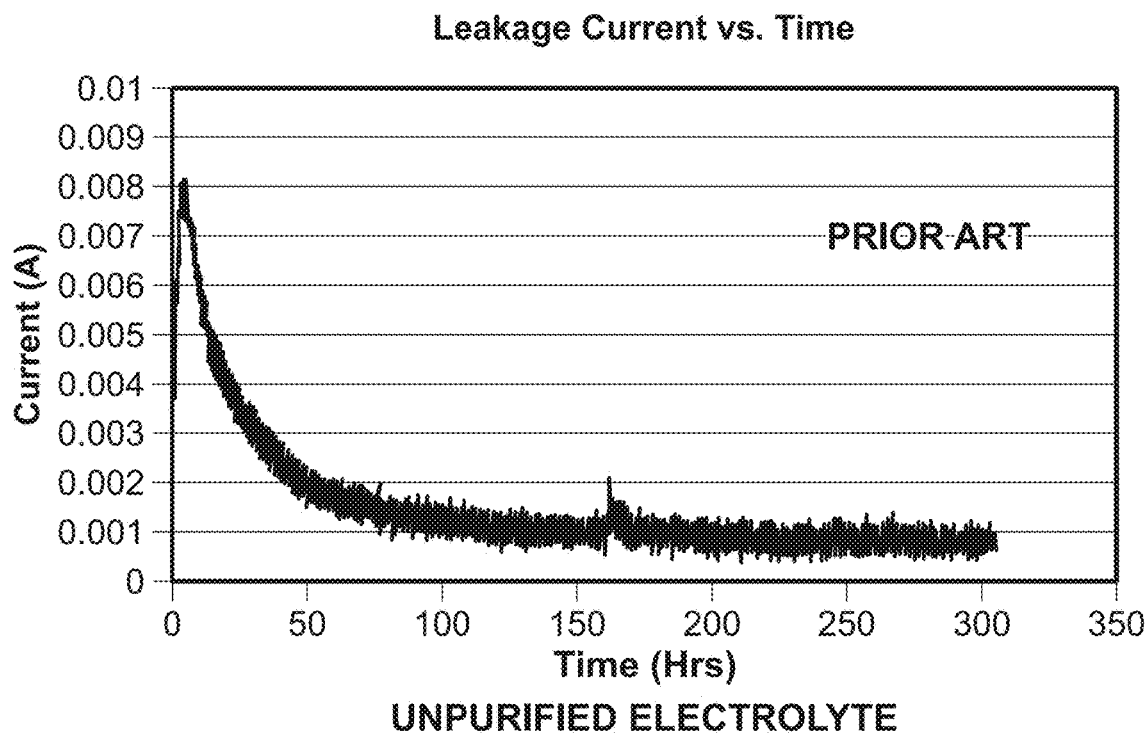
FIGS. 9 and 10 provide comparative data for the exemplary ultracapacitor making use of raw electrolyte and purified electrolyte, respectively.
Figure 10:
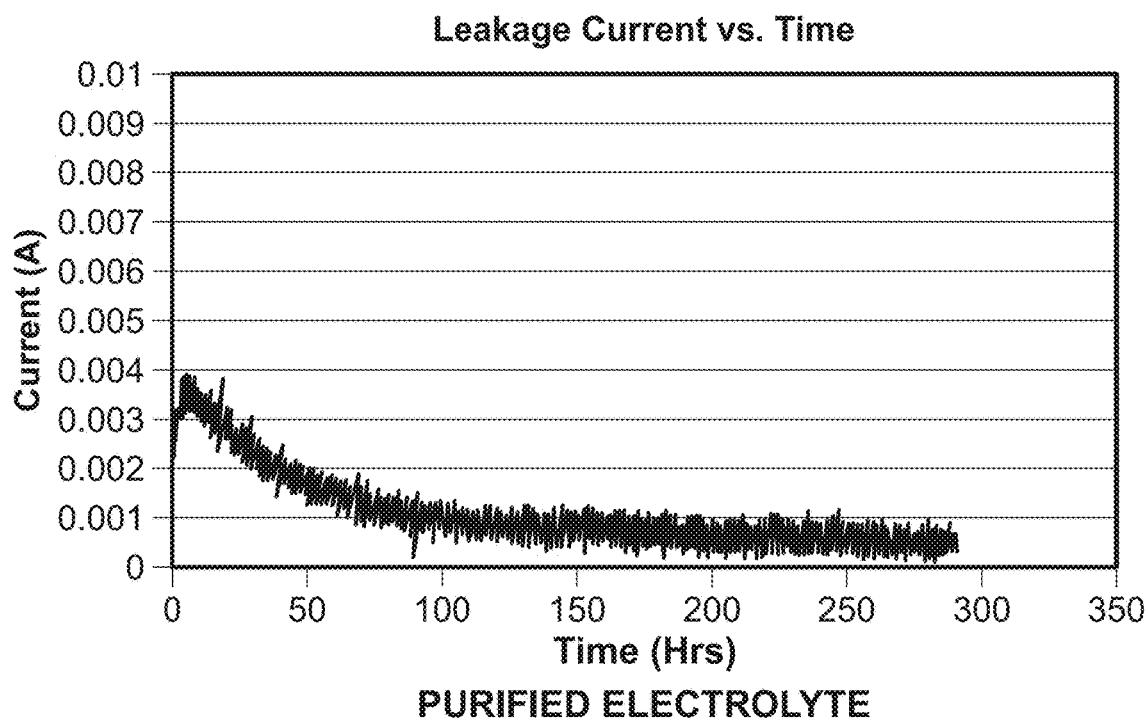

FIG. 9 depicts leakage current for unpurified electrolyte in the ultracapacitor 10. FIG. 10 depicts leakage current for purified electrolyte in a similarly structured ultracapacitor 10. As one can see, there is a substantial decrease in initial leakage current, as well as a decrease in leakage current over the later portion of the measurement interval. More information is provided on the construction of each embodiment in Table 6.

TABLE 6

Test Ultracapacitor Configuration

| Parameter | FIG. 9 | FIG. 10 |
| --- | --- | --- |
| Cell Size: | Open Sub C | Open Sub C |
| Casing: | Coated with PTFE | Coated with PTFE |
| Electrode: | Carbonaceous | Carbonaceous |
| Separator: | Fiberglass | Fiberglass |
| Leads: | 0.005" Aluminum (3 leads) | 0.005" Aluminum (3 leads) |
| Temperature | 150 degrees Celsius | 150 degrees Celsius |
| Electrolyte: | Unpurified | Purified |

Leakage current may be determined in a number of ways. Qualitatively, leakage current may be considered as current drawn into a device, once the device has reached a state of equilibrium. In practice, it is always or almost always necessary to estimate the actual leakage current as a state of equilibrium that may generally only by asymptotically approached. Thus, the leakage current in a given measurement may be approximated by measuring the current drawn into the ultracapacitor 10, while the ultracapacitor 10 is held at a substantially fixed voltage and exposed to a substantially fixed ambient temperature for a relatively long period of time. In some instances, a relatively long period of time may be determined by approximating the current time function as an exponential function, then allowing for several (e.g., about 3 to 5) characteristic time constants to pass. Often, such a duration ranges from about 50 hours to about 100 hours for many ultracapacitor technologies. Alternatively, if such a long period of time is impractical for any reason, the leakage current may simply be extrapolated, again, perhaps, by approximating the current time function as an exponential or any approximating function deemed appropriate. Notably, leakage current will generally depend on ambient temperature. So, in order to characterize performance of a device at a temperature or in a temperature range, it is generally important to expose the device to the ambient temperature of interest when measuring leakage current.

Figure 11:
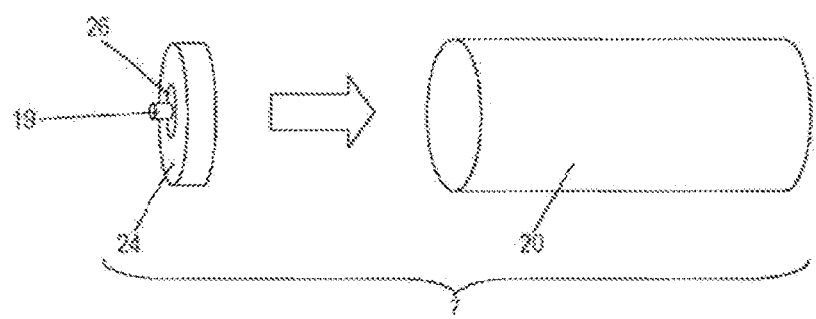
FIG. 11 depicts an embodiment of a housing for the exemplary ultracapacitor.

Refer now to FIG. 11, where aspects of an exemplary housing 7 are shown. Among other things, the housing 7 provides structure and physical protection for the ultracapacitor 10. In this example, the housing 7 includes an annular cylindrically shaped body 20 and a complimentary cap 24. In this embodiment, the cap 24 includes a central portion that has been removed and filled with an electrical insulator 26. A cap feed-through 19 penetrates through the electrical insulator 26 to provide users with access to the stored energy.

Common materials for the housing 7 include stainless steel, aluminum, tantalum, titanium, nickel, copper, tin, various alloys, laminates, and the like, materials, such as some polymer-based materials may be used in the housing 7 (generally in combination with at least some metallic components).

Although this example depicts only one feed-through 19 on the cap 24, it should be recognized that the construction of the housing 7 is not limited by the embodiments discussed herein. For example, the cap 24 may include a plurality of feed-throughs 19. In some embodiments, the body 20 includes a second, similar cap 24 at an opposing end of the Further, it should be recognized that the housing 7 is not limited to annular cylinder. embodiments having an annular cylindrically shaped body 20. For example, the housing 7 may be a clamshell design, a prismatic design, a pouch, or of any other design that is appropriate for the needs of the designer, manufacturer or user.

In this example, the cap 24 is fabricated with an outer diameter that is designed for fitting snugly within an inner diameter of the body 20. When assembled, the cap 24 may be welded into the body 20, thus providing users with a hermetic seal.

Figure 12:
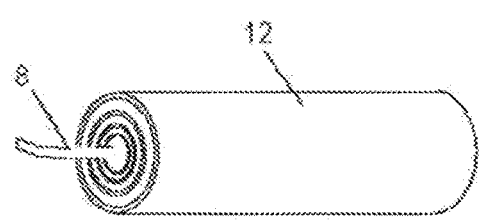
FIG. 12 illustrates an embodiment of a storage cell for the exemplary capacitor.
Figure 17:
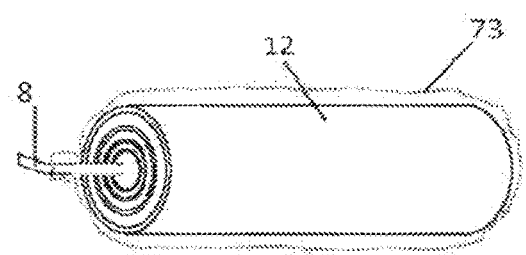
FIG. 17 depicts the barrier disposed about the storage cell as a wrapper.

Referring now to FIG. 12, there is shown an exemplary energy storage cell 12. In this example, the energy storage cell 12 is a "jelly roll" type of energy storage. In these embodiments, the energy storage materials are rolled up into a tight package. A plurality of leads generally form each terminal 8 and provide electrical access to the appropriate layer of the energy storage cell 12. Generally, when assembled, each terminal 8 is electrically coupled to the housing 7 (such as to a respective feed-through 19 and/or directly to the housing 7). The energy storage cell 12 may assume a variety of forms. There are generally at least two plurality of leads (e.g., terminals 8), one for each current collector 2. For simplicity, only one of terminal 8 is shown in FIGS. 12, 15 and 17.

A highly efficient seal of the housing 7 is desired, intrusion of the external environment (such as air, humidity, etc, . . . ) helps to maintain purity of the components of the energy storage cell 12. Further, this prevents leakage of electrolyte 6 from the energy storage cell 12.

Figure 13:
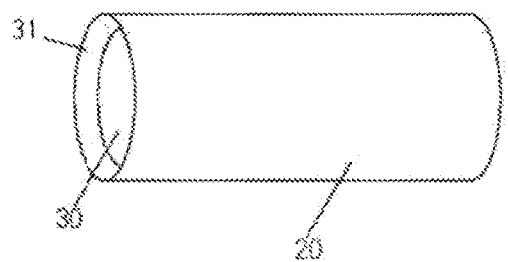
FIG. 13 depicts a barrier disposed on an interior portion of a body of the housing.

Referring now to FIG. 13, the housing 7 may include an inner barrier 30. In some embodiments, the barrier 30 is a coating. In this example, the barrier 30 is formed of polytetrafluoroethylene (PTFE). Polytetrafluoroethylene (PTFE) exhibits various properties that make this composition well suited for the barrier 30. PTFE has a melting point of about 327 degrees Celsius, has excellent dielectric properties, has a coefficient of friction of between about 0.05 to 0.10, which is the third-lowest of any known solid material, has a high corrosion resistance and other beneficial properties. Generally, an interior portion of the cap 24 may include the barrier 30 disposed thereon.

Other materials may be used for the barrier 30. Among these other materials are forms of ceramics (any type of ceramic that may be suitably applied and meet performance criteria), other polymers (preferably, a high temperature polymer) and the like. Exemplary other polymers include perfluoroalkoxy (PFA) and fluorinated ethylene propylene (FEP) as well as ethylene tetrafluoroethylene (ETFE).

The barrier 30 may include any material or combinations of materials that provide for reductions in electrochemical or other types of reactions between the energy storage cell 12 and the housing 7 or components of the housing 7. In some embodiments, the combinations are manifested as homogeneous dispersions of differing materials within a single layer. In other embodiments, the combinations are manifested as differing materials within a plurality of layers. Other combinations may be used. In short, the barrier 30 may be considered as at least one of an electrical insulator and chemically inert (i.e., exhibiting low reactivity) and therefore substantially resists or impedes at least one of electrical and chemical interactions between the storage cell 12 and the housing 7. In some embodiments, the term "low reactivity" and "low chemical reactivity" generally refer to a rate of chemical interaction that is below a level of concern for an interested party.

In general, the interior of the housing 7 may be host to the barrier 30 such that all surfaces of the housing 7 which are exposed to the interior are covered. At least one untreated area 31 may be included within the body 20 and on an outer surface 36 of the cap 24 (see FIG. 14A). In some embodiments, untreated areas 31 (see FIG. 14B) may be included to account for assembly requirements, such as areas which will be sealed or connected (such as by welding).

The barrier 30 may be applied to the interior portions using conventional techniques. For example, in the case of PTFE, the barrier 30 may be applied by painting or spraying the barrier 30 onto the interior surface as a coating. A mask may be used as a part of the process to ensure untreated areas 31 retain desired integrity, techniques may be used to provide the barrier 30.

In an exemplary embodiment, the barrier 30 is about 3 mil to about 5 mil thick, while material used for the barrier 30 is a PFA based material. In this example, surfaces for receiving the material that make up the barrier 30 are prepared with grit blasting, such as with aluminum oxide. Once the surfaces are cleaned, the material is applied, first as a liquid then as a powder. The material is cured by a heat treating process. In some embodiments, the heating cycle is about 10 minutes to about 15 minutes in duration, at temperatures of about 370 degrees Celsius. This results in a continuous finish to the barrier 30 that is substantially free of pin-hole sized or smaller defects. FIG. 15 depicts assembly of an embodiment of the ultracapacitor 10 according to the teachings herein. In this embodiment, the ultracapacitor 10 includes the body 20 that includes the barrier 30 disposed therein, a cap 24 with the barrier 30 disposed therein, and the energy storage cell 12. During assembly, the cap 24 is set over the body 20. A first one of the terminals 8 is electrically coupled to the cap feed-through 19, while a second one of the terminals 8 is electrically coupled to the housing 7, typically at the bottom, on the side or on the cap 24. In some embodiments, the second one of the terminals 8 is coupled to another feed-through 19 (such as of an opposing cap 24).

With the barrier 30 disposed on the interior surface(s) of the housing 7, electrochemical and other reactions between the housing 7 and the electrolyte are greatly reduced or substantially eliminated. This is particularly significant at higher temperatures where a rate of chemical and other reactions is generally increased.

Figure 16A:
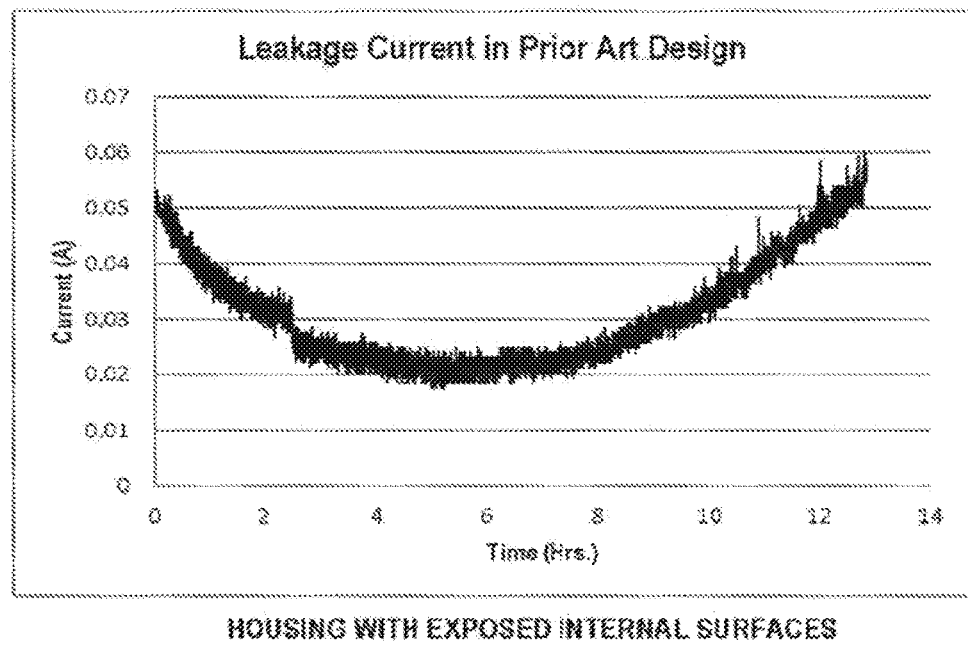
FIGS. 16A and 16B, collectively referred to herein as FIG. 16, are graphs depicting performance for the ultracapacitor for an embodiment without a barrier and a similar embodiment that includes the barrier, respectively.
Figure 16B:
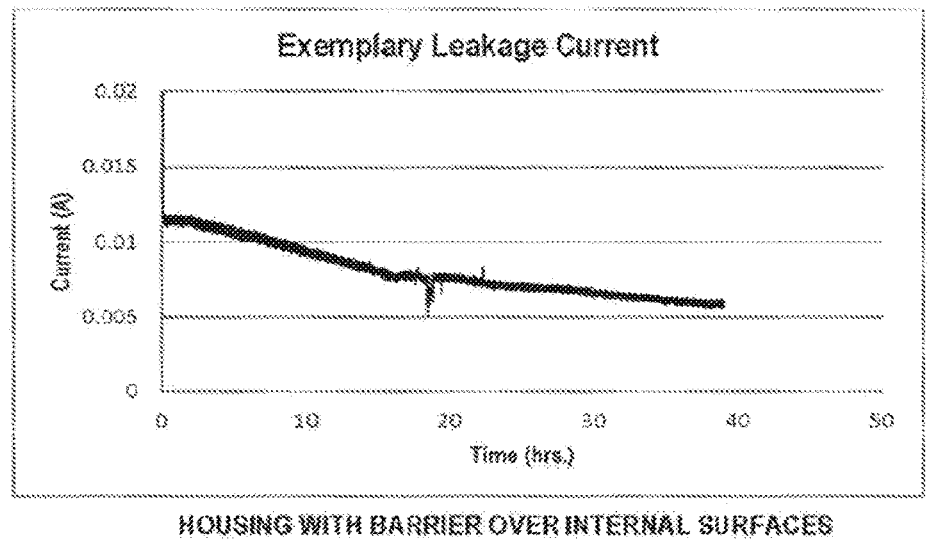

Referring now to FIG. 16, there is shown relative performance of the ultracapacitor 10 in comparison to an otherwise equivalent ultracapacitor. In FIG. 16A, leakage current is shown for a prior art embodiment of the ultracapacitor 10. In FIG. 16B, leakage current is shown for an equivalent ultracapacitor 10 that includes the barrier 30. In FIG. 16B, the ultracapacitor 10 is electrically equivalent to the ultracapacitor whose leakage current is shown in FIG. 16A. In both cases, the housing 7 was stainless steel, and the voltage supplied to the cell was 1.75 Volts, and electrolyte was not purified. Temperature was held a constant 150 degrees Celsius. Notably, the leakage current in FIG. 16B indicates a comparably lower initial value and no substantial increase over time while the leakage current in FIG. 16A indicates a comparably higher initial value as well as a substantial increase over time.

Generally, the barrier 30 provides a suitable thickness of suitable materials between the energy storage cell 12 and the housing 7. The barrier 30 may include a homogeneous mixture, a heterogeneous mixture and/or at least one layer of materials. The barrier 30 may provide complete coverage (i.e., provide coverage over the interior surface area of the housing with the exception of electrode contacts) or partial coverage. In some embodiments, the barrier 30 is formed of multiple components. Consider, for example, the embodiment presented below and illustrated in FIGS. 15 and 17.

Referring to FIG. 17, aspects of an additional embodiment are shown. In some embodiments, the energy storage cell 12 is deposited within an envelope 33. That is, the energy storage cell 12 has the barrier 30 disposed thereon, wrapped thereover, or otherwise applied to separate the energy storage cell 12 from the housing 7 once assembled. The envelope 33 may be applied well ahead of packaging the energy storage cell 12 into the housing 7. Therefore, use of an envelope 33 may present certain advantages, such as to manufacturers. (Note that the envelope 33 is shown as loosely disposed over the energy storage cell 12 for purposes of illustration).

In some embodiments, the envelope 33 is used in conjunction with the coating, wherein the coating is disposed over at least a portion of the interior surfaces. For example, in one embodiment, the coating is disposed within the interior of the housing 7 only in areas where the envelope 33 may be at least partially compromised (such as be a protruding terminal 8). Together, the envelope 33 and the coating form an efficient barrier 30.

Accordingly, incorporation of the barrier 30 may provide for an ultracapacitor that exhibits leakage current with comparatively low initial values and substantially slower increases in leakage current over time in view of the prior art. Significantly, the leakage current of the ultracapacitor remains at practical (i.e., desirably low) levels when the ultracapacitor is exposed to ambient temperatures for which prior art capacitors would exhibit prohibitively large initial values of leakage current and/or prohibitively rapid increases in leakage current over time.

As a matter of convention, the term "leakage current" generally refers to current drawn by the capacitor which is measured after a given period of time. This measurement is performed when the capacitor terminals are held at a substantially fixed potential difference (terminal voltage). When assessing leakage current, a typical period of time is seventy two (72) hours, although different periods may be used. It is noted that leakage current for prior art capacitors generally increases with increasing volume and surface area of the energy storage media and the attendant increase in the inner surface area of the housing. In general, an increasing leakage current is considered to be indicative of progressively increasing reaction rates within the ultracapacitor 10. Performance requirements for leakage current are generally defined by the environmental conditions prevalent in a particular application. For example, with regard to an ultracapacitor 10 having a volume of 20 mL, a practical limit on leakage current may fall below 100 mA.

Having thus described embodiments of the barrier 30, and various aspects thereof, it should be recognized the ultracapacitor 10 may exhibit other benefits as a result of reduced reaction between the housing 7 and the energy storage media 1. For example, an effective series resistance (ESR) of the ultracapacitor 10 may exhibit comparatively lower values over time. Further, unwanted chemical reactions that take place in a prior art capacitor often create unwanted effects such as out-gassing, or in the case of a hermetically sealed housing, bulging of the housing. In both cases, this leads to a compromise of the structural integrity of the housing and/or hermetic seal of the capacitor. Ultimately, this may lead to leaks or catastrophic failure of the prior art capacitor. In some embodiments, these effects may be substantially reduced or eliminated by the application of a disclosed barrier 30.

It should be recognized that the terms "barrier" and "coating" are not limiting of the teachings herein. That is, any technique for applying the appropriate material to the interior of the housing 7, body 20 and/or cap 24 may be used. For example, in other embodiments, the barrier 30 is actually fabricated into or onto material making up the housing body 20, the material then being worked or shaped as appropriate to form the various components of the housing 7. When considering some of the many possible techniques for applying the barrier 30, it may be equally appropriate to roll on, sputter, sinter, laminate, print, or otherwise apply the material(s). In short, the barrier 30 may be applied using any technique deemed appropriate by a manufacturer, designer and/or user.

Materials used in the barrier 30 may be selected according to properties such as reactivity, dielectric value, melting point, adhesion to materials of the housing 7, coefficient of friction, cost, and other such factors. Combinations of materials (such as layered, mixed, or otherwise combined) may be used to provide for desired properties.

Using an enhanced housing 7, such as one with the barrier 30, may, in some embodiments, limit degradation of the electrolyte 6. While the barrier 30 presents one technique for providing an enhanced housing 7, other techniques may be used. For example, use of a housing 7 fabricated from aluminum would be advantageous, due to the electrochemical properties of aluminum in the presence of electrolyte 6. However, given the difficulties in fabrication of aluminum, it has not been possible (until now) to construct embodiments of the housing 7 that take advantage of aluminum.

Additional embodiments of the housing 7 include those that present aluminum to all interior surfaces, which may be exposed to electrolyte, while providing users with an ability to weld and hermetically seal the housing. Improved performance of the ultracapacitor 10 may be realized through reduced internal corrosion, elimination of problems associated with use of dissimilar metals in a conductive media and for other reasons. Advantageously, the housing 7 makes use of existing technology, such available electrode inserts that include glass-to-metal seals (and may include those fabricated from stainless steel, tantalum or other advantageous materials and components), and therefore is economic to fabricate.

Although disclosed herein as embodiments of the housing 7 that are suited for the ultracapacitor 10, these embodiments (as is the case with the barrier 30) may be used with any type of energy storage deemed appropriate, and may include any type of technology practicable. For example, other forms of energy storage may be used, including electrochemical batteries, in particular, lithium based batteries.

In some embodiments, a material used for construction of the body 20 includes aluminum, which may include any type of aluminum or aluminum alloy deemed appropriate by a designer or fabricator (all of which are broadly referred to herein simply as "aluminum"). Various alloys, laminates, and the like may be disposed over (e.g., clad to) the aluminum (the aluminum being exposed to an interior of the body 20). Additional materials (such as structural materials or electrically insulative materials, such as some polymer-based materials) may be used to compliment the body and/or the housing 7. The materials disposed over the aluminum may likewise be chosen by what is deemed appropriate by a designer or fabricator.

In general, the material(s) exposed to an interior of the housing 7 exhibit adequately low reactivity when exposed to the electrolyte 6, and therefore are merely illustrative of some of the embodiments and are not limiting of the teachings herein.

Although this example depicts only one feed-through 19 on the cap 24, it should be recognized that the construction of the housing 7 is not limited by the embodiments discussed herein. For example, the cap 24 may include a plurality of feed-throughs 19. In some embodiments, the body 20 includes a second, similar cap 24 at the opposing end of the annular cylinder. Further, it should be recognized that the housing 7 is not limited to embodiments having an annular cylindrically shaped body 20. For example, the housing 7 may be a clamshell design, a prismatic design, a pouch, or of any other design that is appropriate for the needs of the designer, manufacturer or user.

A highly efficient seal of the housing 7 is desired. That is, preventing intrusion of the external environment (such as air, humidity, etc, . . . ) helps to maintain purity of the components of the energy storage cell 12. Further, this prevents leakage of electrolyte 6 from the energy storage cell 12.

Figure 18A:
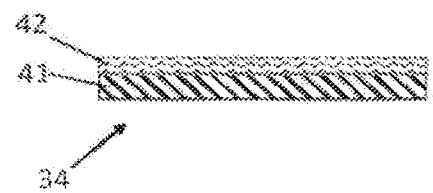
FIGS. 18A, 18B and 18C, collectively referred to herein as FIG. 18, depict embodiments of the cap that include multi-layered materials.

Referring now to FIG. 18, aspects of embodiments of a blank 34 for the cap 24 are shown. In FIG. 18A, the blank 34 includes a multi-layer material. A layer of a first material 41 is aluminum. A layer of a second material 42 is stainless steel. In the embodiments of FIG. 18, the stainless steel is clad onto the aluminum, thus providing for a material that exhibits a desired combination of metallurgical properties. That is, in the embodiments provided herein, the aluminum is exposed to an interior of the energy storage cell (i.e., the housing), while the stainless steel is exposed to exterior. In this manner, advantageous electrical properties of the aluminum are enjoyed, while structural properties (and metallurgical properties, i.e., weldability) of the stainless steel are relied upon for construction. The multi-layer material may include additional layers as deemed appropriate.

As mentioned above, the layer of first material 41 is clad onto (or with) the layer of second material 42. As used herein, the terms "clad," "cladding" and the like refer to the bonding together of dissimilar metals. Cladding is often achieved by extruding two metals through a die as well as pressing or rolling sheets together under high pressure. Other processes, such as laser cladding, may be used. A result is a sheet of material composed of multiple layers, where the multiple layers of material are bonded together such that the material may be worked with as a single sheet (e.g., formed as a single sheet of homogeneous material would be formed).

Figure 18B:
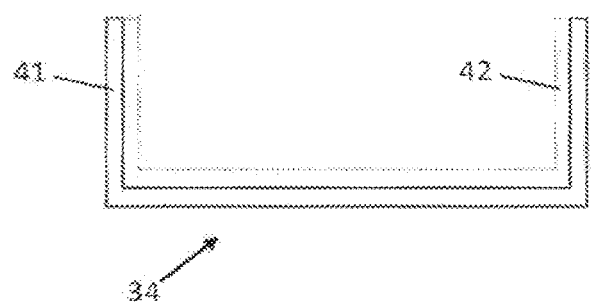
Figure 18C:
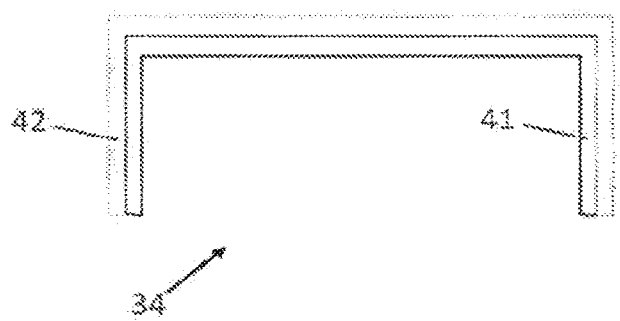

Referring still to FIG. 18A, in one embodiment, a sheet of flat stock (as shown) is used to provide the blank 34 to create a flat cap 24. A portion of the layer of second material 42 may be removed (such as around a circumference of the cap 24) in order to facilitate attachment of the cap 24 to the body 20. In FIG. 18B, another embodiment of the blank 34 is shown. In this example, the blank 34 is provided as a sheet of clad material that is formed into a concave configuration. In FIG. 18C, the blank 34 is provided as a sheet of clad material that is formed into a convex configuration. The cap 24 that is fabricated from the various embodiments of the blank 34 (such as those shown in FIG. 18), are configured to support welding to the body 20 of the housing 7. More specifically, the embodiment of FIG. 18B is adapted for fitting within an inner diameter of the body 20, while the embodiment of FIG. 18C is adapted for fitting over an outer diameter of the body 20. In various alternative embodiments, the layers of clad material within the sheet may be reversed.

When assembled, the cap 24 may be welded to the body 20, thus providing users with a hermetic seal. Exemplary welding techniques include laser welding and TIG welding, and may include other forms of welding as deemed appropriate.

Figure 19:
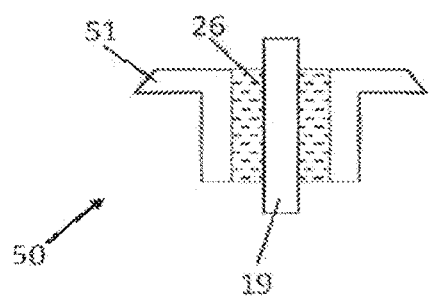
FIG. 19 is a cross-sectional view of an electrode assembly that includes a glass-to-metal seal.

Referring now to FIG. 19, there is shown an embodiment of an electrode assembly 50. The electrode assembly 50 is designed to be installed into the blank 34 and to provide electrical communication from the energy storage media to a user. Generally, the electrode assembly 50 includes a sleeve 51. The sleeve 51 surrounds the insulator 26, which in turn surrounds the feed-through 19. In this example, the sleeve 51 is an annular cylinder with a flanged top portion.

Figure 20:
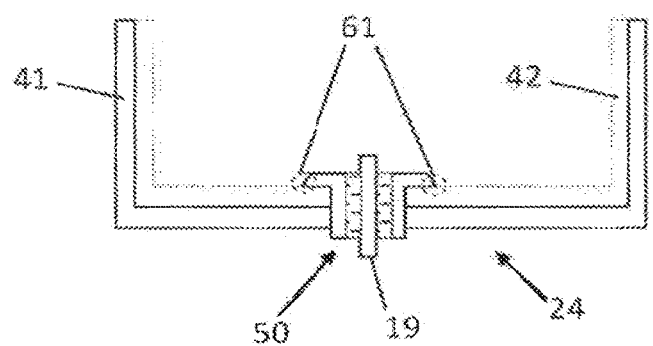
FIG. 20 is a cross-sectional view of the electrode assembly of FIG. 19 installed in the cap of FIG. 18B.

In order to assemble the cap 24, a perforation (not shown) is made in the blank 34. The perforation has a geometry that is sized to match the electrode assembly 50. Accordingly, the electrode assembly 50 is inserted into perforation of the blank 34. Once the electrode assembly 50 is inserted, the electrode assembly 50 may be affixed to the blank 34 through a technique such as welding. The welding may be laser welding which welds about a circumference of the flange of sleeve 51. Referring to FIG. 20, points 61 where welding is performed are shown. In this embodiment, the points 61 provide suitable locations for welding of stainless steel to stainless steel, a relatively simple welding procedure. Accordingly, the teachings herein provide for welding the electrode assembly 50 securely into place on the blank 34.

Material for constructing the sleeve 51 may include various types of metals or metal alloys. Generally, materials for the sleeve 51 are selected according to, for example, structural integrity and bondability (to the blank 34). Exemplary materials for the sleeve 51 include 304 stainless steel or 316 stainless steel. Material for constructing the feed-through 19 may include various types of metals or metal alloys. Generally, materials for the feedthrough 19 are selected according to, for example, structural integrity and electrical conductance. Exemplary materials for the electrode include 446 stainless steel or 52 alloy.

Generally, the insulator 26 is bonded to the sleeve 51 and the feed-through 19 through known techniques (i.e., glass-to-metal bonding), insulator 26 may include, without limitation, various types of glass, including high temperature glass, ceramic glass or ceramic materials. Generally, materials for the insulator are selected according to, for example, structural integrity and electrical resistance (i.e., electrical insulation properties).

Use of components (such as the foregoing embodiment of the electrode assembly 50) that rely on glass-to-metal bonding as well as use of various welding techniques provides for hermetic sealing of the energy storage. Other components may be used to provide hermetic sealing as well. As used herein, the term "hermetic seal" generally refers to a seal that exhibits a leak rate no greater than that which is defined herein. However, it is considered that the actual seal efficacy may perform better than this standard.

Additional or other techniques for coupling the electrode assembly 50 to the blank 34 include use of a bonding agent under the flange of the sleeve 51 (between the flange and the layer of second material 42), when such techniques are considered appropriate.

Figure 21:
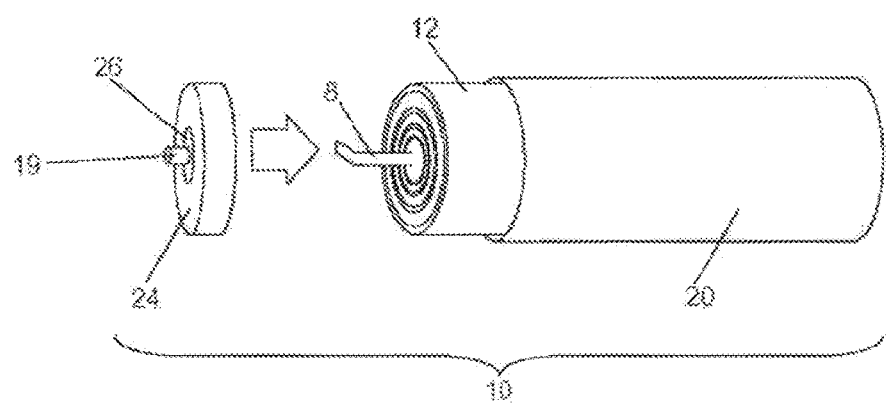
FIG. 21 depicts an arrangement of the energy storage cell in assembly.

Referring now to FIG. 21, the energy storage cell 12 is disposed within the body 20. The at least one terminal 8 is coupled appropriately (such as to the feed-through 19), and the cap 24 is mated with the body 20 to provide for the ultracapacitor 10.

Figure 22A:
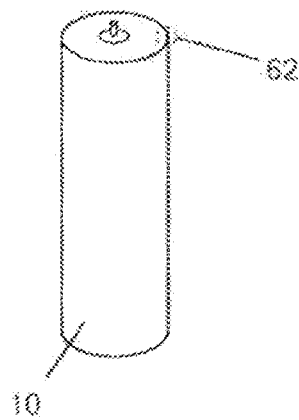
FIGS. 22A, 22B and 22C, collectively referred to herein as FIG. 22, depict embodiments of an assembled energy storage cell.
Figure 22B:
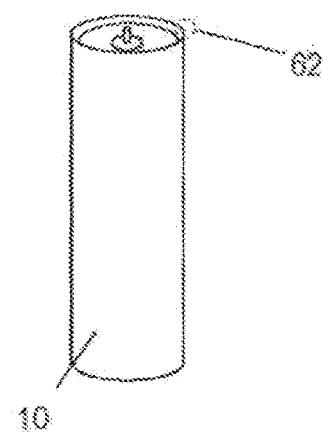
Figure 22C:
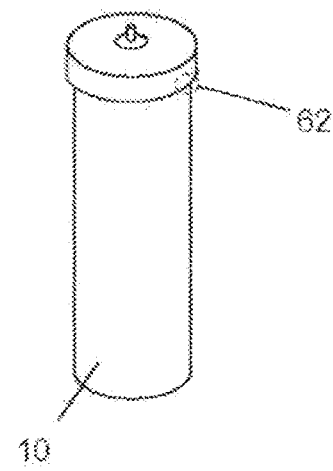

Once assembled, the cap 24 and the body 20 may be sealed. FIG. 22 depicts various embodiments of the assembled energy storage (in this case, the ultracapacitor 10). In FIG. 22A, a flat blank 34 (see FIG. 18A) is used to create a flat cap 24. Once the cap 24 is set on the body 20, the cap 24 and the body 20 are welded to create a seal 62. In this case, as the body 20 is an annular cylinder, the weld proceeds circumferentially about the body 20 and cap 24 to provide the seal 62. In a second embodiment, shown in FIG. 22B, the concave blank 34 (see FIG. 18B) is used to create a concave cap 24. Once the cap 24 is set on the body 20, the cap 24 and the body 20 are welded to create the seal 62. In a third embodiment, shown in FIG. 22C, the convex blank 34 (see FIG. 18C) is used to create a convex cap 24. Once the cap 24 is set on the body 20, the cap 24 and the body 20 may be welded to create the seal 62.

As appropriate, clad material may be removed (by techniques such as, for example, machining or etching, etc, . . . ) to expose other metal in the multi-layer material. Accordingly, in some embodiments, the seal 62 may include an aluminum-to-aluminum weld. The aluminum-to-aluminum weld may be supplemented with other fasteners, as appropriate.

Other techniques may be used to seal the housing 7. For example, laser welding, TIG welding, resistance welding, ultrasonic welding, and other forms of mechanical sealing may be used. It should be noted, however, that in general, traditional forms of mechanical sealing alone are not adequate for providing the robust hermetic seal offered in the ultracapacitor 10.

In some embodiments, the multi-layer material is used for internal components. For example, aluminum may be clad with stainless steel to provide for a multilayer material in at least one of the terminals 8. In some of these embodiments, a portion of the aluminum may be removed to expose the stainless steel. The exposed stainless steel may then be used to attach the terminal 8 to the feed-through 19 by use of simple welding procedures.

Using the clad material for internal components may call for particular embodiments of the clad material. For example, it may be beneficial to use clad material that include aluminum (bottom layer), stainless steel and/or tantalum (intermediate layer) and aluminum (top layer), which thus limits exposure of stainless steel to the internal environment of the ultracapacitor 10. These embodiments may be augmented by, for example, additional coating with polymeric materials, such as PTFE.

In general, assembly of the housing often involves placing the storage cell 12 within the body 20 and filling the body 20 with the electrolyte 6. A drying process may be performed. Exemplary drying includes heating the body 20 with the storage cell 12 and electrolyte 6 therein, often under a reduced pressure (e.g., a vacuum). Once adequate (optional) drying has been performed, final steps of assembly may be performed. In the final steps, internal electrical connections are made, the cap 24 is installed, and the cap 24 is hermetically sealed to the body 20, by, for example, welding the cap 24 to the body 20.

Accordingly, providing a housing 7 that takes advantage of multi-layered material provides for an energy storage that exhibits leakage current with comparatively low initial values and substantially slower increases in leakage current over time in view of the prior art. Significantly, the leakage current of the energy storage remains at practical (i.e., desirably low) levels when the ultracapacitor 10 is exposed to ambient temperatures for which prior art capacitors would exhibit prohibitively large initial values of leakage current and/or prohibitively rapid increases in leakage current over time.

Additionally, the ultracapacitor 10 may exhibit other benefits as a result of reduced reaction between the housing 7 and the energy storage cell 12. For example, an effective series resistance (ESR) of the energy storage may exhibit comparatively lower values over time. Further, the unwanted chemical reactions that take place in a prior art capacitor often create create unwanted effects such as outgassing, or in the case of a hermetically sealed housing, bulging of the housing 7. In both cases, this leads to a compromise of the structural integrity of the housing 7 and/or hermetic seal of the energy storage. Ultimately, this may lead to leaks or catastrophic failure of the prior art capacitor. These effects may be substantially reduced or eliminated by the application of a disclosed barrier.

Accordingly, users are now provided with a housing 7 for the energy storage, where a substantial portion up to all of the interior surfaces of the housing 7 are aluminum (and may include a non-interfering material, as described below). Thus, problems of internal corrosion are avoided and designers are afforded greater flexibility in selection of appropriate materials for the electrolyte 6.

By use of a multi-layer material (e.g., a clad material), stainless steel may be incorporated into the housing 7, and thus components with glass-to-metal seals may be used. The components may be welded to the stainless steel side of the clad material using techniques such as laser or resistance welding, while the aluminum side of the clad material may be welded to other aluminum parts (e.g., the body 20).

Figure 23:
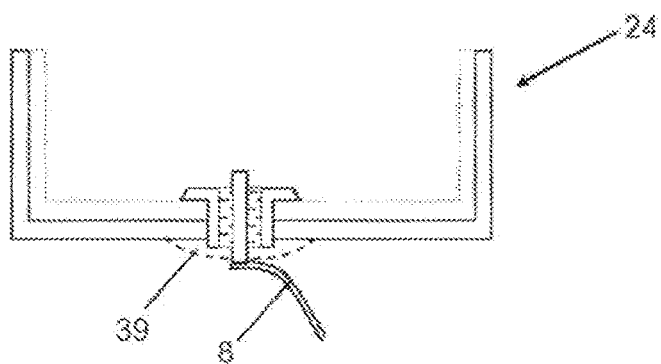
FIG. 23 depicts incorporation of polymeric insulation into the ultracapacitor.

In some embodiments, an insulative polymer may be used to coat parts of the housing 7. In this manner, it is possible to insure that the components of the energy storage are only exposed to acceptable types of metal (such as the aluminum). Exemplary insulative polymer includes PFA, FEP, TFE, and PTFE. Suitable polymers (or other materials) are limited only by the needs of a system designer or fabricator and the properties of the respective materials. Reference may be had to FIG. 23, where a small amount of insulative material 39 is included to limit exposure of electrolyte 6 to the stainless steel of the sleeve 51 and the feed-through 19. In this example, the terminal 8 is coupled to the feed-through 19, such as by welding, and then coated with the insulative material 39.

Figure 24A:
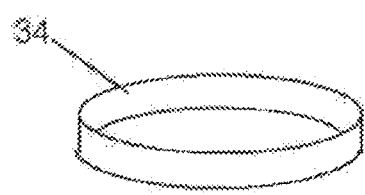
FIGS. 24A, 24B and 24C, collectively referred to herein as FIG. 24, depict aspects of a template for another embodiment of the cap for the energy storage.
Figure 24B:
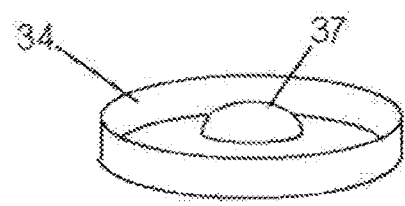
Figure 24C:
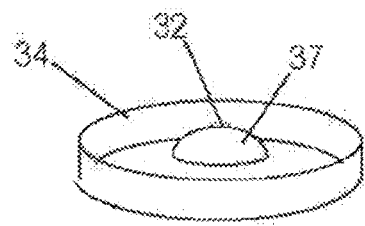

Refer now to FIG. 24 in which aspects of assembly another embodiment of the cap 24 are depicted. FIG. 4A depicts a template (i.e., the blank 34) that is used to provide a body of the cap 24. The template is generally sized to mate with the housing 7 of an appropriate type of energy storage cell (such as the ultracapacitor 10). The cap 24 may be formed by initially providing the template forming the template, including a dome 37 within the template (shown in FIG. 24B) and by then perforating the dome 37 to provide a throughway 32 (shown in FIG. 24C). Of course, the blank 34 (e.g., a circular piece of stock) may be pressed or otherwise fabricated such that the foregoing features are simultaneously provided.

In general, and with regard to these embodiments, the cap may be formed of aluminum, or an alloy thereof. However, the cap may be formed of any material that is deemed suitable by a manufacturer, user, designer and the like. For example, the cap 24 may be fabricated from steel and passivated (i.e., coated with an inert coating) or otherwise prepared for use in the housing 7.

Figure 25:
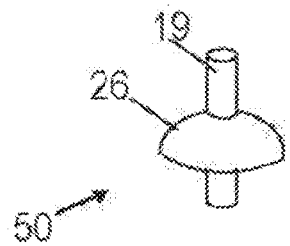
FIG. 25 is a perspective view of an electrode assembly that includes hemispherically shaped material.

Referring now also to FIG. 25, there is shown another embodiment of the electrode assembly 50. In these embodiments, the electrode assembly 50 includes the feedthrough 19 and a hemispherically shaped material disposed about the feed-through 19. The hemi spherically shaped material serves as the insulator 26, and is generally shaped to conform to the dome 37. The hemispheric insulator 26 may be fabricated of any suitable material for providing a hermetic seal while withstanding the chemical influence of the electrolyte 6. Exemplary materials include PFA (perfluoroalkoxy polymer), FEP (fluorinated ethylene-propylene), PVF (polyvinylfluoride), TFE (tetrafluoroethylene), CTFE (chlorotrifluoroethylene), PCTFE (polychlorotrifluoroethylene), ETFE (polyethylenetetrafluoroethylene), ECTFE (polyethylenechlorotrifluoroethylene), PTFE (polytetrafluoroethylene), another fluoropolymer based material as well as any other material that may exhibit similar properties (in varying degrees) and provide for satisfactory performance (such as by exhibiting, among other things, a high resistance to solvents, acids, and bases at high temperatures, low cost and the like).

The feed-through 19 may be formed of aluminum, or an alloy thereof. However, the feed-through 19 may be formed of any material that is deemed suitable by a manufacturer, user, designer and the like. For example, the feed-through 19 may be fabricated from steel and passivated (i.e., coated with an inert coating, such as silicon) or otherwise prepared for use in the electrode assembly 50. An exemplary technique for passivation includes depositing a coating of hydrogenated amorphous silicon on the surface of the substrate and functionalizing the coated substrate by exposing the substrate to a binding reagent having at least one unsaturated hydrocarbon group under pressure and elevated temperature for an effective length of time. The hydrogenated amorphous silicon coating is deposited by exposing the substrate to silicon hydride gas under pressure and elevated temperature for an effective length of time.

The hemispheric insulator 26 may be sized relative to the dome 37 such that a snug fit (i.e., hermetic seal) is achieved when assembled into the cap 24. The hemispheric insulator 26 need not be perfectly symmetric or of classic hemispheric proportions. That is, the hemispheric insulator 26 is substantially hemispheric, and may include, for example, slight adjustments in proportions, a modest flange (such as at the base) and other features as deemed appropriate. The hemispheric insulator 26 is generally formed of homogeneous material, however, this is not a requirement. For example, the hemispheric insulator 26 may include an air or gas filled toms (not shown) therein to provide for desired expansion or compressibility.

Figure 26:
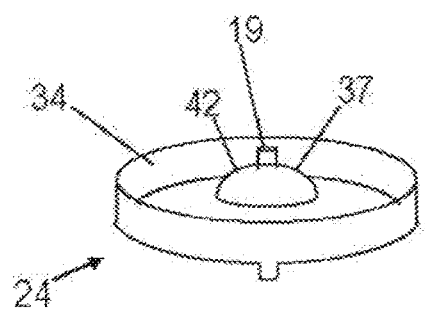
FIG. 26 is a perspective view of a cap including the electrode assembly of FIG. 25 installed in the template of FIG. 24.

As shown in FIG. 26, the electrode assembly 50 may be inserted into the template (i.e., the formed blank 34) to provide for an embodiment of the cap 24 that includes a hemispheric hermetic seal.

Figure 27:
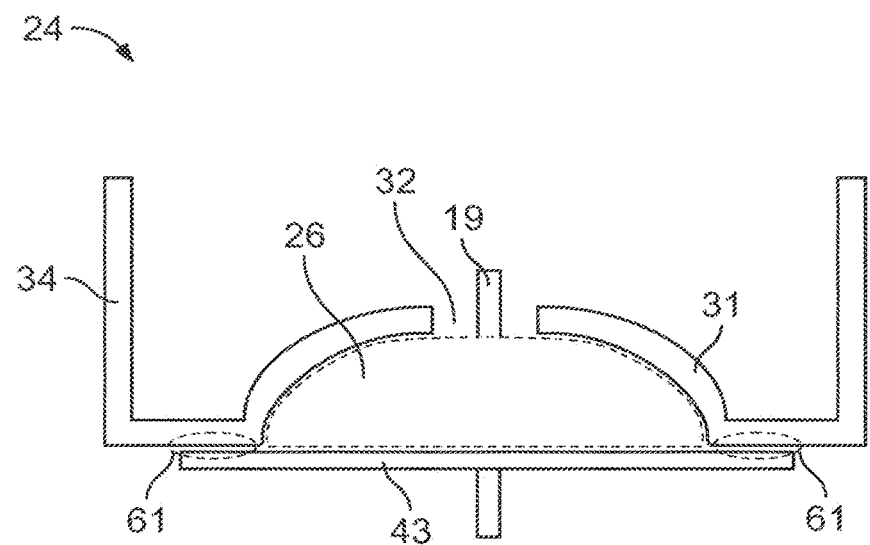
FIG. 27 is a cross-sectional view of the cap of FIG. 26.

As shown in FIG. 27, in various embodiments, a retainer 43 may be bonded or otherwise mated to a bottom of the cap 24 (i.e., a portion of the cap 24 that faces to an interior of the housing 7 and faces the energy storage cell 12). The retainer 43 may be bonded to the cap 24 through various techniques, such as aluminum welding (such as laser, ultrasonic and the like). Other techniques may be used for the bonding, including for example, stamping (i.e., mechanical bonding) and brazing. The bonding may occur, for example, along a perimeter of the retainer 43. Generally, the bonding is provided for in at least one bonding point to create a desired seal 71. At least one fastener, such as a plurality of rivets may be used to seal the insulator 26 within the retainer 43.

In the example of FIG. 27, the cap 24 is of a concave design (see FIG. 18B). However, other designs may be used. For example, a convex cap 24 may be provided (FIG. 18C), and an over-cap 24 may also be used (a variation of the embodiment of FIG. 18C, which is configured to mount as depicted in FIG. 22C).

In some embodiments, at least one of the housing 7 and the cap 24 include materials that include a plurality of layers. For example, a first layer of material may include aluminum, with a second layer of material being stainless steel. In this example, the stainless steel is clad onto the aluminum, thus providing for a material that exhibits a desired combination of metallurgical properties. That is, in the embodiments provided herein, the aluminum is exposed to an interior of the energy storage cell (i.e., the housing), while the stainless steel is exposed to exterior. In this manner, advantageous electrical properties of the aluminum are enjoyed, while structural properties (and metallurgical properties, i.e., weldability) of the stainless steel are relied upon for construction. The multi-layer material may include additional layers as deemed appropriate. Advantageously, this provides for welding of stainless steel to stainless steel, a relatively simple welding procedure.

The material used for the cap as well as the feed-through 19 may be selected with regard for thermal expansion of the hemispheric insulator 26. Further, manufacturing techniques may also be devised to account for thermal expansion. For example, when assembling the cap 24, a manufacturer may apply pressure to the hemispheric insulator 26, thus at least somewhat compressing the hemispheric insulator 26. In this manner, there at least some thermal expansion of the cap 24 is provided for without jeopardizing efficacy of the hermetic seal.

While material used for construction of the body 20 includes aluminum, any type of aluminum or aluminum alloy deemed appropriate by a designer or fabricator (all of which are broadly referred to herein simply as "aluminum"). Various alloys, laminates, and the like may be disposed over (e.g., clad to) the aluminum (the aluminum being exposed to an interior of the body 20. Additional materials (such as structural materials or electrically insulative materials, such as some polymer-based materials) may be used to compliment the body and/or the housing 7. The materials disposed over the aluminum may likewise be chosen by what is deemed appropriate by a designer or fabricator.

Use of aluminum is not necessary or required. In short, material selection may provide for use of any material deemed appropriate by a designer, fabricator, or user and the Considerations may be given to various factors, such as, for example, reduction of electrochemical interaction with the electrolyte 6, structural properties, cost and the like.

Figure 28:
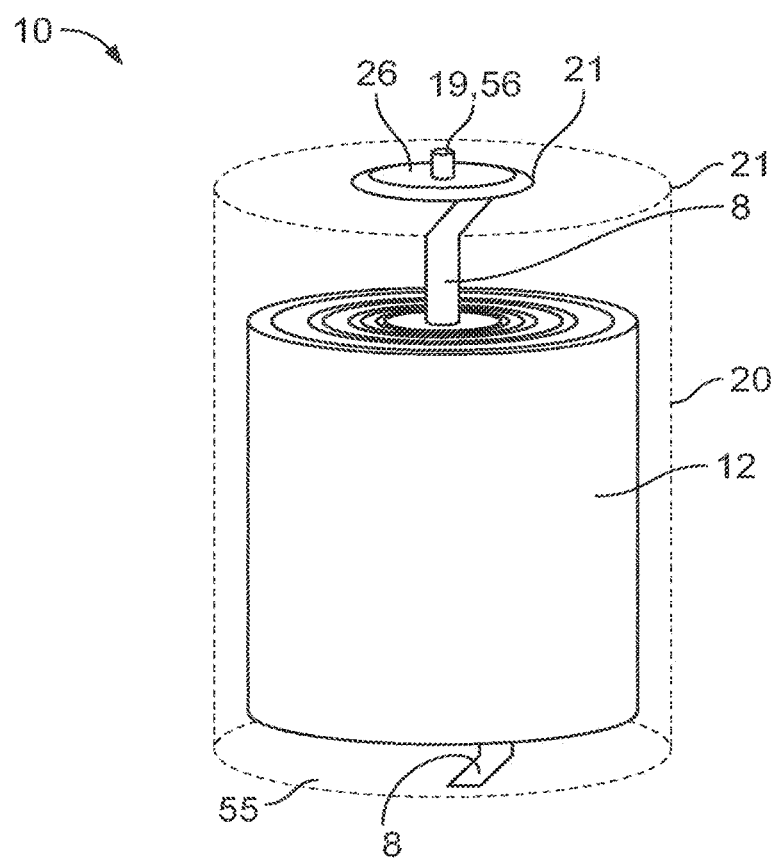
FIG. 28 depicts coupling of the electrode assembly with a terminal of a storage cell.

The storage cell 12 is now discussed in greater detail. Refer to FIG. 28, where a cut-away view of the ultracapacitor 10 is provided. In this example, the storage cell 12 is inserted into and contained within the body 20. Each plurality of leads are bundled together and coupled to the housing 7 as one of the terminals 8. In some embodiments, the plurality of leads are coupled to a bottom of the body 20 (on the interior), thus turning the body 20 into a negative contact 55. Likewise, another plurality of leads are bundled and coupled to the feedthrough 19, to provide a positive contact 56. Electrical isolation of the negative contact 55 and the positive contact 56 is preserved by the electrical insulator 26. Generally, coupling of the leads is accomplished through welding, such as at least one of laser and ultrasonic welding. Of course, other techniques may be used as deemed appropriate.

It should be recognized that robust assembly techniques are required to provide a highly efficient energy storage. Accordingly, some of the techniques for assembly are now discussed.

Referring now to FIG. 29, components of an exemplary electrode 3 are shown. In this example, the electrode 3 will be used as the negative electrode 3 (however, this designation is arbitrary and merely for referencing).

As may be noted from the illustration, at least in this embodiment, the separator 5 is generally of a longer length and wider width than the energy storage media 1 (and the current collector 2). By using a larger separator 5, protection is provided against short circuiting of the negative electrode 3 with the positive electrode 3. Use of additional material in the separator 5 also provides for better electrical protection of the leads and the terminal 8.

Refer now to FIG. 30 which provides a side view of an embodiment of the storage cell 12. In this example, a layered stack of energy storage media 1 includes a first separator 5 and a second separator 5, such that the electrodes 3 are electrically separated when the storage cell 12 is assembled into a rolled storage cell 23. Note that the term "positive55 and "negative55 with regard to the electrode 3 and assembly of the ultracapacitor 10 is merely arbitrary, and makes reference to functionality when configured in the ultracapacitor 10 and charge is stored therein. This convention, which has been commonly adopted in the art, is not meant to apply that charge is stored prior to assembly, or connote any other aspect other than to provide for physical identification of different electrodes.

Prior to winding the storage cell 12, the negative electrode 3 and the positive electrode 3 are aligned with respect to each other. Alignment of the electrodes 3 gives better performance of the ultracapacitor 10 as a path length for ionic transport is generally minimized when there is a highest degree of alignment. Further, by providing a high degree of alignment, excess separator 5 is not included and efficiency of the ultracapacitor 10 does not suffer as a result.

Referring now also to FIG. 31, there is shown an embodiment of the storage cell 12 wherein the electrodes 3 have been rolled into the rolled storage cell 23. One of the separators 5 is present as an outermost layer of the storage cell 12 and separates energy storage media 1 from an interior of the housing 7.

"Polarity matching55 may be employed to match a polarity of the outermost electrode in the rolled storage cell 23 with a polarity of the body 20. For example, in some embodiments, the negative electrode 3 is on the outermost side of the tightly packed package that provides the rolled storage cell 23. In these embodiments, another degree of assurance against short circuiting is provided. That is, where the negative electrode 3 is coupled to the body 20, the negative electrode 3 is the placed as the outermost electrode in the rolled storage cell 23. Accordingly, should the separator 5 fail, such as by mechanical wear induced by vibration of the ultracapacitor 10 during usage, the ultracapacitor 10 will not fail as a result of a short circuit between the the outermost electrode in the rolled storage cell 23 and the body 20.

For each embodiment of the rolled storage cell 23, a reference mark 72 may be in at least the separator 5. The reference mark 72 will be used to provide for locating the leads on each of the electrodes 3. In some embodiments, locating of the leads is provided for by calculation. For example, by taking into account an inner diameter of the jelly roll and an overall thickness for the combined separators 5 and electrodes 3, a location for placement of each of the leads may be estimated. However, practice has shown that it is more efficient and effective to use a reference mark 72. The reference mark 72 may include, for example, a slit in an edge of the separator(s) 5.

Generally, the reference mark 72 is employed for each new specification of the storage cell 12. That is, as a new specification of the storage cell 12 may call for differing thickness of at least one layer therein (over a prior embodiment), use of prior reference marks may be at least somewhat inaccurate.

Figure 32:
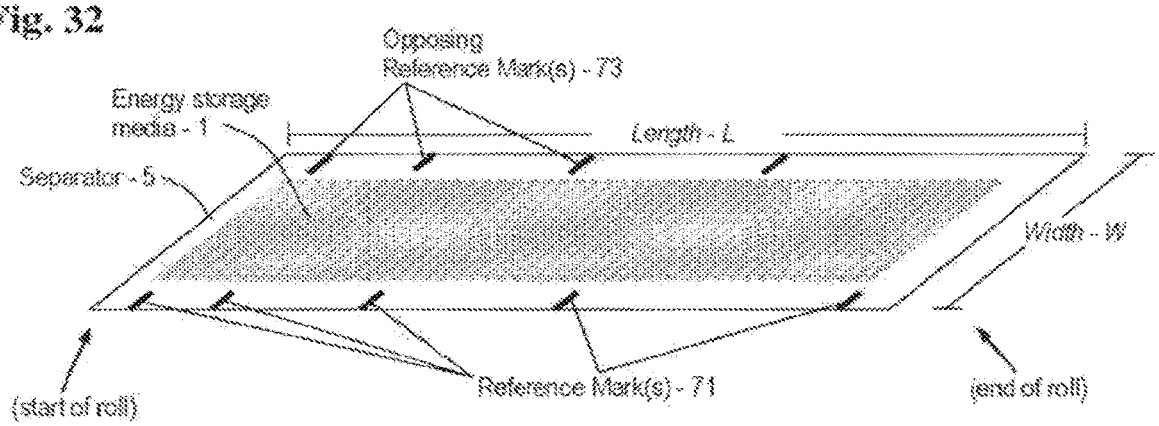
FIG. 32 is an isometric view of the storage cell of FIG. 31 once unrolled.

In general, the reference mark 72 is manifested as a single radial line that traverses the roll from a center thereof to a periphery thereof. Accordingly, when the leads are installed along the reference mark 72, each lead will align with the remaining leads (as shown in FIG. 10). However, when the storage cell 12 is unrolled (for embodiments where the storage cell 12 is or will become a roll), the reference mark 72 may be considered to be a plurality of markings (as shown in FIG. 32). As a matter of convention, regardless of the embodiment or appearance of marking of the storage cell 12, identification of a location for incorporation of the lead is considered to involve determination of a "reference mark 72" or a "set of reference marks 72."

Referring now to FIG. 32, once the reference mark 72 has been established (such as by marking a rolled up storage cell 12), an installation site for installation each of the leads is provided (i.e., described by the reference mark 72). Once each installation site has been identified, for any given build specification of the storage cell 12, the relative location of each installation site may be repeated for additional instances of the particular build of storage cell 12.

Generally, each lead is coupled to a respective current collector 2 in the storage cell 12. In some embodiments, both the current collector 2 and the lead are fabricated from aluminum. Generally, the lead is coupled to the current collector 2 across the width, W however, the lead may be coupled for only a portion of the width, W. The coupling may be accomplished by, for example, ultrasonic welding of the lead to the current collector 2. In order to accomplish the coupling, at least some of the energy storage media 1 may be removed (as appropriate) such that each lead may be appropriately joined with the current collector 2. Other preparations and accommodations may be made, as deemed appropriate, to provide for the coupling.

Of course, opposing reference marks 73 may be included. That is, in the same manner as the reference marks 72 are provided, a set of opposing reference marks 73 may be made to account for installation of leads for the opposing polarity. That is, the reference marks 72 may be used for installing leads to a first electrode 3, such as the negative electrode 3, while the opposing reference marks 73 may be used for installing leads to the positive electrode 3. In the embodiment where the rolled storage cell 23 is cylindrical, the opposing reference marks 73 are disposed on an opposite side of the energy storage media 1, and offset lengthwise from the reference marks 72 (as depicted).

Note that in FIG. 32, the reference marks 72 and the opposing reference marks 73 are both shown as being disposed on a single electrode 3. That is, FIG. 29 depicts an embodiment that is merely for illustration of spatial (i.e., linear) relation of the reference marks 72 and the opposing reference marks 73. This is not meant to imply that the positive electrode 3 and the negative electrode 3 share energy storage media 1. However, it should be noted that in instances where the reference marks 72 and the opposing reference marks 73 are placed by rolling up the storage cell 12 and then marking the separator 5, that the reference marks 72 and the opposing reference marks 73 may indeed by provided on a single separator 5. However, in practice, only one set of the reference marks 72 and the opposing reference marks 73 would be used to install the leads for any given electrode 3. That is, it should be recognized that the embodiment depicted in FIG. 32 is to be complimented with another layer of energy storage media 1 for another electrode 3 which will be of an opposing polarity.

Figure 33:
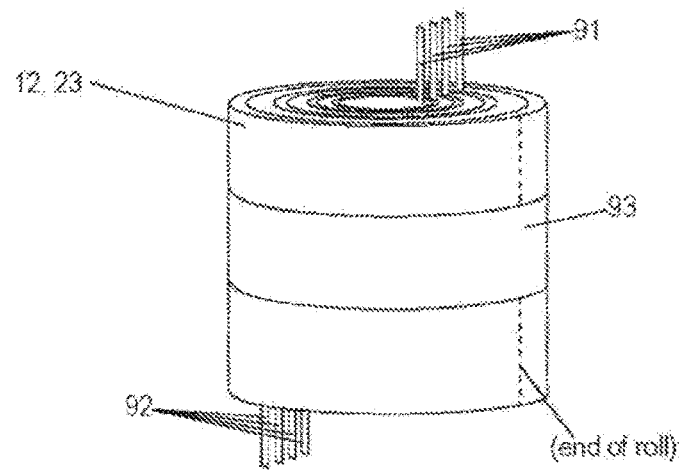
FIG. 33 depicts the rolled up storage cell with the plurality of leads included.
Figure 34:
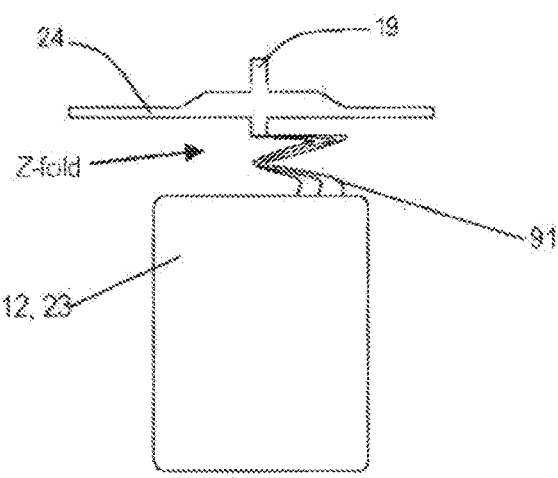
FIG. 34 depicts a Z-fold imparted into aligned leads (i.e., a terminal) coupled to the storage cell.

As shown in FIG. 33, the foregoing assembly technique results in a storage cell 12 that includes at least one set of aligned leads. A first set of aligned leads 91 are particularly useful when coupling the rolled storage cell 23 to one of the negative contact 55 and the positive contact 56, while a set of opposing aligned leads 92 provide for coupling the energy storage media 1 to an opposite contact (55, 56).

The rolled storage cell 23 may be surrounded by a wrapper 93. The wrapper 93 may be realized in a variety of embodiments. For example, the wrapper 93 may be provided as KAPTON™ tape (which is a polyimide film developed by DuPont of Wilmington Del.), or PTFE tape. In this example, the KAPTON™ tape surrounds and is adhered to the rolled storage cell 23. The wrapper 93 may be provided without adhesive, such as a tightly fitting wrapper 93 that is slid onto the rolled storage cell 23. The wrapper 93 may be manifested more as a bag, such as one that generally engulfs the rolled storage cell 23 (e.g., such as the envelope 73 discussed above). In some of these embodiments, the wrapper 93 may include a material that functions as a shrink-wrap would, and thereby provides an efficient physical (and in some embodiments, chemical) enclosure of the rolled storage cell 23. Generally, the wrapper 93 is formed of a material that does not interfere with electrochemical functions of the ultracapacitor 10. The wrapper 93 may also provide partial coverage as needed, for example, to aid insertion of the rolled storage cell 23.

In some embodiments, the negative leads and the positive leads are located on opposite sides of the rolled storage cell 23 (in the case of a jelly-roll type rolled storage cell 23, the leads for the negative polarity and the leads for the positive polarity may be diametrically opposed). Generally, placing the leads for the negative polarity and the leads for the positive polarity on opposite sides of the rolled storage cell 23 is performed to facilitate construction of the rolled storage cell 23 as well as to provide improved electrical separation.

In some embodiments, once the aligned leads 91, 92 are assembled, each of the plurality of aligned leads 91, 92 are bundled together (in place) such that a shrink-wrap (not shown) may be disposed around the plurality of aligned leads 91, 92. Generally, the shrink-wrap is formed of PTFE, however, any compatible material may be used.

In some embodiments, once shrink-wrap material has been placed about the aligned leads 91, the aligned leads 91 are folded into a shape to be assumed when the ultracapacitor 10 has been assembled. That is, with reference to FIG. 34, it may be seen that the aligned leads assume a "Z" shape. After imparting a "Z-fold" into the aligned leads 91, 92 and applying the shrink-wrap, the shrink-wrap may be heated or otherwise activated such that the shrink-wrap shrinks into place about the aligned leads 91, 92. Accordingly, in some embodiments, the aligned leads 91, 92 may be strengthened and protected by a wrapper. Use of the Z-fold is particularly useful when coupling the energy storage media 1 to the feedthrough 19 disposed within the cap 24.

Of course, other embodiments for coupling each set of aligned leads 91, 92 (i.e., each terminal 8) to a respective contact 55, 56 may be practiced. For example, in one embodiment, an intermediate lead is coupled to the one of the feed-through 19 and the housing 7, such that coupling with a respective set of aligned leads 91, 92 is facilitated.

Materials used may be selected according to properties such as reactivity, dielectric value, melting point, adhesion to other materials, weldability, coefficient of friction, cost, and other such factors. Combinations of materials (such as layered, mixed, or otherwise combined) may be used to provide for desired properties.

In a variety of embodiments, it is useful to use a plurality of the ultracapacitors 10 together to provide a power supply. In order to provide for reliable operation, individual ultracapacitors 10 may be tested in advance of use. In order to perform various types of testing, each of the ultracapacitors 10 may be tested as a singular cell, in series or in parallel with multiple ultracapacitors 10 attached. Using different metals joined by various techniques (such as by welding) can reduce the ESR of the connection as well as increase the strength of the connections. Some aspects of connections between ultracapacitors 10 are now introduced.

In some embodiments, the ultracapacitor 10 includes two contacts. The two contacts are the glass-to-metal seal pin (i.e., the feed-through 19) and the entire rest of the housing 7. When connecting a plurality of the ultracapacitors 10 in series, it is often desired to couple an interconnection between a bottom of the housing 7 (in the case of the cylindrical form housing 7), such that distance to the internal leads is minimized, and therefore of a minimal resistance. In these embodiments, an opposing end of the interconnection is usually coupled to the pin of the glass-to-metal seal.

With regard to interconnections, a common type of weld involves use of a parallel tip electric resistance welder. The weld may be made by aligning an end of the interconnection above the pin and welding the interconnection directly to the pin. Using a number of welds will increase the strength and connection between the interconnection and the pin. Generally, when welding to the pin, configuring a shape of the end of the interconnection to mate well with the pin serves to ensure there is substantially no excess material overlapping the pin that would cause a short circuit.

An opposed tip electric resistance welder may be used to weld the interconnection to the pin, while an ultrasonic welder may used to weld the interconnection to the bottom of the housing 7. Soldering techniques may used when metals involved are compatible.

With regard to materials used in interconnections, a common type of material used for the interconnection is nickel. Nickel may be used as it welds well with stainless steel and has a strong interface. Other metals and alloys may be used in place of nickel, for example, to reduce resistance in the interconnection.

Generally, material selected for the interconnection is chosen for compatibility with materials in the pin as well as materials in the housing 7. Exemplary materials include copper, nickel, tantalum, aluminum, and nickel copper clad. Further metals that may be used include silver, gold, brass, platinum, and tin.

In some embodiments, such as where the pin (i.e., the feed-through 19) is made of tantalum, the interconnection may make use of intermediate metals, such as by employing a short bridge connection. An exemplary bridge connection includes a strip of tantalum, which has been modified by use of the opposed tip resistance welder to weld a strip of aluminum/copper/nickel to the bridge. A parallel resistance welder is then used to weld the tantalum strip to the tantalum pin.

The bridge may also be used on the contact that is the housing 7. For example, a piece of nickel may be resistance welded to the bottom of the housing 7. A strip of copper may then be ultrasonic welded to the nickel bridge. This technique helps to decrease resistance of cell interconnections. Using different metals for each connection can reduce the ESR of the interconnections between cells in series.

Having thus described aspects of a robust ultracapacitor 10 that is useful for high temperature environments (i.e., up to about 250 degrees Celsius), some additional aspects are now provided and/or defined.

A variety of materials may be used in construction of the ultracapacitor 10. Integrity of the ultracapacitor 10 is essential if oxygen and moisture are to be excluded and the electrolyte 6 is to be prevented from escaping. To accomplish this, seam welds and any other sealing points should meet standards for hermeticity over the intended temperature range for operation. Also, materials selected should be compatible with other materials, such as ionic liquids and solvents that may be used in the formulation of the electrolyte 6.

In some embodiments, the feed-through 19 is formed of metal such as at least one of KOVAR™ (a trademark of Carpenter Technology Corporation of Reading, Pa., where KOVAR is a vacuum melted, iron-nickel-cobalt, low expansion alloy whose chemical composition is controlled within narrow limits to assure precise uniform thermal expansion properties), Alloy 52 (a nickel iron alloy suitable for glass and ceramic sealing to metal), tantalum, molybdenum, niobium, tungsten, Stainless Steel 446 (a ferritic, non-heat treatable stainless steel that offers good resistance to high temperature corrosion and oxidation) and titanium.

The body of glass-to-metal seals that take advantage of the foregoing may be fabricated from 300 series stainless steels, such as 304, 304L, 316, and 316L alloys. The bodies may also be made from metal such as at least one of various nickel alloys, such as Inconel (a family of austenitic nickel-chromium-based superalloys that are oxidation and corrosion resistant materials well suited for service in extreme environments subjected to pressure and heat) and Hastelloy (a highly corrosion resistant metal alloy that includes nickel and varying percentages of molybdenum, chromium, cobalt, iron, copper, manganese, titanium, zirconium, aluminum, carbon, and tungsten).

The insulating material between the feed-through 19 and the surrounding body in the glass-to-metal seal is typically a glass, the composition of which is proprietary to each manufacturer of seals and depends on whether the seal is under compression or is matched. Other insulative materials may be used in the glass-to-metal seal, polymers may be used in the seal. For example, various As such, the term "glass-to-metal" seal is merely descriptive of a type of seal, and is not meant to imply that the seal must include glass.

The housing 7 for the ultracapacitor 10 may be made from, for example, types 304, 304L, 316, and 316L stainless steels. They may also be constructed from, but not limited to, some of the aluminum alloys, such as 1100, 3003, 5052, 4043 and 6061. Various multilayer materials may be used, and may include, for example, aluminum clad to stainless steel. Other non-limiting compatible metals that may be used include platinum, gold, rhodium, ruthenium and silver.

Specific examples of glass-to-metal seals that have been used in the ultracapacitor 10 include two different types of glass-to-metal seals. A first one is from SCHOTT with a US location in Elmsford, N.Y. This embodiment uses a stainless steel pin, glass insulator, and a stainless steel body. A second glass-to-metal seal is from HERMETIC SEAL TECHNOLOGY of Cincinnati, Ohio. This second embodiment uses a tantalum pin, glass insulator and a stainless steel body. Varying sizes of the various embodiments may be provided.

An additional embodiment of the glass-to-metal seal includes an embodiment that uses an aluminum seal and an aluminum body. Yet another embodiment of the glass-to-metal seal includes an aluminum seal using epoxy or other insulating materials (such as ceramics or silicon).

A number of aspects of the glass-to-metal seal may be configured as desired. For example, dimensions of housing and pin, and the material of the pin and housing may be modified as appropriate. The pin can also be a tube or solid pin, as well as have multiple pins in one cover. While the most common types of material used for the pin are stainless steel alloys, copper cored stainless steel, molybdenum, platinum-iridium, various nickel-iron alloys, tantalum and other metals, some non-traditional materials may be used (such as aluminum). The housing is usually formed of stainless steel, titanium and/or various other materials.

A variety of fastening techniques may be used in assembly of the ultracapacitor 10. For example, and with regards to welding, a variety of welding techniques may be used. The following is an illustrative listing of types of welding and various purposes for which each type of welding may be used.

Ultrasonic welding may be used for, among other things: welding aluminum tabs to the current collector; welding tabs to the bottom clad cover; welding a jumper tab to the clad bridge connected to the glass-to-metal seal pin; and welding jelly roll tabs together. Pulse or resistance welding may be used for, among other things: welding leads onto the bottom of the can or to the pin; welding leads to the current collector; welding a jumper to a clad bridge; welding a clad bridge to the terminal 8; welding leads to a bottom cover. Laser welding may be used for, among other things: welding a stainless steel cover to a stainless steel can; welding a stainless steel bridge to a stainless steel glass-to-metal seal pin; and welding a plug into the fill port. TIG welding may be used for, among other things: sealing aluminum covers to an aluminum can; and welding aluminum seal into place. Cold welding (compressing metals together with high force) may be used for, among other things: sealing the fill port by force fitting an aluminum ball/tack into the fill port.

Physical aspects of an exemplary ultracapacitor 10 are now provided. Note that in the following tables, the terminology "tab" generally refers to the "lead" as discussed above; the terms "bridge" and "jumper" also making reference to aspects of the lead (for example, the bridge may be coupled to the feed-through, or "pin," while the jumper is useful for connecting the bridge to the tabs, or leads). Use of various connections may facilitate the assembly process, and take advantage of certain assembly techniques. For example, the bridge may be laser welded or resistance welded to the pin, and coupled with an ultrasonic weld to the jumper.

TABLE 7

Weights of Complete Cell With Electrolyte

| Component | Weight (grams) | Percent of total |
|---|---|---|
| SS Can (body of the housing) | 14.451 | 20.87% |
| SS Top cover (cap) | 5.085 | 7.34% |
| Tantalum glass-metal Seal | 12.523 | 18.09% |
| SS/Al Clad Bottom | 10.150 | 14.66% |
| Tack (seal for fill hole) | 0.200 | 0.29% |
| Inner Electrode (cleared, no tabs) | 3.727 | 5.38% |
| Inner Electrode Aluminum | 1.713 | 2.47% |
| Inner Electrode Carbon | 2.014 | 2.91% |
| Outer Electrode (cleared, no tabs) | 4.034 | 5.83% |
| Outer Electrode Aluminum | 1.810 | 2.61% |
| Outer Electrode Carbon | 2.224 | 3.21% |
| Separator | 1.487 | 2.15% |
| Alum. Jelly roll Tabs (all 8) | 0.407 | 0.59% |
| Ta/Al clad bridge | 0.216 | 0.31% |
| Alum. Jumper (bridge-JR tabs) | 0.055 | 0.08% |
| Teflon heat shrink | 0.201 | 0.29% |
| Electrolyte | 16.700 | 24.12% |
| Total Weight | 69.236 | 100.00% |

TABLE 8

Weights of Complete Cell Without Electrolyte

| Component | Weight (grams) | Percent of total |
|---|---|---|
| SS Can | 14.451 | 27.51% |
| SS Top cover | 5.085 | 9.68% |
| Tantalum glass-metal Seal | 12.523 | 23.84% |
| SS/Al Clad Bottom | 10.150 | 19.32% |
| Tack | 0.200 | 0.38% |
| Inner Electrode (cleared, no tabs) | 3.727 | 7.09% |
| Outer Electrode (cleared, no tabs) | 4.034 | 7.68% |
| Separator | 1.487 | 2.83% |
| Alum. Jelly roll Tabs (all 8) | 0.407 | 0.77% |
| Ta/Al clad bridge | 0.216 | 0.41% |
| Alum. Jumper (bridge-JR tabs) | 0.055 | 0.10% |
| Teflon heat shrink | 0.201 | 0.38% |
| Total Weight | 69.236 | 100.00% |

TABLE 9

Weights of Cell Components in Full Cell with Electrolyte

| Component | Weight (grams) | Percent of total |
|---|---|---|
| Can, covers, seal, bridge, jumper, heat shrink, tack | 42.881 | 61.93% |
| Jelly Roll with Electrodes, tabs, separator | 9.655 | 13.95% |
| Electrolyte | 16.700 | 24.12% |
| Total Weight | 69.236 | 100.00% |

TABLE 10

Weights of Electrode

| Component | Weight (grams) | Percent of total |
|---|---|---|
| Inner electrode carbon | 2.014 | 25.95% |
| Inner electrode aluminum | 1.713 | 22.07% |
| Outer electrode carbon | 2.224 | 28.66% |
| Outer electrode aluminum | 1.810 | 23.32% |
| Total Weight | 69.236 | 100.00% |

As a demonstration of purity in the ultracapacitor 10, the housing 7 of a sealed ultracapacitor 10 was opened, and the storage cell 12 was sampled for impurities. Water content was measured using the Karl Fischer method for the electrodes, separator and electrolyte from the cell 12. Three measurements were taken and averaged.

The water content (i.e., a level of moisture) of electrode and separator was found to be 343.3 ppm (per weight percent) and 152.6 ppm (per weight percent) respectively. In order to measure water content in electrolyte 6, 1.1 ml of electrolyte which had been obtained from the closed cell was mixed with 4 ml of purified electrolyte. The water content of the mixture was then measured. By knowing the water content in the added electrolyte (60.3 ppm), the water content of the electrolyte withdrawn from the cell was determined. Thus, the water content of the electrolyte 6 within the sealed ultracapacitor 10 was 15.5 ppm. Halide content in the ultracapacitor 10 was measured using Ion Selective Electrodes (ISE). The average chloride (Cl−) ion content was found to be 90.9 ppm in the electrolyte 6, while the average fluoride (F−) content was found to be 0.25 ppm.

In general, a method for characterizing a contaminant within the ultracapacitor includes breaching the housing 7 to access contents thereof, sampling the contents and analyzing the sample. Techniques disclosed elsewhere herein may be used in support of the characterizing.

Note that to ensure accurate measurement of impurities in the ultracapacitor and components thereof, including the electrode, the electrolyte and the separator, assembly and disassembly may be performed in an appropriate environment, such as in an inert environment within a glove box.

Figure 35:
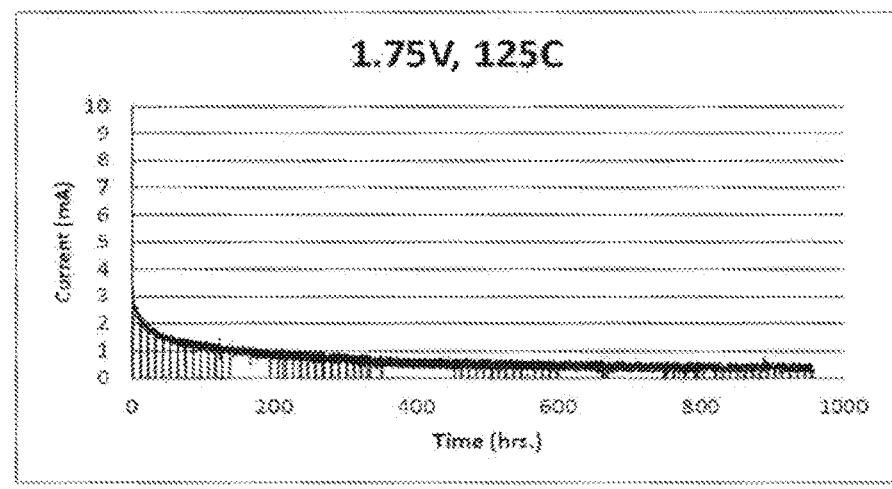
FIGS. 35-38 are graphs depicting performance of exemplary ultracapacitors where
Figure 36:
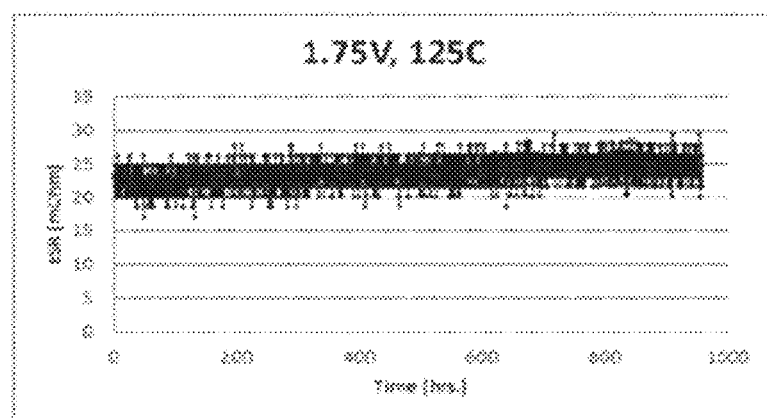
Figure 37:
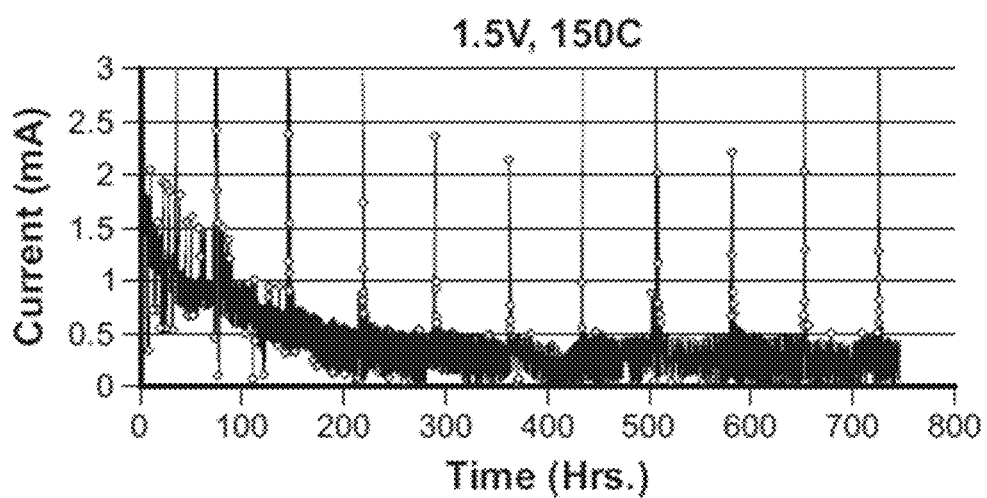
Figure 38:
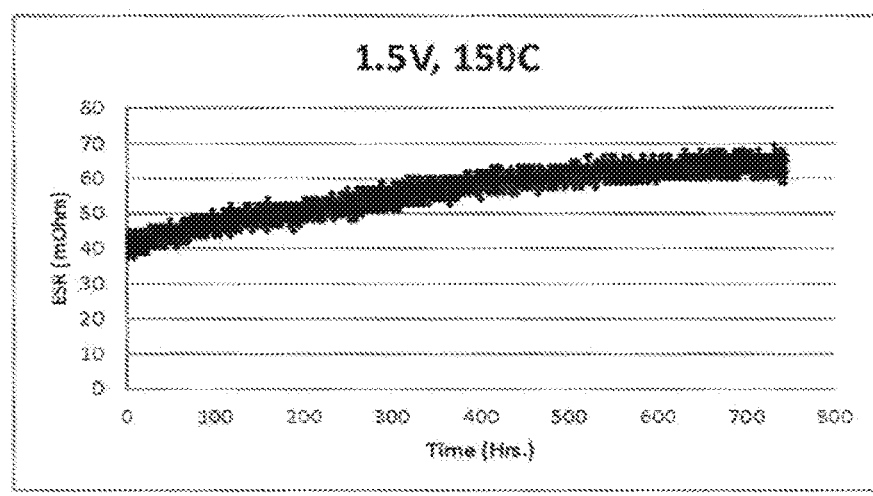
Figure 39:
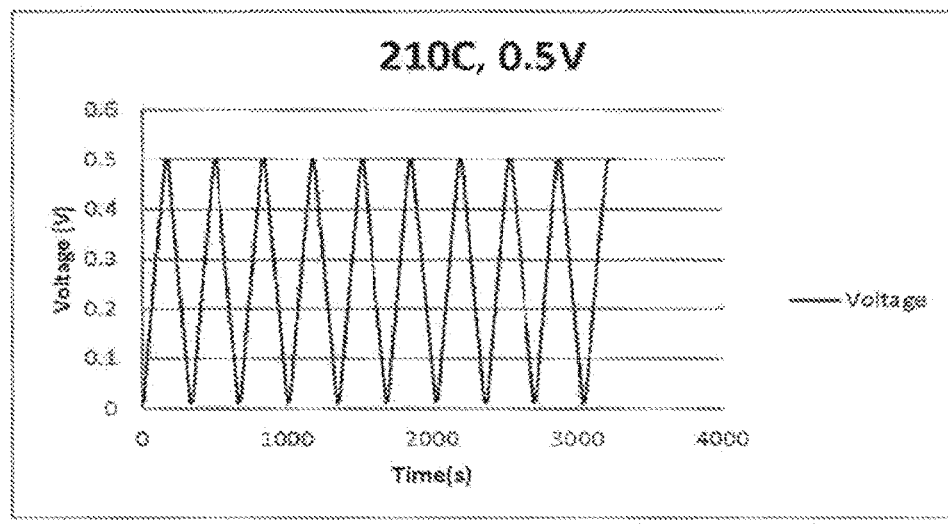
FIGS. 39-43 are graphs depicting performance of exemplary ultracapacitors at 210° C. where
Figure 40:
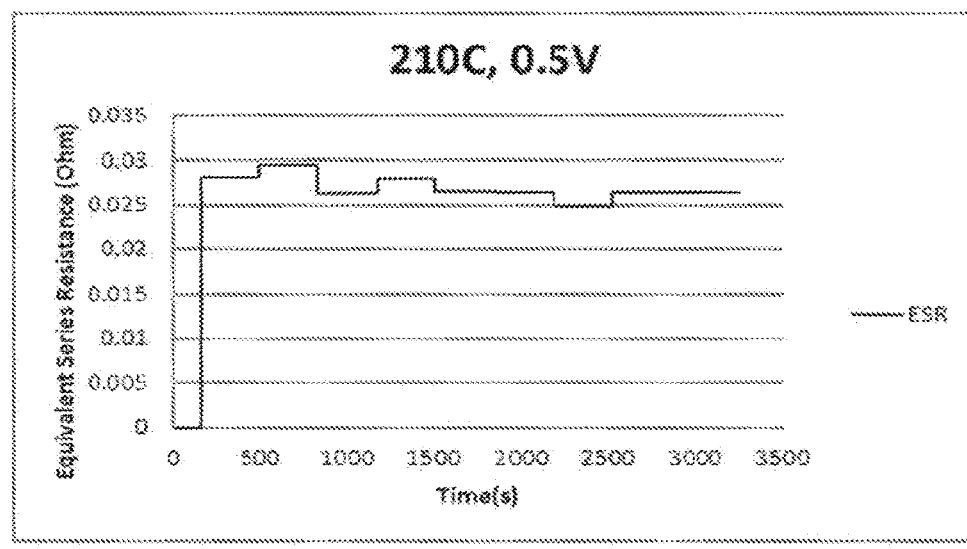
Figure 41:
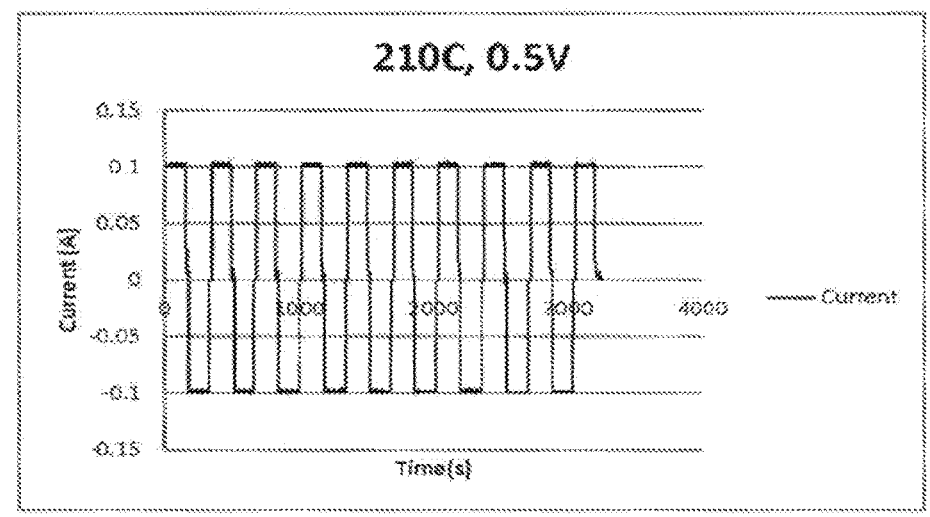
Figure 42:
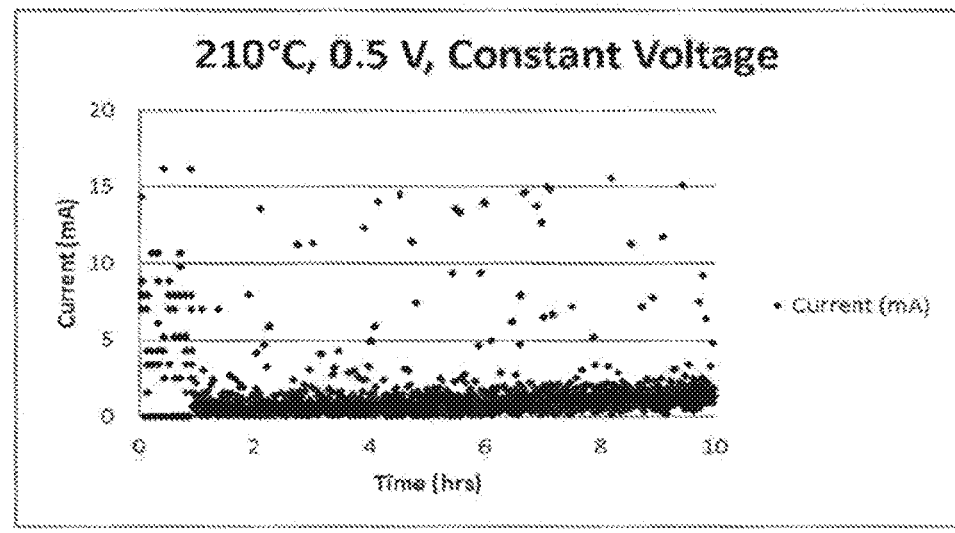
Figure 43:
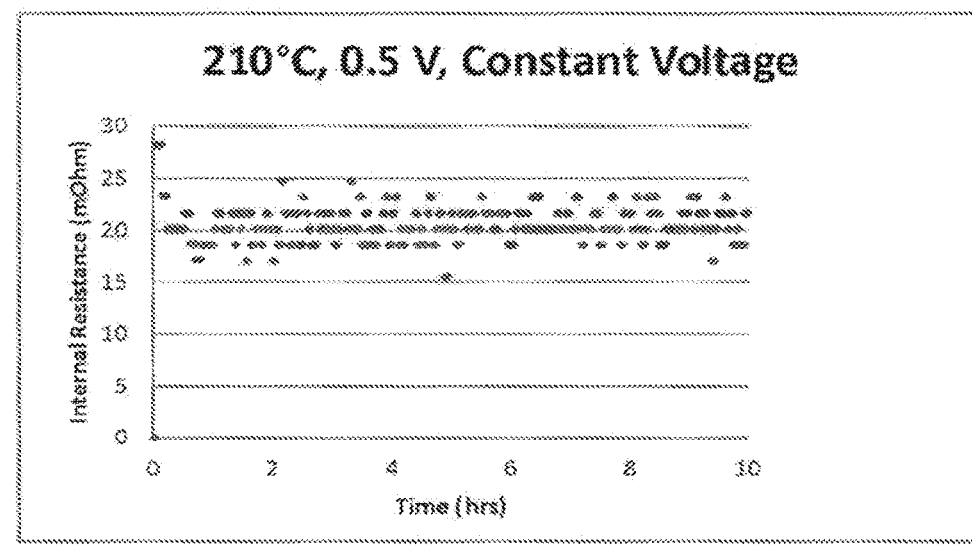

FIGS. 35-38 are graphs depicting performance of exemplary ultracapacitors 10. FIGS. 35 and 36 depict performance of the ultracapacitor 10 at 1.75 volts and 125 degrees Celsius. FIGS. 37 and 38 depict performance of the ultracapacitor 10 at 1.5 volts and 150 degrees Celsius.

Generally, the ultracapacitor 10 may be used under a variety of environmental conditions and demands. For example, terminal voltage may range from about 100 mV to 10 V. Ambient temperatures may range from about minus 40 degrees Celsius to plus 250 degrees Celsius. Typical high temperature ambient temperatures range from plus 60 degrees Celsius to plus 250 degrees Celsius.

FIGS. 39-43 are additional graphs depicting performance of exemplary ultracapacitors 10. In these examples, the ultracapacitor 10 was a closed cell (i.e., housing). The ultracapacitor was cycled 10 times, with a charge and discharge of 100 mA, charged to 0.5 Volts, resistance measured, discharged to 10 mV, rested for 10 second, and then cycled again.

Tables 11 and 12 provide comparative performance data for embodiments of the ultracapacitor 10. The performance data was collected for a variety of operating conditions as shown.

TABLE 11

Comparative Performance Data

| Cell # | Temperature (° C.) | Voltage (V) | Time (Hrs) | ESR Initial (mOhm) | % ESR Increase | Capacitance Initial (F) | % Capacitance Decrease | Cell Weight (g) | Ending Current (mA) |
|---|---|---|---|---|---|---|---|---|---|
| D2011-09 | 150 | 1.25 | 1500 | 30 | 0 | 93 | 5 | — | 0.5 |
| C1041-02 | 150 | 1.5 | 1150 | 45 | 60 | 32 | — | 28.35 | 0.5 |
| C2021-01 | 150 | 1.6 | 1465 | 33 | 100 | 32 | 70 | 26.61 | 0.8 |
| D5311-01 | 150 | 1.75 | 150 | 9 | 10 | 87 | 4 | — | 5 |
| C6221-05 | 150 | 1.75 | 340 | 15 | 50 | — | — | 38.31 | 1 |
| C6221-05 | 150 | 1.75 | 500 | 15 | 100 | — | — | 38.31 | 2 |
| C6221-05 | 150 | 1.75 | 600 | 15 | 200 | — | — | 38.31 | 2 |
| C6221-05 | 150 | 1.75 | 650 | 15 | 300 | — | — | 38.31 | 2 |
| D1043-02 | 150 | 1.75 | 615 | 43 | 50 | 100 | — | — | 3 |
| D1043-02 | 150 | 1.75 | 700 | 43 | 100 | 100 | — | — | 3 |
| C5071-01 | 150 | 1.75 | 600 | 26 | 100 | 27 | 32 | — | 2 |
| C5071-01 | 150 | 1.75 | 690 | 26 | 200 | 27 | 35 | — | 2 |
| C5071-01 | 150 | 1.75 | 725 | 26 | 300 | 27 | 50 | — | 2 |
| C8091-06 | 125 | 1.75 | 500 | 38 | 5 | 63 | 11 | 37.9 | 0.5 |
| C9021-02 | 125 | 1.75 | 1250 | 37 | 10 | 61 | — | 39.19 | 0.3 |
| D5011-02 | 125 | 1.9 | 150 | 13 | 0 | 105 | 0 | — | 1.4 |
| C8091-06 | 125 | 2 | 745 | 41 | 22 | 56 | — | 37.9 | 1.2 |
| D2011-08 | 175 | 1 | 650 | 33 | 12 | 89 | 30 | — | 4 |
| D1043-10 | 175 | 1.3 | 480 | 30 | 100 | 93 | 50 | — | 6.5 |
| C2021-04 | 175 | 1.4 | 150 | 35 | 100 | 27 | — | 27.17 | 3.5 |
| C2021-04 | 210 | 0.5 | 10 | 28 | 0 | 32 | — | 28.68 | 1 |
| C4041-04 | 210 | 0.5 | 20 | 28 | 0 | 32 | — | 28.68 | 7 |
| C4041-04 | 210 | 0.5 | 50 | 28 | 100 | 32 | — | 28.68 | 18 |

TABLE 12

Comparative Performance Data

| Cell # | T (° C.) | Voltage (V) | Time (Hrs) | ESR Initial (mOhm) | Initial Capacitance (F) | Leakage Current (mA) | Volumetric ESR (Ohms × cc) | Volumetric Capacitance (F/cc) | Volumetric Leakage Current (mA/cc) | % ESR Increase | % Capacitance Decrease | Volume (cc) |
|---|---|---|---|---|---|---|---|---|---|---|---|---|
| D2011-09 | 150 | 1.25 | 1500 | 30 | 93 | 0.5 | 0.75 | 3.72 | 0.02 | 0 | 5 | 25 |
| C2021-01 | 150 | 1.5 | 1465 | 33 | 32 | 0.75 | 0.396 | 2.67 | 0.06 | 100 | 5 | 12 |
| C5071-01 | 150 | 1.75 | 600 | 26 | 27 | 2 | 0.338 | 2.08 | 0.15 | 100 | 32 | 13 |
| C5071-01 | 150 | 1.75 | 690 | 26 | 27 | 2 | 0.338 | 2.08 | 0.15 | 200 | 35 | 13 |
| C5071-01 | 150 | 1.75 | 725 | 26 | 27 | 2 | 0.338 | 2.08 | 0.15 | 300 | 50 | 13 |
| C8091-06 | 125 | 1.75 | 500 | 38 | 63 | 0.5 | 0.494 | 4.85 | 0.04 | 5 | 11 | 13 |
| C9021-02 | 125 | 1.75 | 1250 | 37 | 61 | 0.25 | 0.481 | 4.69 | 0.02 | 10 | 11 | 13 |
| D2011-08 | 175 | 1 | 650 | 33 | 89 | 4 | 0.825 | 3.56 | 0.16 | 12 | 30 | 25 |
| D1043-10 | 175 | 1.3 | 480 | 30 | 93 | 6.5 | 0.75 | 3.72 | 0.26 | 100 | 50 | 25 |
| C4041-04 | 210 | 0.5 | 50 | 28 | 32 | 18 | 0.336 | 2.67 | 1.50 | 100 | 50 | 12 |

Thus, data provided in Tables 11 and 12 demonstrate that the teachings herein enable performance of ultracapitors in extreme conditions. Ultracapacitors fabricated accordingly may, for example, exhibit leakage currents of less than about 1 mA per milliliter of cell volume, and an ESR increase of less than about 100 percent in 500 hours (while held at voltages of less than about 2 Y and temperatures less than about 150 degrees Celsius). As trade-offs may be made among various demands of the ultracapacitor (for example, voltage and temperature) performance ratings for the ultracapacitor may be managed (for example, a rate of increase for ESR, capacitance) may be adjusted to accommodate a particular need. Note that in reference to the foregoing, "performance ratings" is given a generally conventional definition, which is with regard to values for parameters describing conditions of operation.

Table 13 shows performance data for ultracapacitors employing silica-based gel electrolytes tested at room temperature and at 200° C. Impurities, including moisture, halides, and organic impurities, have been minimized in each of the following embodiments, particularly the moisture content of the ultracapacitor cells can be less than 1,000 ppm, less than 500 ppm, or less than 200 ppm.

TABLE 13

Performance Data for Ultracapacitors at Room Temperature and 200° C.

| | Room Temperature | | 200° C. | |
|---|---|---|---|---|
| | ESR (Ohm) | Capacitance (mF) | ESR (Ohm) | Capacitance (mF) |
| Ultracapacitor with silica and ionic liquid | 3.928 | 21.53 | 0.45 | 25.01 |
| Ultracapacitor with silica and ionic liquid | 3.756 | 23.96 | 0.435 | 25.96 |

Table 14 shows estimated performance data at 200° C. for various standard formats of ultracapacitors employing a silica-based gel electrolyte. Impurities, including moisture, halides, and organic impurities, have been minimized in each for the following embodiments, particularly the moisture content of the ultracapacitor cells can be less than 1,000 ppm, less than 500 ppm, or less than 200 ppm.

TABLE 14

Estimated Performance Data at 200° C

| Size | OD (mm) | ID (mm) | Height (mm) | Ew (mm) | Temperature | ESR (mOhms) | C (F) |
|---|---|---|---|---|---|---|---|
| AA | 13.4 | 12.45 | 55 | 40 | 200° C | 10 | 9.6 |
| subC | 20.6 | 19.6 | 101.6 | 83.5 | 200° C | 2.1* | 56.1 |
| C | 24.4 | 23.3 | 101.6 | 83.5 | 200° C | 1.4* | 83.3 |

Figure 63A:
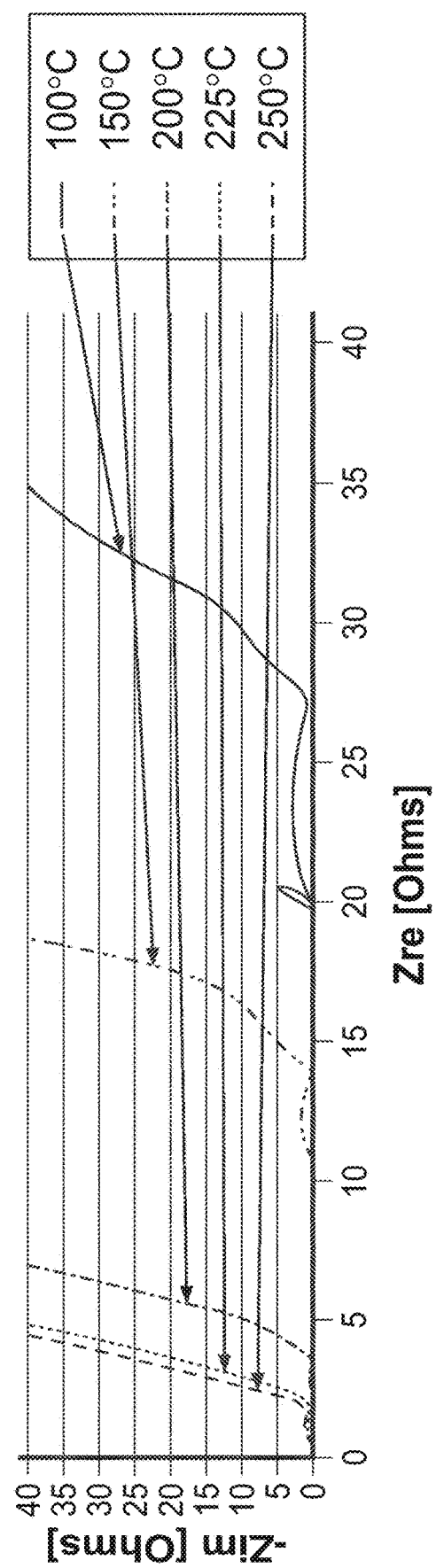
FIGS. 63A-63C are graphs depicting performance of an ultracapacitor that employs a solid state polymer electrolyte including PVDF-HFP copolymer and an ionic liquid with a PTFE separator in an open (i.e., not hermetically sealed) cell.
Figure 63B:
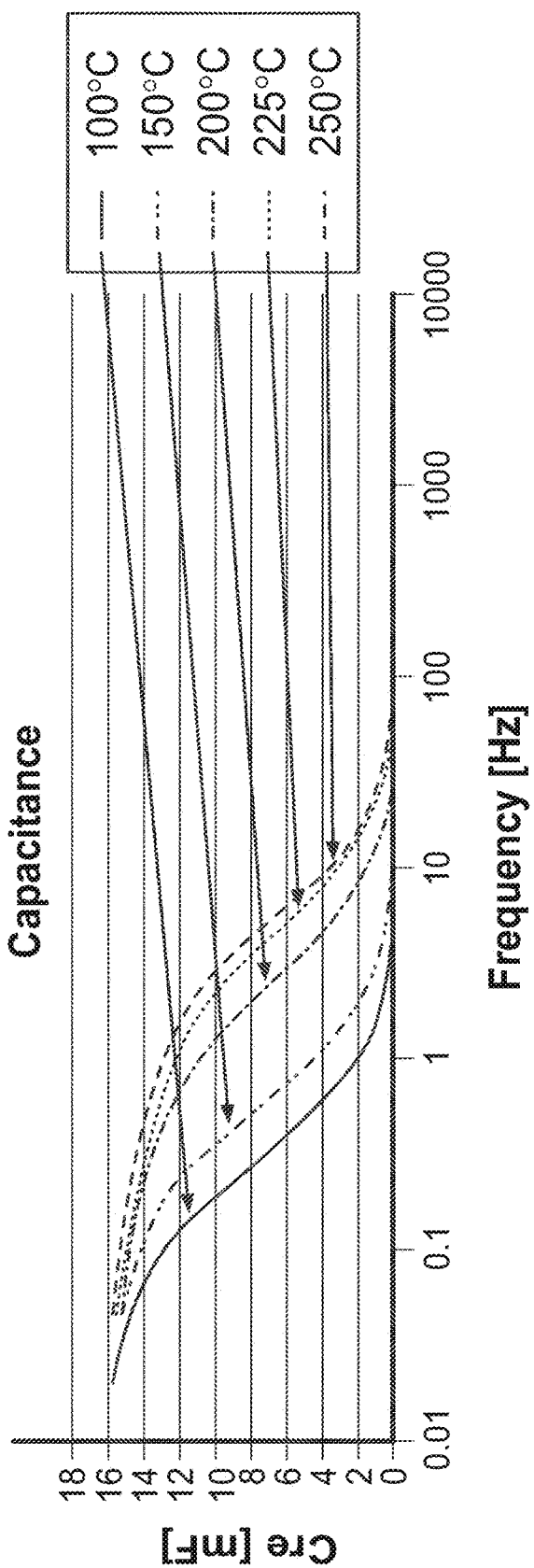
Figure 63C:
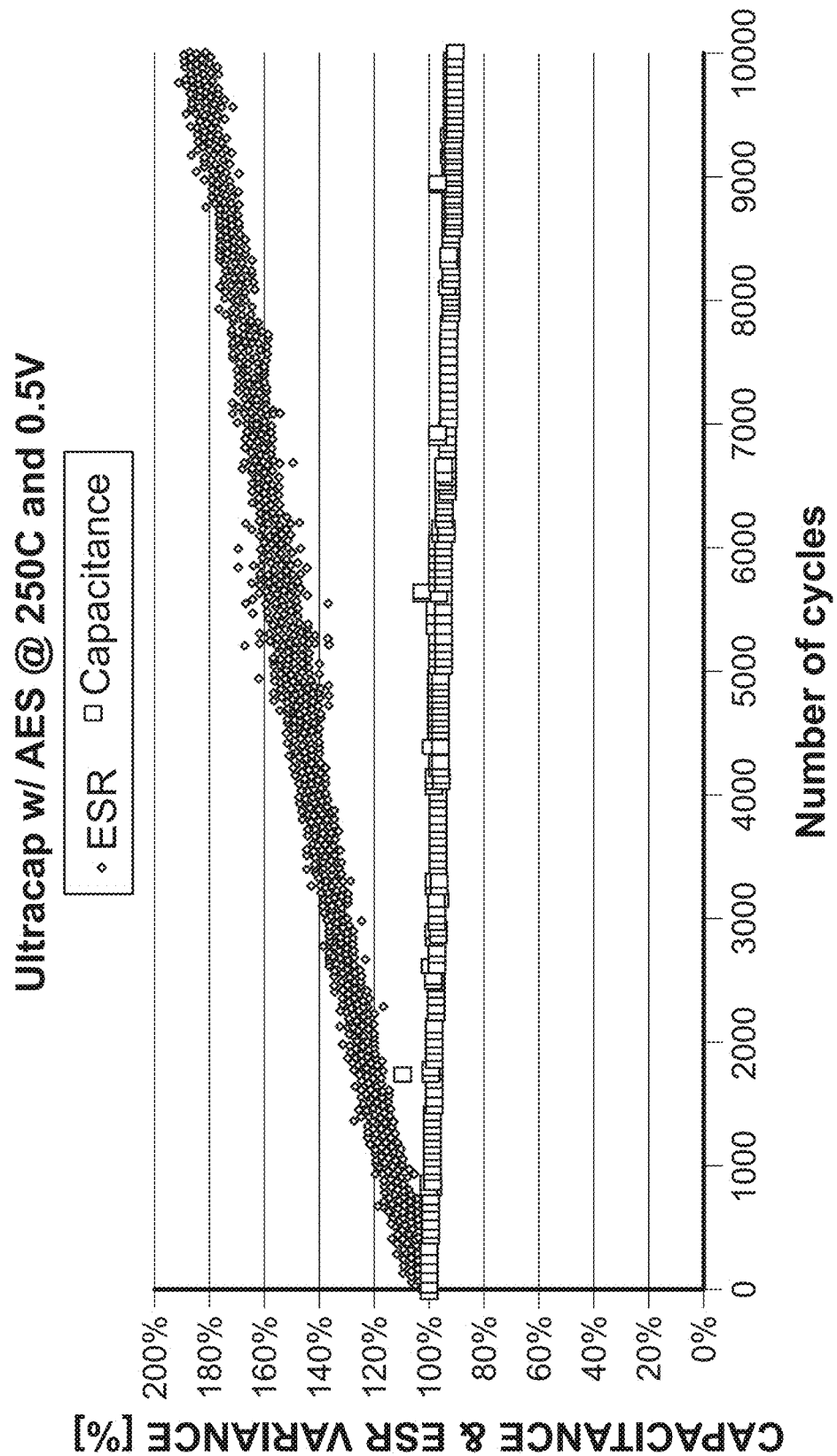

FIGS. 63A-63C are graphs depicting performance of an ultracapacitor that employs a solid state polymer electrolyte including PVDF-HFP copolymer and an ionic liquid with a 25 um PTFE separator in an open (i.e., not hermetically sealed) cell. The electrolyte includes an AES including 1-butyl-1-methylpyrrolidinium tris(pentafluoroethyl)trifluorophosphate. The electrodes of ultracapacitor include three layers of single walled CNTs on a single sided AI4C3 current collector. The electrode has an outer diameter of 14 mm.

FIG. 63A shows Nyquist plots for the capacitor obtained at temperatures of 100 degrees Celsius, 150 degrees Celsius, 200 degrees Celsius, 225 degrees Celsius, and 250 degrees Celsius. FIG. 63B shows plots of capacitance as a function of frequency for the capacitor obtained at temperatures of 100 degrees Celsius, 150 degrees Celsius, 200 degrees Celsius, 225 degrees Celsius, and 250 degrees Celsius. The plots of FIGS. 63A and 63B show that the performance of the ultracapacitor has been characterized over a wide range on temperatures extending from 100 degrees Celsius to 250 degrees Celsius.

FIG. 63C shows plots of relative capacitance and ESR (normalized to the initial capacitance ESR) as the ultracapacitor is charged and discharged over 10,000 cycles over a period of 115 hours at a temperature of 250 degrees Celsius and at a voltage of 0.5 V. The initial capacitance of the cell was 16.9 mF. The initial ESR of the cell was 0.616 Ohms. The volume of the cell was 1.6 cm³. The initial volumetric capacitance of the cell was 10 F/L.

Both the capacitance and ESR remain remarkably stable over 10,000 cycles. The capacitance of the cell decreases by only 9% after 10,000 cycles. The ESR of the cell increases by only 85% after 10,000 cycles over a period of 115 hours.

Figure 64:
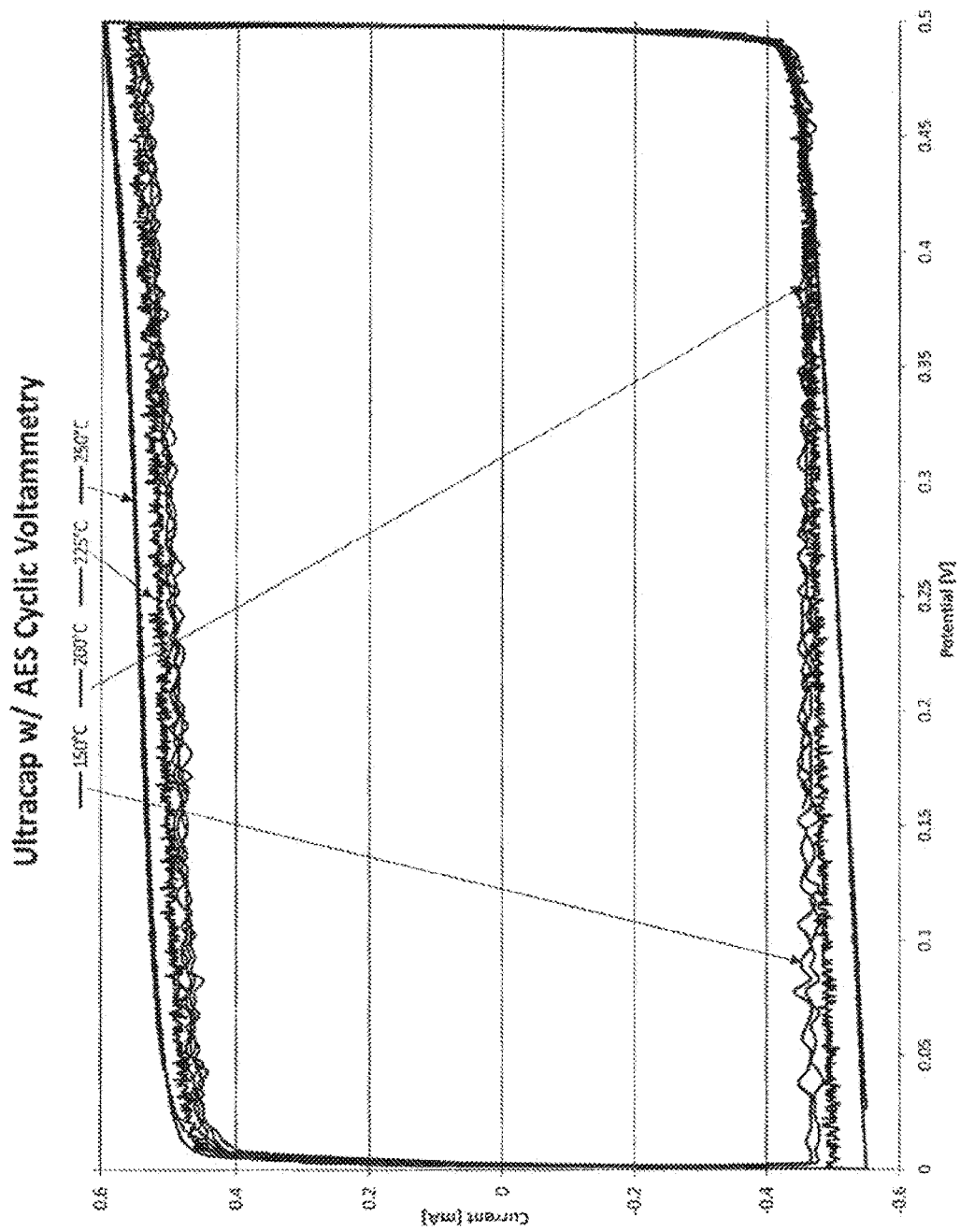
FIG. 64 is graph depicting the cyclic voltammetry performance of an ultracapacitor that employs a solid state polymer electrolyte including PVDF-HFP copolymer and an ionic liquid with a polymer dipped PTFE separator in an open (i.e., not hermetically sealed) cell. Cyclic voltammetry plots are shown taken at temperatures of 150 degrees Celsius, 200 degrees Celsius, 225 degrees Celsius, and 250 degrees Celsius, each with a maximum voltage of 0.5V and a scan rate of 0.01 V/s.

FIG. 64 is graph depicting the cyclic voltammetry performance of ultracapacitor that is substantially similar to that described with reference to FIGS. 63A-6C, but featuring a polymer dipped PTFE separator. Cyclic voltammetry plots are shown taken at temperatures of 150 degrees Celsius, 200 degrees Celsius, 225 degrees Celsius, and 250 degrees Celsius, each with a maximum voltage of 0.5 V and a scan rate of 0.01 V/s. The plots evidence consistent performance of the ultracapacitor over a wide range of temperatures from 150 degrees Celsius to 250 Celsius. Notable, the generally rectangular shapes of the plots indicate that that ultracapacitor exhibits substantially purely capacitive behavior (e.g., substantially free of unwanted chemical reactions).

Thus, the data provided in Tables 13 and 14 and FIGS. 63A-64 demonstrate that the teachings herein enable performance of ultracapacitors in extreme conditions. Ultracapacitors fabricated accordingly may, for example, operate at temperatures as high as 250 degrees Celsius or more for 10,000 charge/discharge cycles and/or over 100 hours or more at a voltage of 0.5V or more while exhibiting and increase in ESR or less than 100%, e.g. less than about 85% and a decrease in capacitance of less than about 10%. In some embodiments, such ultracapacitors may have a volumetric capacitance of about 5 Farad per liter (F/L), 6 F/L, 7 F/L, 8 F/L, 8 F/L, 10 F/L or more, e.g., in the range of about 1 to about 10 F/L or any sub-range thereof.

Note that the performance of the ultracapacitors characterized in FIGS. 63A-64 would be expected to further improve with the use of a hermetically sealed cell, e.g., of any of the types described herein.

In some embodiments, ultracapacitors of the types described herein may exhibit any of: a high volumetric energy density (e.g., exceeding 5 Wh/L, 6 Wh/L, 7 Wh/L, 8 Wh/L, 9 Wh/L, 10 Wh/L. 11 Wh/L, 12 Wh/L, 15 Wh/L, 18 Wh/L, 20 Wh/L, or more), a high gravimetric energy density (e.g., exceeding 5 Wh/kg, 6 Wh/kg, 7 Wh/kg, 8 Wh/kg, 9 Wh/kg, 10 Wh/kg. 11 Wh/kg, 12 Wh/kg, 15 Wh/kg, 18 Wh/kg, or more), a high volumetric power density (e.g., exceeding 30 kW/L, 40 kW/L, 50 kW/L, 60 kW/L, 70 kW/L, 80 kW/L, 90 kW/L, 100 kW/L, 110 kW/L, 120 kW/L, or more), a high gravimetric power density (e.g., exceeding 30 kW/kg, 40 kW/kg, 50 kW/kg, 60 kW/kg, 70 kW/kg, 80 kW/kg, 90 kW/kg, 100 kW/kg, 110 kW/kg, 120 kw/KG or more), and combinations thereof. In some embodiments, ultracapacitors of the types described herein demonstrate high performance as indicated by the product of energy density and power density, e.g., exceeding 300 Wh-kW/L², 500 WhkW/L², 700 Wh-kW/L², For example, the ultracapacitors disclosed herein are capable of maintaining their performance over a long period of time, e.g., hundreds of thousands, or even millions of charge/discharge cycles. Table 15 below shows the or more. performance of exemplary cells of the type described herein. For the purposes of Table 15, cell lifetime is defined as the number of cycles required before the cell exhibits a reduction in discharge energy of 5% or more or an increase in ESR of 25% or more.

TABLE 15

Estimated Ultracapacitor Performance Data

| Cell ID | Cell Volume/ cmA3) | Power Density (kW/L) | Energy Density (Wh/L) | Lifetime (Cycles) | Operating Voltage (V) |
|---|---|---|---|---|---|
| HP | 2 | 100 | 7.0 | >500k | 3.5 |
| HE | 2 | 35 | 11 | >500k | 3.5 |
| HE 350 | 350 | 35 | 18 | >500k | 3.5 |
| HP 350 | 350 | 110 | 7 | >500k | 3.5 |

As trade-offs may be made among various demands of the ultracapacitor (for example, voltage and temperature) performance ratings for the ultracapacitor may be managed (for example, a rate of increase for ESR, capacitance) may be adjusted to accommodate a particular need. Note that in reference to the foregoing, "performance ratings" is given a generally conventional definition, which is with regard to values for parameters describing conditions of operation.

Note that measures of capacitance as well as ESR, as presented in Table 11 and elsewhere herein, followed generally known methods. Consider first, techniques for measuring capacitance.

Capacitance may be measured in a number of ways. One method involves monitoring the voltage presented at the capacitor terminals while a known current is drawn from (during a "discharge") or supplied to (during a "charge") of the ultracapacitor. More specifically, we may use the fact that an ideal capacitor is governed by the equation:

$$I=C*dV/dt,$$

where I represents charging current, C represents capacitance and dV/dt represents the time-derivative of the ideal capacitor voltage, V. An ideal capacitor is one whose internal resistance is zero and whose capacitance is voltage-independent, among other things. When the charging current, I, is constant, the voltage V is linear with time, so dV/dt may be computed as the slope of that line, or as DeltaV/DeltaT. However, this method is generally an approximation and the voltage difference provided by the effective series resistance (the ESR drop) of the capacitor should be considered in the computation or measurement of a capacitance. The effective series resistance (ESR) may generally be a lumped element approximation of dissipative or other effects within a capacitor. Capacitor behavior is often derived from a circuit model including an ideal capacitor in series with a resistor having a resistance value equal to the ESR. Generally, this yields good approximations to actual capacitor behavior.

In one method of measuring capacitance, one may largely neglect the effect of the ESR drop in the case that the internal resistance is substantially voltage-independent, and the charging or discharging current is substantially fixed. In that case, the ESR drop may be approximated as a constant and is naturally subtracted out of the computation of the change in voltage during said constant-current charge or discharge. Then, the change in voltage is substantially a reflection of the change in stored charge on the capacitor. Thus, that change in voltage may be taken as an indicator, through computation, of the capacitance.

For example, during a constant-current discharge, the constant current, I, is known. Measuring the voltage change during the discharge, DeltaV, during a measured time interval DeltaT, and dividing the current value I by the ratio DeltaVIDeltaT, yields an approximation of the capacitance. When Tis measured in amperes, DeltaV in volts, and DeltaT in seconds, the capacitance result will be in units of Farads.

Turning to estimation of ESR, the effective series resistance (ESR) of the ultracapacitor may also be measured in a number of ways. One method involves monitoring the voltage presented at the capacitor terminals while a known current is drawn from (during a "discharge") or supplied to (during a "charge") the ultracapacitor. More specifically, one may use the fact that ESR is governed by the equation:

$$V=I*R,$$

where I represents the current effectively passing through the ESR, R represents the resistance value of the ESR, and V represents the voltage difference provided by the ESR (the ESR drop). ESR may generally be a lumped element approximation of dissipative or other effects within the ulracapacitor. Behavior of the ultracapacitor is often derived from a circuit model including an ideal capacitor in series with a resistor having a resistance value equal to the ESR. Generally, this yields good approximations of actual capacitor behavior.

In one method of measuring ESR, one may begin drawing a discharge current from a capacitor that had been at rest (one that had not been charging or discharging with a substantial current). During a time interval in which the change in voltage presented by the capacitor due to the change in stored charge on the capacitor is small compared to the measured change in voltage, that measured change in voltage is substantially a reflection of the ESR of the capacitor. Under these conditions, the immediate voltage change presented by the capacitor may be taken as an indicator, through computation, of the ESR.

For example, upon initiating a discharge current draw from a capacitor, one may be presented with an immediate voltage change DeltaV over a measurement interval DeltaT. So long as the capacitance of the capacitor, C, discharged by the known current, I, during the measurement interval, DeltaT, would yield a voltage change that is small compared to the measured voltage change, DeltaV, one may divide DeltaV during the time interval DeltaT by the discharge current, I, to yield an approximation to the ESR. When I is measured in amperes and DeltaV in volts, the ESR result will have units of Ohms.

Both ESR and capacitance may depend on ambient temperature. Therefore, a relevant measurement may require the user to subject the ultracapacitor 10 to a specific ambient temperature of interest during the measurement.

Performance requirements for leakage current are generally defined by the environmental conditions prevalent in a particular application. For example, with regard to a capacitor having a volume of 20 mL, a practical limit on leakage current may fall below 100 mA. As referred to herein, a "volumetric leakage current" of the ultracapacitor 10 generally refers to leakage current divided by a volume of the ultracapacitor 10, and may be expressed, for example in units of mA/cc. Similarly, a "volumetric capacitance" of the ultracapacitor 10 generally refers to capacitance of the ultracapacitor 10 divided by the volume of the ultracapacitor 10, and may be expressed, for example in units of F/cc. Additionally, "volumetric ESR" of the ultracapacitor 10 generally refers to ESR of the ultracapacitor 10 multiplied by the volume of the ultracapacitor 10, and may be expressed, for example in units of Ohms*cc.

In one embodiment, a volumetric capacitance of the energy storage device is between about 50 F/cc and about 8 F/cc at temperatures throughout the operating temperature range. In another embodiment, a volumetric ESR of the energy storage device is between about 150 mOhms/cc and 2 Ohms/cc. In yet another embodiment, the energy storage device exhibits an ESR increase less than about 300 percent while held at a constant voltage for at least 20 hours. The energy storage device is characterized by a time before failure of at least 100 hours operating at a temperature of about 200 degrees Celsius or greater, wherein a failure condition is a decrease of capacitance of 50% or greater or an increase in ESR of 50% or greater.

The energy storage device is characterized by a time before failure of at least 600 hours operating at a temperature of about 200 degrees Celsius of greater, wherein a failure condition is a decrease of capacitance of 50% or greater or an increase in ESR of 50% or greater. In an embodiment, the energy storage device is characterized by a decrease of capacitance of 10% or less and an increase in ESR of 10% or less during operation for at least 1000 hours at a temperature of at least 200 degrees Celsius and an operating voltage of 0.5 V or more. In another embodiment, the energy storage device is characterized by a decrease of capacitance of 10% or less and an increase in ESR of 60% or less during operation for at least 5000 charge/discharge cycles at a temperature of at least 250 degrees Celsius and an operating voltage of 0.5 V or more.

In an embodiment, the energy storage device is configured to output electrical energy at operating voltages throughout an operating voltage range, the operating voltage range being between 0 V and about 5 V.

Note that one approach to reduce the volumetric leakage current at a specific temperature is to reduce the operating voltage at that temperature. Another approach to reduce the volumetric leakage current at a specific temperature is to increase the void volume of the ultracapacitor. Yet another approach to reduce the leakage current is to reduce loading of the energy storage media 1 on the electrode 3.

A variety of environments may exist where the ultracapacitor 10 is of particular usefulness. For example, in automotive applications, ambient temperatures of 105 degrees Celsius may be realized (where a practical lifetime of the capacitor will range from about 1 year to 20 years). In some downhole applications, such as for geothermal well drilling, ambient temperatures of 250 degrees Celsius or more may be reached (where a practical lifetime of the capacitor will range from about 100 hours to 10,000 hours).

A "lifetime" for an ultracapacitor is also generally defined by a particular application and is typically indicated by a certain percentage increase in leakage current or degradation of another parameter (as appropriate or determinative for the given application). For instance, in one embodiment, the lifetime of an ultracapacitor in an automotive application may be defined as the time at which the leakage current increases to 200% of its initial (beginning of life or "BOL") value. In another embodiment, the lifetime for an ultracapacitor in a downhole application may be defined based on the increase of its ESR from its initial BOL value, e.g., the lifetime may be defined as the time at which the ESR increases to 50%, 75%, 100%, 150%, or 200% of its BOL value.

Electrolyte 6 may be selected for exhibiting desirable properties, such as high thermal stability, a low glass transition temperature (Tg), a viscosity, a particular rhoepectic or thixotropic property (e.g., one that is dependent upon temperature), as well as high conductivity and exhibited good electric performance over a wide range of temperatures. As examples, the electrolyte 6 may have a high degree of fluidity, or, in contrast, be substantially solid, such that separation of electrodes 3 is assured. Accordingly, other embodiments of electrolyte 6 that exhibit the desired properties may be used as well or in conjunction with any of the foregoing.

"Peak power density" is one fourth times the square of peak device voltage divided by the effective series resistance of the device. "Energy density" is one half times the square of the peak device voltage times the device capacitance.

For the purposes of this disclosure and without limitation, an ultracapacitor 10 may have a volume in the range from about 0.05 cc to about 7.5 liters.

Nominal values of normalized parameters may be obtained by multiplying or dividing the normalized parameters (e.g. volumetric leakage current) by a normalizing characteristic (e.g. volume). For instance, the nominal leakage current of an ultracapacitor having a volumetric leakage current of 10 mA/cc and a volume of 50 cc is the product of the volumetric leakage current and the volume, 500 mA. Meanwhile the nominal ESR of an ultracapacitor having a volumetric ESR of 20 mOhm/cc and a volume of 50 cc is the quotient of the volumetric ESR and the volume, 0.4 mOhm.

A volume of a particular ultracapacitor 10 may be extended by combining several storage cells (e.g., welding together several jelly rolls) within one housing 7 such that they are electrically in parallel or in series.

Embodiments of the ultracapacitor 10 that exhibit a relatively small volume may be fabricated in a prismatic form factor such that the electrodes 3 of the ultracapacitor 10 oppose one another, at least one electrode 3 having an internal contact to a glass to metal seal, the other having an internal contact to a housing or to a glass to metal seal.

An energy storage device comprises a housing containing an energy storage cell and an electrolyte. The electrolyte comprises an ionic liquid and at least one additive that decreases the rate of degradation of the ionic liquid when the energy storage device is operating. The additive comprises a gelling agent; an inorganic powder; a clay; a plasticizer; a polymer; or a combination thereof; where the gelling agent comprises a silicate. The energy storage device that utilizes the electrolyte is configured to output electrical energy at temperatures throughout an operating temperature range, wherein the operating temperature range is within a temperature range of between minus 40 degrees Celsius to 250 degrees Celsius.

The energy storage device has a level of halide impurities that is no greater than 50 parts per million, by combined weight of a storage cell and electrolyte.

The energy storage device is configured to output electrical energy at operating voltages throughout an operating voltage range, the operating voltage range being between 0 V and about 5 V.

The ionic liquid in the energy storage device comprises a cation comprises tetrabutylammonium, 1-(3-cyanopropyl)-3-methylimidazolium, 1, 2-dimethyl-3-propylimidazolium, 1,3-bis(3-cyanopropyl)imidazolium, 1,3-diethoxyimidazolium, 1-butyl-1-methylpiperidinium, 1-butyl-2,3-dimethylimidazolium, 1-butyl-3-methylimidazolium, 1-butyl-4-methylpyridinium, 1-butylpyridinium, 1-decyl-3-methylimidazolium, 1-ethyl-3-methylimidazolium, 1-pentyl-3-methylimidazolium, 1-hexyl-3-methylimidazolium, 3-methyl-1-propylpyridinium, or a combination thereof.

In an embodiment, the ionic liquid used in the energy storage device comprises a cation comprising ammonium, imidazolium, pyrazinium, piperidinium, pyridinium, pyrimidinium, and pyrrolidinium, or a combination thereof.

In an embodiment, the ionic liquid used in the energy storage device comprises an anion comprising bis(trifluoromethanesulfonyl)imide, tris(trifluoromethanesulfonyl)methide, dicyanamide, tetrafluoroborate, tetra(cyano)borate, hexafluorophosphate, tris(pentafluoroethyl)trifluorophosphate, trifluoromethanesulfonate, bis(pentafluoroethanesulfonyl)imide, thiocyanate, trifluoro(trifluoromethyl)borate, or a combination thereof.

In an embodiment, the electrolyte used in the energy storage device further comprises a solvent comprising acetonitrile, amides, benzonitrile, cyclic ether, dibutyl carbonate, diethyl carbonate, diethylether, dimethoxyethane, dimethyl carbonate, dimethlylformamide, dimethylsulfone, dioxane, dioxolane, ethyl formate, ethylene carbonate, ethylmethyl carbonate, lactone, linear ether, methyl formate, methyl propionate, methyltetrahydrofuran, nitrobenzene, nitromethane, n-methylpyrrolidone, propylene carbonate, sulfolane, sulfone, tetrahydrofuran, tetramethylene sulfone, thiophene, ethylene glycol, diethylene glycol, triethylene glycol, polyethylene glycols, carbonic acid ester, γ-butyrolactone, tricyanohexane, or a combination thereof.

In an embodiment, the housing of the energy storage device is hermetically sealed and the hermetic seal exhibits a leak rate that is no greater than about $5.0 \times 10^{-10}$ atm-cc/sec at temperatures within the operating temperature range.

In an embodiment, the energy storage device has a volumetric leakage current is less than about 1,000 mAmp per Liter over an operating voltage range.

In an embodiment, the volumetric leakage current (mA/cc) of the energy storage device is less than about 10 mA/cc while held at a substantially constant temperature for any temperature in the operating voltage range.

In another embodiment, the volumetric capacitance of the energy storage device is between about 50 F/cc and about 8 F/cc at temperatures throughout the operating temperature range.

In another embodiment, a volumetric ESR of the energy storage device is between about 150 mOhms/cc and 2 Ohms/cc.

In another embodiment, the energy storage device exhibits an ESR increase less than about 300 percent while held at a constant voltage for at least 20 hours.

In another embodiment, the energy storage device is characterized by a time before failure of at least 100 hours operating at a temperature of about 200 degrees Celsius or greater, wherein a failure condition is a decrease of capacitance of 50% or greater or an increase in ESR of 50% or greater.

In another embodiment, the electrolyte comprises 1-butyl-1-methylpyrrolidinium tris(pentafluoroethyl)trifluorophosphate.

In another embodiment, the energy storage device is characterized by a time before failure of at least 600 hours operating at a temperature of about 200 degrees Celsius of greater, wherein a failure condition is a decrease of capacitance of 50% or greater or an increase in ESR of 50% or greater.

In another embodiment, the energy storage device is characterized by a decrease of capacitance of 10% or less and an increase in ESR of 10% or less during operation for at least 1000 hours at a temperature of at least 200 degrees Celsius and an operating voltage of 0.5 V or more.

In another embodiment, the energy storage device is characterized by a decrease of capacitance of 10% or less and an increase in ESR of 60% or less during operation for at least 5000 charge/discharge cycles at a temperature of at least 250 degrees Celsius and an operating voltage of 0.5 V or more.

In another embodiment, the energy storage device of the housing comprises a multilayer material; wherein the multilayer material comprises a barrier disposed over a substantial portion of interior surfaces of the housing.

In another embodiment, the barrier used in the housing of the energy storage device comprises a material that exhibits corrosion resistance and a low electrochemical reactivity with the electrolyte; and wherein the barrier comprises at least one of polytetrafluoroethylene (PTFE), perfluoroalkoxy (PFA), fluorinated ethylene propylene (FEP), ethylene tetrafluoroethylene (ETFE), and combinations thereof.

It should be recognized that the teachings herein are merely illustrative and are not limiting of the invention. Further, one skilled in the art will recognize that additional components, configurations, arrangements and the like may be realized while remaining within the scope of this invention. For example, configurations of layers, electrodes, leads, terminals, contacts, feed-throughs, caps and the like may be varied from embodiments disclosed herein. Generally, design and/or application of components of the ultracapacitor and ultracapacitors making use of the electrodes are limited only by the needs of a system designer, manufacturer, operator and/or user and demands presented in any particular situation.

Further, various other components may be included and called upon for providing for aspects of the teachings herein. For example, additional materials, combinations of materials and/or omission of materials may be used to provide for added embodiments that are within the scope of the teachings herein. As discussed herein, terms such as "adapting," "configuring," "constructing" and the like may be considered to involve application of any of the techniques disclosed herein, as well as other analogous techniques (as may be presently known or later devised) to provide an intended result.

When introducing elements or the embodiment(s) thereof, the articles "a," "an," and "the" are intended to mean that there are one or more of the elements. Similarly, the adjective "another," when used to introduce an element, is intended to mean one or more elements. The terms "including," "has" and "having" are intended to be inclusive such that there may be additional elements other than the listed elements.

In the present application a variety of variables are described, including but not limited to components (e.g. electrode materials, electrolytes, etc.), conditions (e.g., temperature, freedom from various impurities at various levels), and performance characteristics (e.g., post-cycling capacity as compared with initial capacity, low leakage current, etc.). It is to be understood that any combination of any of these variables can define an embodiment of the invention. For example, a combination of a particular electrode material, with a particular electrolyte, under a particular temperature range and with impurity less than a particular amount, operating with post-cycling capacity and leakage current of particular values, where those variables are included as possibilities but the specific combination might not be expressly stated, is an embodiment of the invention. Other combinations of articles, components, conditions, and/or methods can also be specifically selected from among variables listed herein to define other embodiments, as would be apparent to those of ordinary skill in the art.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention but to be construed by the claims appended herein.

What is claimed is:

1. An energy storage device comprising:
a housing containing an energy storage cell and an electrolyte;
the electrolyte comprising an ionic liquid; and
at least one additive that decreases the rate of degradation of the ionic liquid when the energy storage device is operating, where the additive comprises a gelling agent; an inorganic powder; a clay; a plasticizer; a polymer; or a combination thereof; where the gelling agent is a silicate; wherein the energy storage device that utilizes the electrolyte is configured to output electrical energy at temperatures throughout an operating temperature range, wherein a level of halide impurities is no greater than 50 parts per million, by combined weight of a storage cell and electrolyte; and wherein the operating temperature range is within a temperature range of between minus 40 degrees Celsius to 250 degrees Celsius.

2. The energy storage device of claim 1, wherein the energy storage device is configured to output electrical energy at operating voltages throughout an operating voltage range, the operating voltage range being between 0 V and about 5 V.

3. The energy storage device of claim 1, wherein the ionic liquid comprises a cation comprising tetrabutylammonium, 1-(3-cyanopropyl)-3-methylimidazolium, 1, 2-dimethyl-3-propylimidazolium, 1,3-bis(3-cyanopropyl)imidazolium, 1,3-diethoxyimidazolium, 1-butyl-1-methylpiperidinium, 1-butyl-2,3-dimethylimidazolium, 1-butyl-3-methylimidazolium, 1-butyl-4-methylpyridinium, 1-butylpyridinium, 1-decyl-3-methylimidazolium, 1-ethyl-3-methylimidazolium, 1-pentyl-3-methylimidazolium, 1-hexyl-3-methylimidazolium, 3-methyl-1-propylpyridinium, or a combination thereof.

4. The energy storage device of claim 1, wherein the ionic liquid comprises a cation comprising ammonium, imidazolium, pyrazinium, piperidinium, pyridinium, pyrimidinium, and pyrrolidinium, or a combination thereof.

5. The energy storage device of claim 1, wherein the ionic liquid comprises a anion comprising bis(trifluoromethanesulfonyl)imide, tris(trifluoromethanesulfonyl)methide, dicyanamide, tetrafluoroborate, tetra(cyano)borate, hexafluorophosphate, tris(pentafluoroethyl)trifluorophosphate, trifluoromethanesulfonate, bis(pentafluoroethanesulfonyl)imide, thiocyanate, trifluoro(trifluoromethyl)borate, or a combination thereof.

6. The energy storage device of claim 1, wherein the electrolyte further comprises a solvent comprising acetonitrile, amides, benzonitrile, cyclic ether, dibutyl carbonate, diethyl carbonate, diethylether, dimethoxyethane, dimethyl carbonate, dimethlylformamide, dimethylsulfone, dioxane, dioxolane, ethyl formate, ethylene carbonate, ethylmethyl carbonate, lactone, linear ether, methyl formate, methyl propionate, methyltetrahydrofuran, nitrobenzene, nitromethane, n-methylpyrrolidone, propylene carbonate, sulfolane, sulfone, tetrahydrofuran, tetramethylene sulfone, thiophene, ethylene glycol, diethylene glycol, triethylene glycol, polyethylene glycols, carbonic acid ester, γ-butyrolactone, tricyanohexane, or a combination thereof.

7. The energy storage device of claim 1, wherein the housing is hermetically sealed and the hermetic seal exhibits a leak rate that is no greater than about $5.0 \times 10^{-10}$ atm-cc/sec at temperatures within the operating temperature range.

8. The energy storage device of claim 3, wherein a volumetric leakage current is less than about 1,000 mAmp per Liter over an operating voltage range.

9. The energy storage device of claim 3, wherein the volumetric leakage current (mA/cc) of the energy storage device is less than about 10 mA/cc while held at a substantially constant temperature for any temperature in the operating voltage range.

10. The energy storage device of claim 1, wherein a volumetric capacitance of the energy storage device is between about 50 F/cc and about 8 F/cc at temperatures throughout the operating temperature range.

11. The energy storage device of claim 1, wherein a volumetric ESR of the energy storage device is between about 150 mOhms/cc and 2 Ohms/cc.

12. The energy storage device of claim 1, wherein the energy storage device exhibits an ESR increase less than about 300 percent while held at a constant voltage for at least 20 hours.

13. The energy storage device of claim 1, wherein the energy storage device is characterized by a time before failure of at least 100 hours operating at a temperature of about 200 degrees Celsius or greater, wherein a failure condition is a decrease of capacitance of 50% or greater or an increase in ESR of 50% or greater.

14. The energy storage device of claim 1, wherein the electrolyte comprises 1-butyl-1-methylpyrrolidinium tris(pentafluoroethyl)trifluorophosphate.

15. The energy storage device of claim 1, wherein the energy storage device is characterized by a time before failure of at least 600 hours operating at a temperature of about 200 degrees Celsius of greater, wherein a failure condition is a decrease of capacitance of 50% or greater or an increase in ESR of 50% or greater.

16. The energy storage device of claim 1, wherein the energy storage device is characterized by a decrease of capacitance of 10% or less and an increase in ESR of 10% or less during operation for at least 1000 hours at a temperature of at least 200 degrees Celsius and an operating voltage of 0.5 V or more.

17. The energy storage device of claim 1, wherein the energy storage device is characterized by a decrease of capacitance of 10% or less and an increase in ESR of 60% or less during operation for at least 5000 charge/discharge cycles at a temperature of at least 250 degrees Celsius and an operating voltage of 0.5 V or more.

18. The energy storage device of claim 1, wherein the housing comprises a multilayer material; wherein the multilayer material comprises a barrier disposed over a substantial portion of interior surfaces of the housing.

19. The energy storage device of claim 1, wherein the barrier comprises a material that exhibits corrosion resistance and a low electrochemical reactivity with the electrolyte; and wherein the barrier comprises at least one of polytetrafluoroethylene (PTFE), perfluoroalkoxy (PFA), fluorinated ethylene propylene (FEP), ethylene tetrafluoroethylene (ETFE), and combinations thereof.

* * * * *